United States Patent [19]
Ozeki

[11] Patent Number: 6,072,464
[45] Date of Patent: *Jun. 6, 2000

[54] COLOR REPRODUCTION METHOD

[75] Inventor: Toru Ozeki, Aichi-ken, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/848,165

[22] Filed: Apr. 29, 1997

[30] Foreign Application Priority Data

Apr. 30, 1996 [JP] Japan .................................. 8-109893
May 30, 1996 [JP] Japan .................................. 8-137087

[51] Int. Cl.[7] ......................................................... G09G 5/04
[52] U.S. Cl. ............................................. 345/154; 345/199
[58] Field of Search ..................................... 345/154, 132, 345/153, 199; 348/645; 358/80

[56] References Cited

U.S. PATENT DOCUMENTS

| | | | |
|---|---|---|---|
| 5,065,234 | 11/1991 | Hung et al. ............................... | 358/80 |
| 5,142,356 | 8/1992 | Usami et al. ............................. | 358/80 |
| 5,590,251 | 8/1994 | Takagi ..................................... | 395/131 |
| 5,619,280 | 4/1995 | Yamashita et al. ...................... | 348/645 |
| 5,691,779 | 4/1995 | Yamashita et al. ...................... | 348/645 |
| 5,710,872 | 3/1996 | Takahashi et al. ...................... | 395/109 |
| 5,896,122 | 4/1999 | MacDonald et al. .................... | 345/153 |

FOREIGN PATENT DOCUMENTS

| | | |
|---|---|---|
| 53-123201 | 10/1973 | Japan . |
| 56-14237 | 2/1984 | Japan . |
| 7-28426 | 1/1995 | Japan . |
| 7-50760 | 2/1995 | Japan . |
| 7-123284 | 12/1995 | Japan . |

OTHER PUBLICATIONS

R.S. Bens et al., "CRT Colorimetry, Part 1: Theory and practice", Color Research and Applications, vol. 18, No. 5, pp. 299–314, Oct. 1993.

D.L. Post et al., "An Evaluation of Methods for Producing Specific Colors on CRTs", *Proceedings of the Human Factors Society—31st Annual Meeting*, pp. 1276–1280 (1987).

*Primary Examiner*—Richard A. Hjerpe
*Assistant Examiner*—Ronald Laneau
*Attorney, Agent, or Firm*—Burns, Doane, Swecker & Mathis, LLP

[57] ABSTRACT

The present invention provides color reproduction method to reproduce arbitrary colors at high precision simply without requiring a number of preparatory steps. As a means for conversion between CMYK signal value and arbitrary chromaticity, a color material transfer amount which is a physical amount is handled as intermediate amount. A single color characteristic indicating a relation between the signal value and the color material transfer amount and a color mixing characteristic indicating a relation between each color material transfer amount (ink amount) of a plurality of inks and the chromaticity are obtained. By synthesizing the obtained single color characteristic and color mixing characteristic, the signal value/chromaticity characteristic is obtained in the form of a color conversion table.

13 Claims, 40 Drawing Sheets

F I G. 1 1
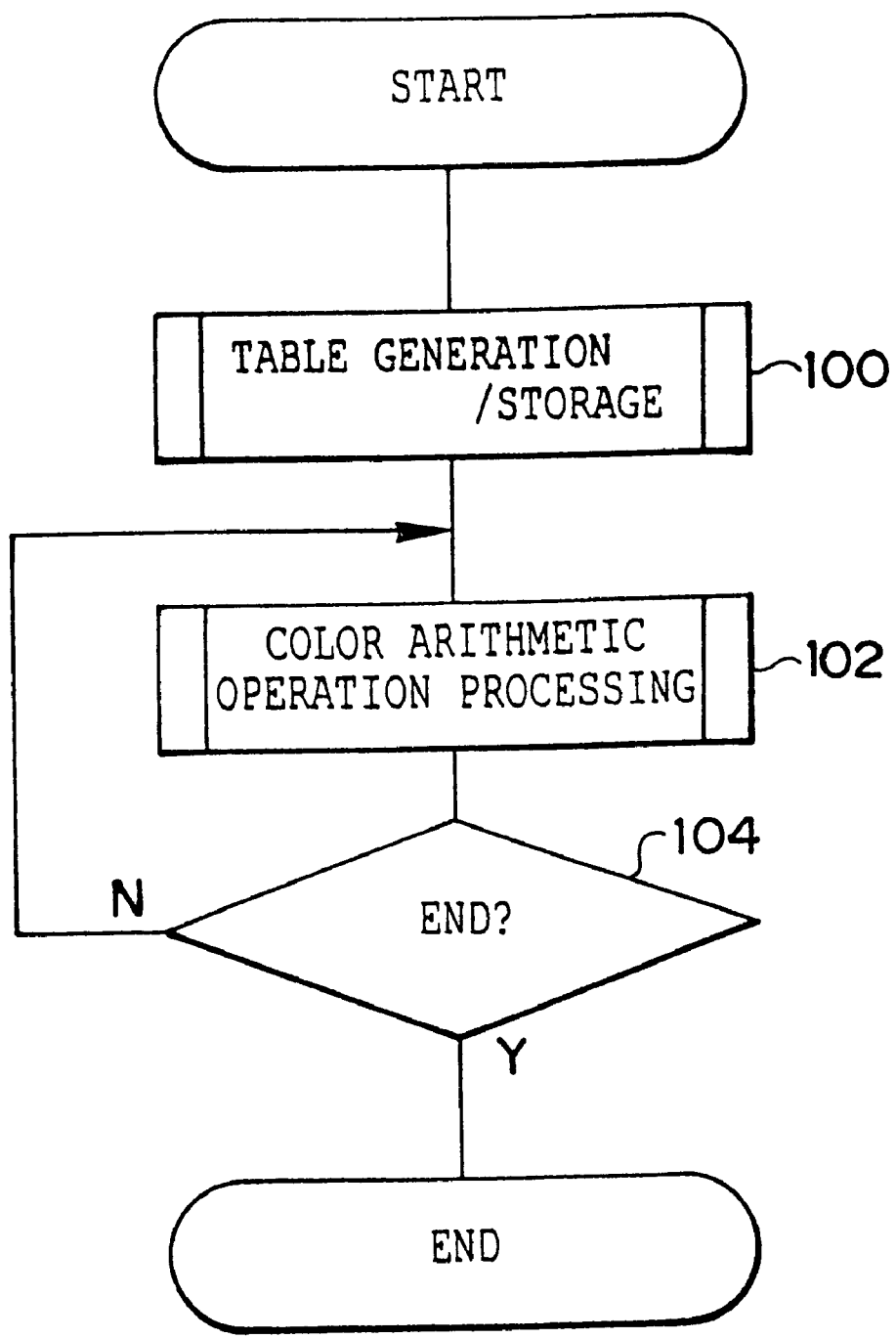

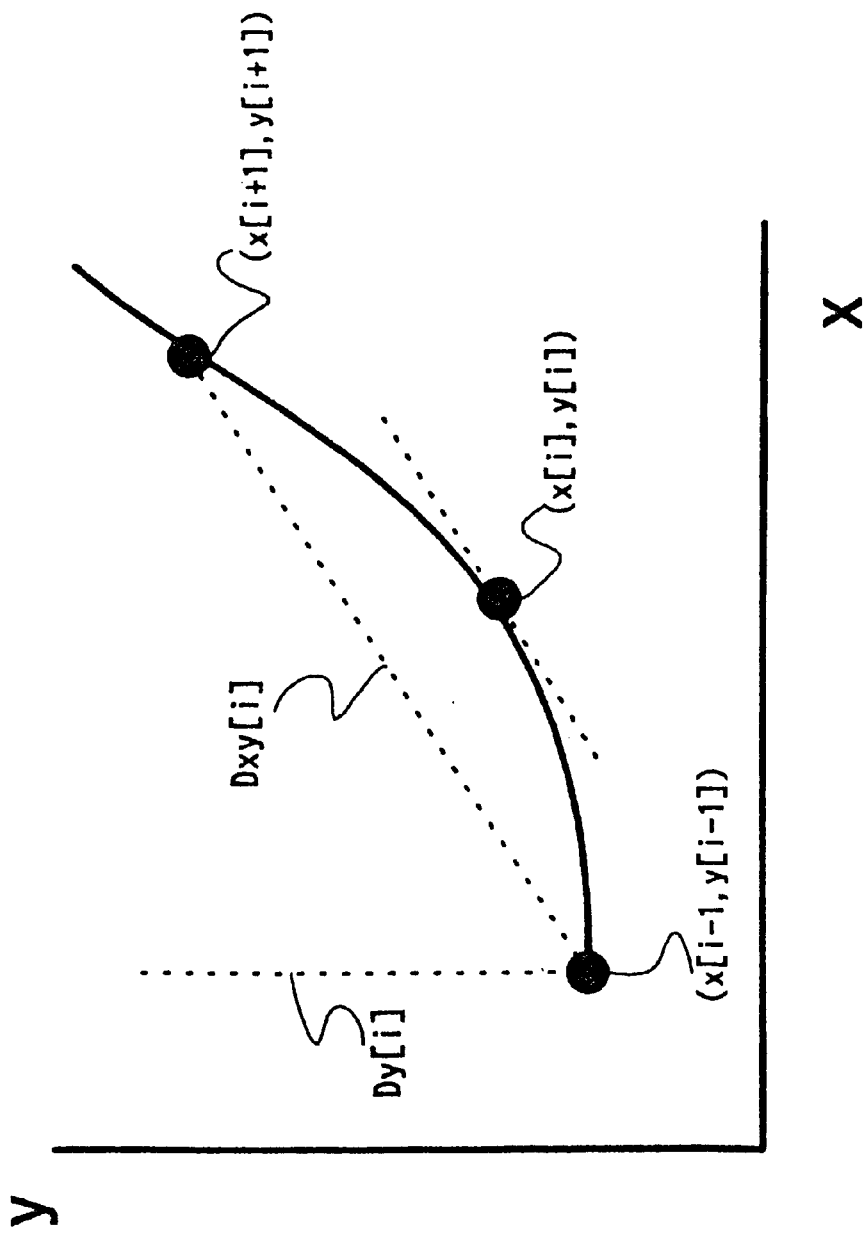
F I G. 1 6

F I G. 1 9
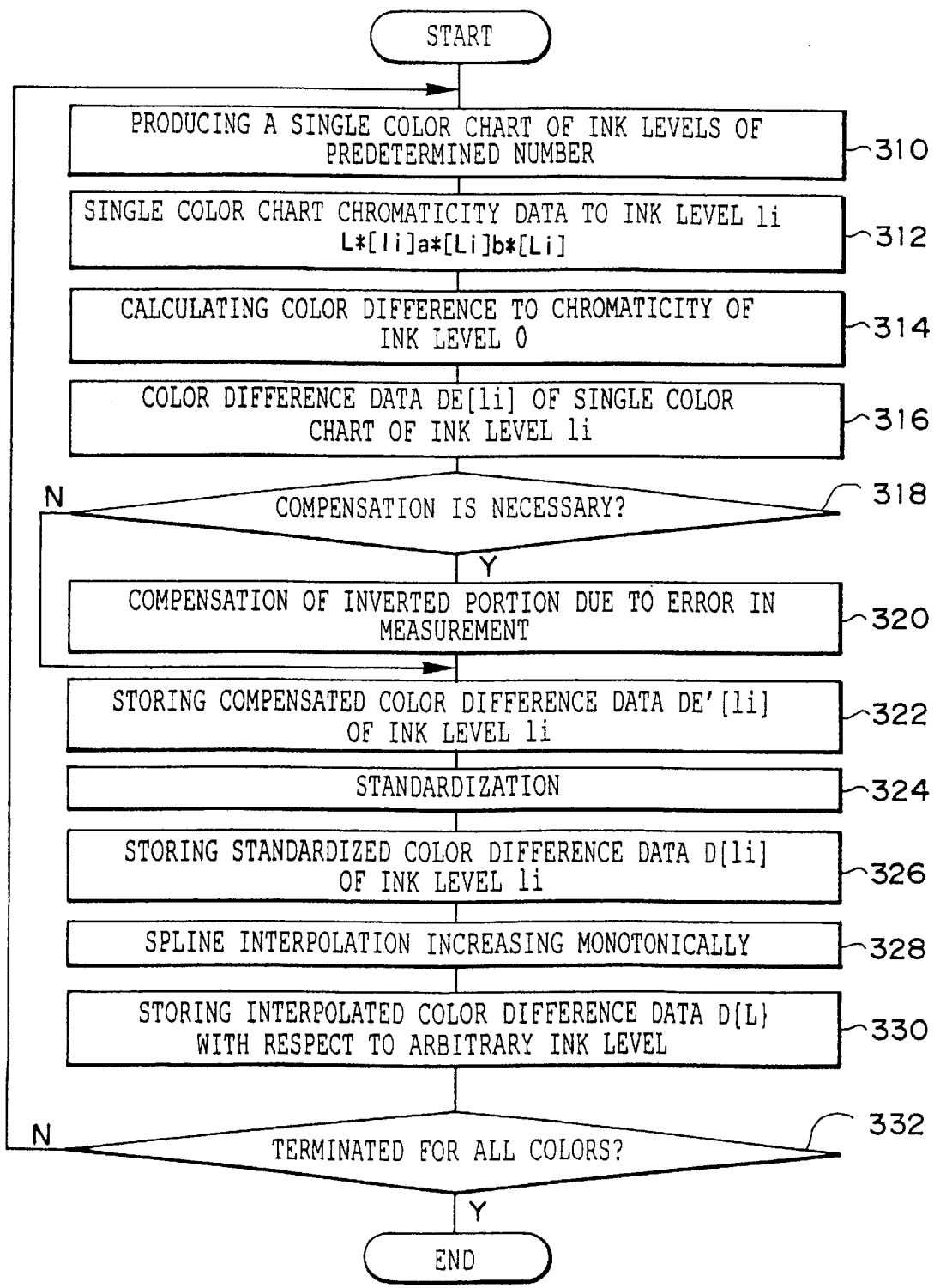

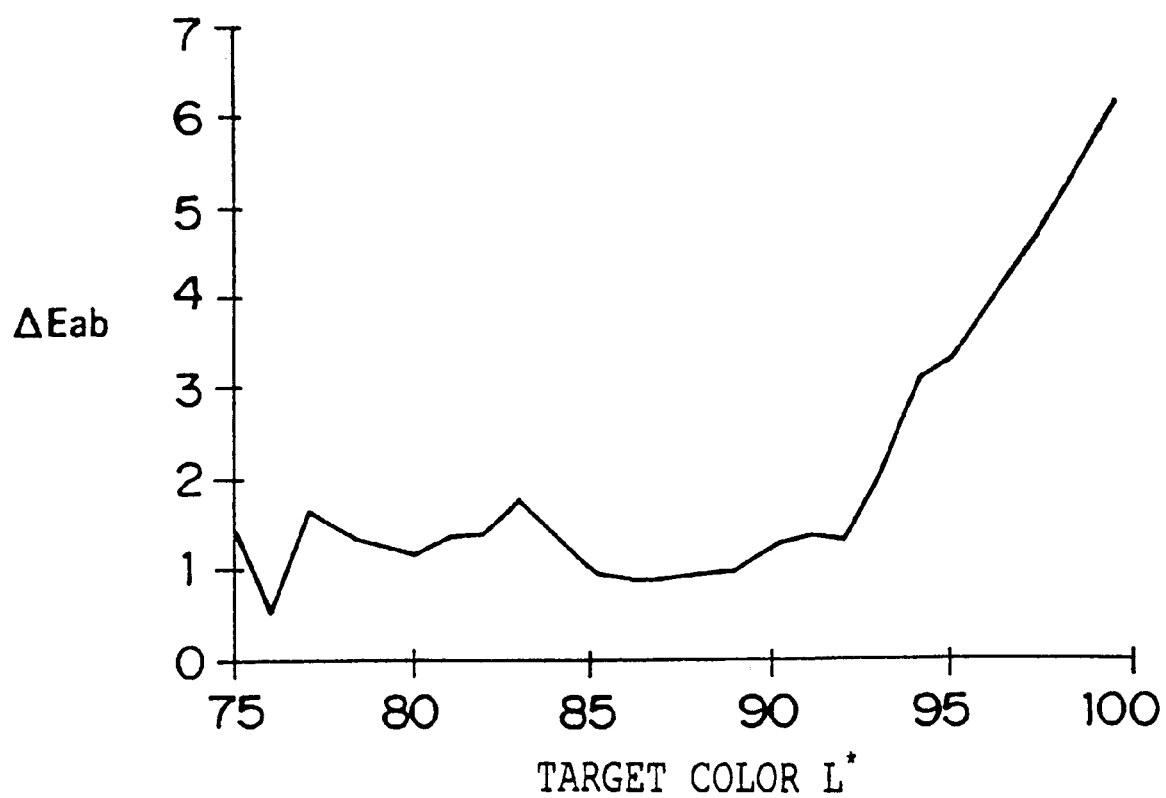
F I G. 34

F I G. 35
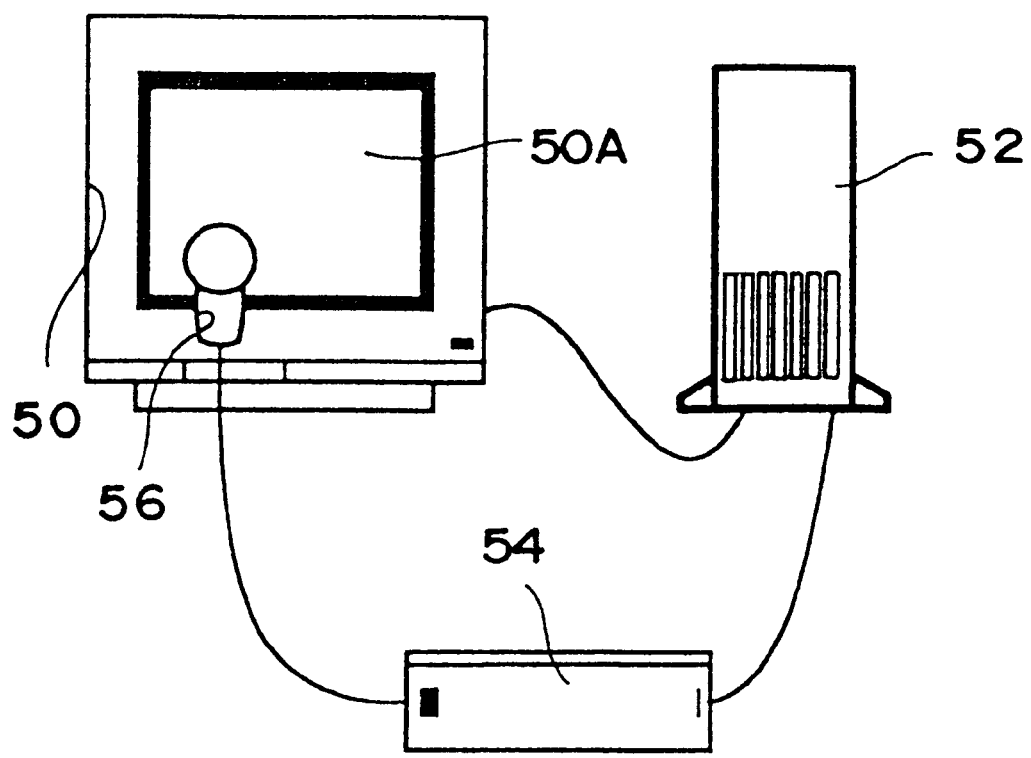

F I G. 36
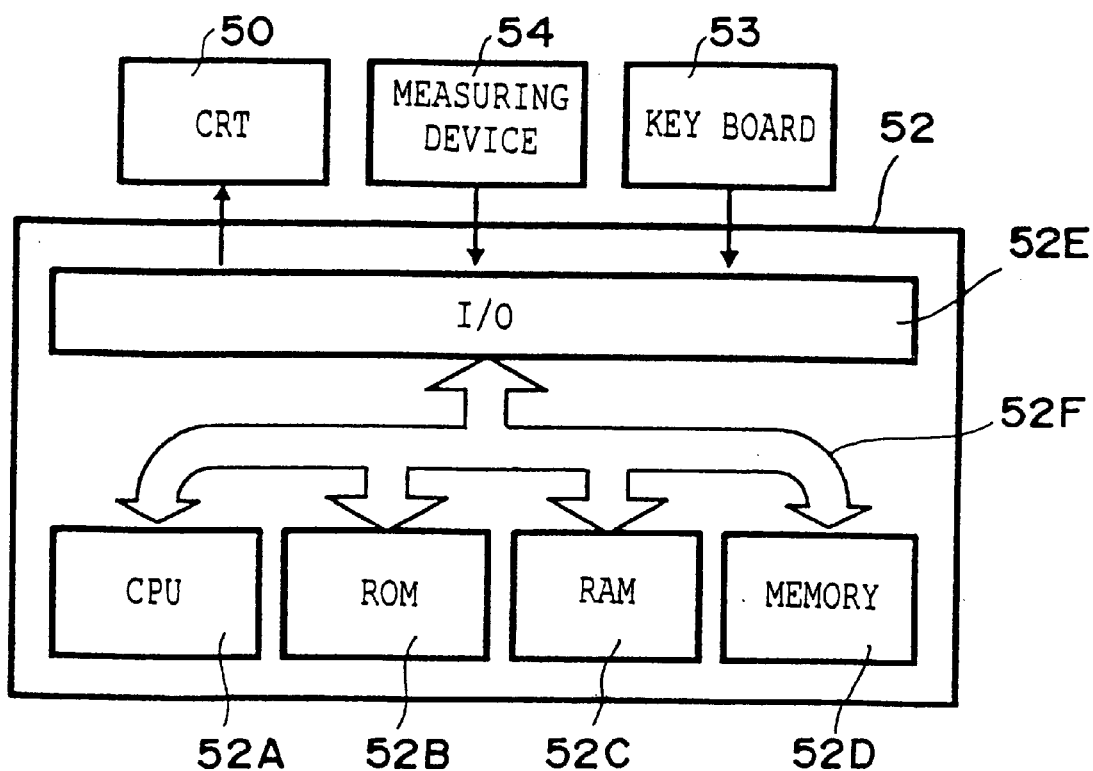

F I G. 3 7
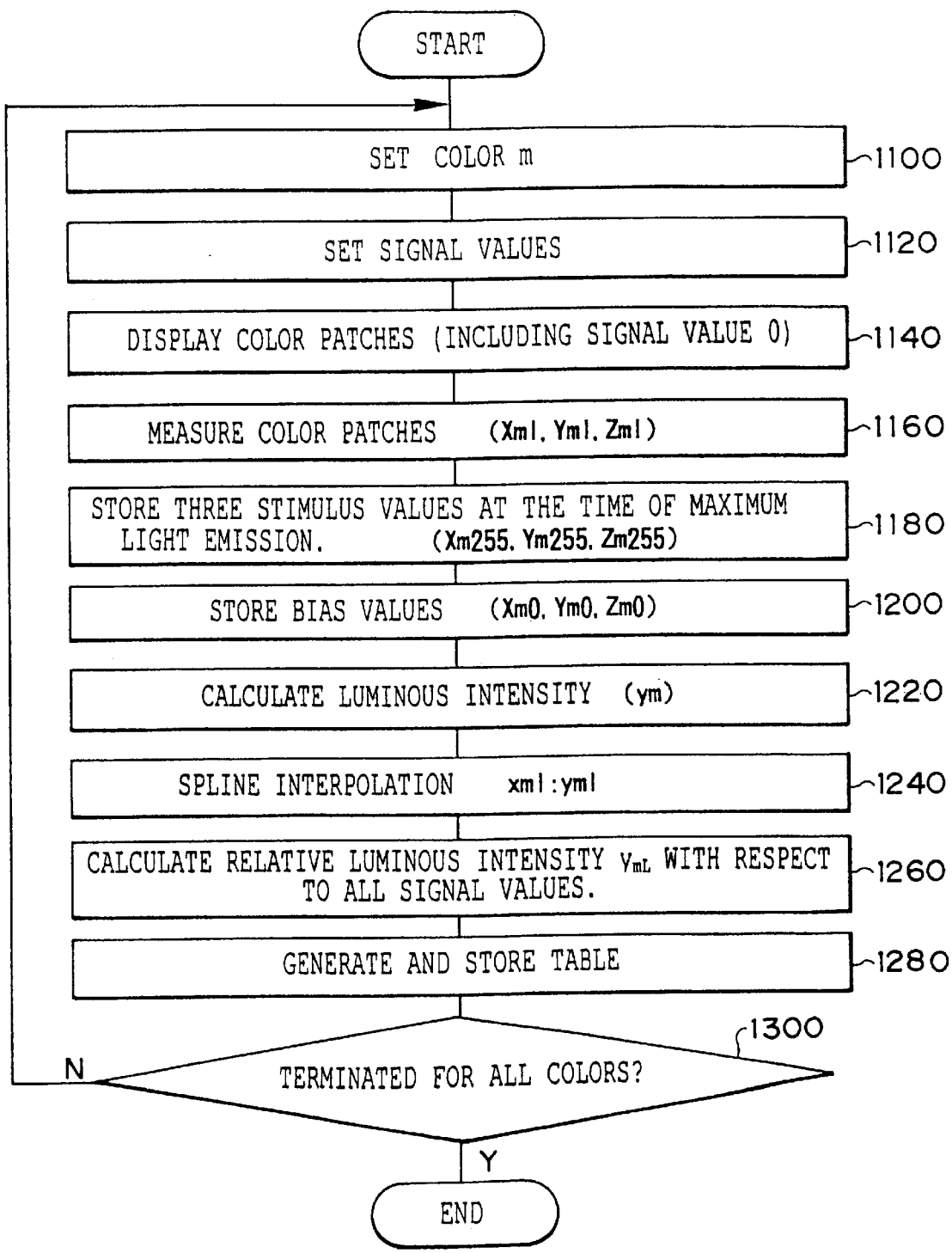

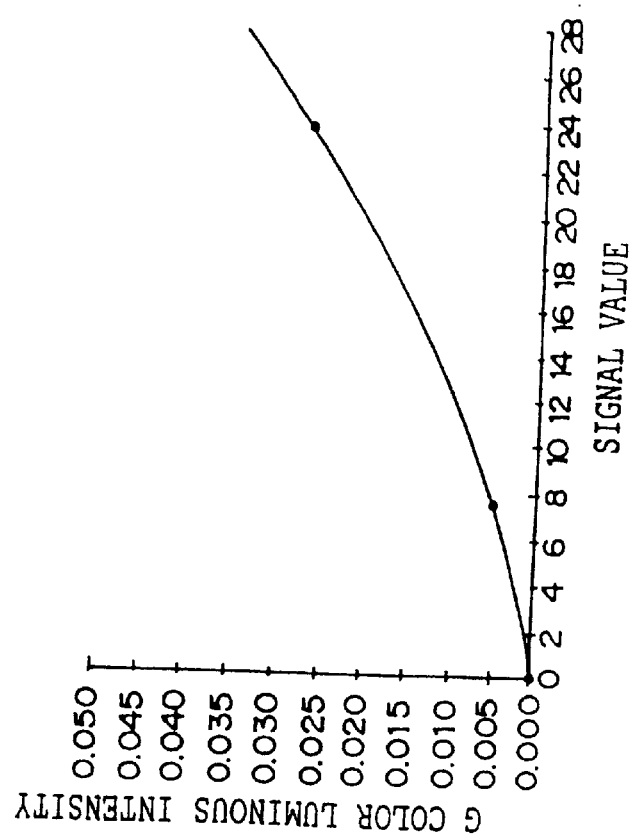
F I G. 43B
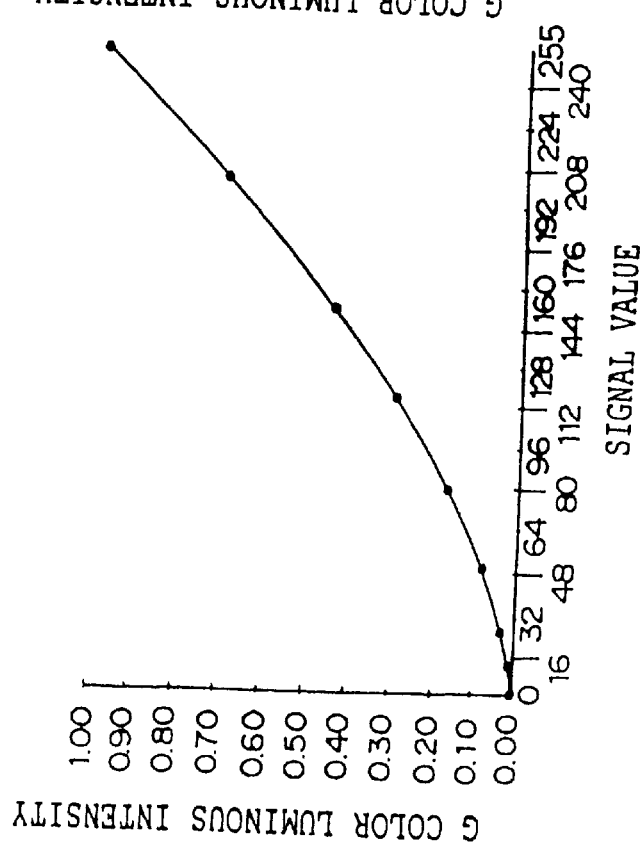
F I G. 43A

COLOR REPRODUCTION METHOD

BACKGROUND OF THE INVENTION

1. Field of the Invention

The present invention relates to a color reproduction method, or more in particular to a color reproduction method to reproduce predetermined colors in multi-color printing, multi-color display, or the like.

2. Description of the Related Art

Colors of object surfaces, original documents and the like can be expressed in chromaticity expressed by tristimulus values (X,Y,Z) of CIE standard XYZ calorimetric system as generally known and can be normally specified on the chromaticity coordinates. It is also known that these tristimulus values X, Y, Z can be obtained if spectral distribution of reflected light from an object or transmitted light can be measured.

Recently, a necessity of color reproduction technology capable of faithfully reproducing colors desired by designers, for example, to evaluate design works in car design world has been stated. That is, in conducting design works by using computers, any chromaticity desired by designers, colors obtained by measurement or the like, images containing those colors and the like must be displayed on CRT display (hereinafter referred to as CRT) or reproduced faithfully by means of hard copy apparatus.

Additionally, information expressing images and colors can be transmitted between local remote places due to progress in recent information transmission network. In this case, the same information (colors and images) must be output with the same colors by means of CRTs and hard copiers on both sides.

FIG. 1 shows a general method for expressing any colors on CRT by additive mixture. According to this method, chromaticity 10 expressed by arbitrary tristimulus values (X,Y,Z) is converted to luminous intensities 14 of red, green and blue by means of a conversion processing 12 by a matrix using the chromaticities of respective fluorescent substances of red, green and blue (hereinafter referred to RGB) in the CRT and then converted to signal values 18 which are device values of the CRT. This conversion process 16 from the luminous intensity 14 to the signal value 18 is carried out according to a conversion method using a model formula indicating a relation between the luminous intensity and the signal value (for example, applied voltage) (see R. S. Bens, R. J. Motta and M. E. Gorzynski, CRT Colorimetry. Partv1: Theory and Practice, COLOR research and application Vol. 18 (No. 5), pp. 299–314, 1993) or according to a conversion method using a look-up table (hereinafter referred to as LUT) (see D. L. Post and C. S. Calhoun, An evaluation of methods for producing specific colors on CRTs, Proceedings of the Human Factors Society 31st Annual Meeting, pp. 1276–1280, 1987). By inputting this signal value 18 into the CRT display system (a system in which the CRT and D/A converter are combined which is referred to as CRT system), the color expressed by arbitrary tristimulus values (X,Y,Z) can be displayed.

To reproduce a color of arbitrary chromaticity on the CRT, it is necessary to know all the luminous intensities of fluorescent substances corresponding to respective signal values as a relation between the signal value and the luminous intensity of the fluorescent substance. However, measuring the luminous intensities of the fluorescent substances with respect to all the signal values leads to a tremendous number of measuring points. Thus this method is not a practical method. Thus, in many cases, by modeling the characteristics of the CRT and then obtaining parameters of that model formula from a small number of measuring points, the luminous intensities of fluorescent substances corresponding to signal values other than the measuring points are obtained from values calculated based on that model formula.

When the method using the model formula is applied to conversion from the luminous intensity to the signal value, the chromaticities of the respective fluorescent substances of RGB are measured by means of a colorimeter by preliminarily making the respective fluorescent substances of RGB to light to their maximum extent. The model formula for use in conversion processing from the luminous intensity to the signal value can be generally expressed for each of single colors in the following expression (1).

$$Y=Y_0+(Y_c-Y_0)\cdot(D/255)^\gamma \tag{1}$$

where:
Y: luminance
$Y_0$: luminance produced when the signal value is 0
$Y_c$: luminance produced when the signal value is maximum
D: arbitrary signal value
Y: gamma characteristic value of CRT The gamma characteristic value γ in the above expression (1) is obtained from values obtained by preliminarily measuring the luminous intensity of each of RGB colors produced when a plurality of the signal values are given. In this manner, it is possible to obtain the luminous intensity of the fluorescent substance corresponding to the signal value at any points other than the measuring points by using the model formula in which the characteristic of the CRT is modeled.

On the other hand, if a relation between the luminous intensity and the signal value is expressed by LUT, the luminous intensities of each single color are measured for a plurality of the signal values and then those measured values are linear interpolated to obtain the luminous intensity corresponding to arbitrary signal value. Like this, instead of using the model formula, the luminous intensity of the fluorescent substance at points other than the measuring points corresponding to the signal value can be obtained by linear interpolation of the measured data. In this case, it is not necessary to consider an accuracy or the like of the model formula and even in actual CRT systems which do not always indicate an ideal behavior, a relation between the signal value and the luminous intensity of the fluorescent substance can be expressed.

However, there are some CRT systems which do not indicate an ideal behavior to additive mixture. For example, comparing a case in which each of the RGB colors is expressed in single color with a predetermined signal value with a case in which respective colors of the RGB colors are displayed at the same time by mixing with a predetermined signal value, the luminous intensity of each color is sometimes different despite the same signal value. In this case, it is difficult to reproduce a color at high precision according to the luminous intensity/signal value characteristic obtained by measuring a color expressed in single color. That is, tristimulus values obtained by synthesizing (adding) respective tristimulus values obtained when respective colors of RGB colors are displayed in single color do not coincide with tristimulus values obtained when respective RGB colors are displayed at same time, so that tristimulus values obtained when respective colors of RGB colors are displayed in single color does not match with tristimulus values obtained when respective RGB colors are displayed at same time (mismatching of additive mixture). For example, when the signal value is assumed to be 127, as shown in the following inequality, tristimulus values obtained by synthesizing tristimulus values measured when the respective colors of RGB are displayed in single color sometimes do not coincide with the tristimulus values measured when respective colors of RGB are displayed by mixing with the same signal value.

(Xa,Ya,Za)

$$\neq (X_1, Y_1, Z_1) + (X_2, Y_2, Z_2) + (X_3, Y_3, Z_3)$$

where (Xa,Ya,Za): tristimulus values when (Ra, Ga, Ba)=(127, 127, 127)

$(X_1, Y_1, Z_1)$: tristimulus values when $(Ra, G_0, B_0)$=(127, 0, 0)

$(X_2, Y_2, Z_2)$: tristimulus values when $(R_0, Ga, B_0)$=(0, 127, 0)

$(X_3, Y_3, Z_3)$: tristimulus values when $(R_0, G_0, Ba)$=(0, 0, 127)

Because it is difficult to obtain data corresponding to the luminous intensity when producing hard copies of arbitrary chromaticity with a hard copy machine in which subtractive mixture is used, as shown in FIG. 2, arbitrary chromaticity 10 is converted to the signal value 22 such as cyan, magenta, yellow and black (thereafter referred to as CMYK) by conversion process 20 such as color estimation formula using the least square method in which a relation between the signal value and the chromaticity is expressed and three dimensional LUT (thereafter referred to as 3D-LUT). Meanwhile, because the subtractive mixture is capable of producing a color corresponding to K color by combination of respective colors of CMY, it is possible to construct the signal values with only CMY excluding K color.

As described above, to achieve high precision color reproduction with a color reproduction apparatus based on subtractive mixture, it is important to grasp a relation between the signal values of CMYK and the chromaticity. As a method for this purpose, there are analytic method using Neugebauer equation which is applicable only when reproducing colors in printing with halftone process, a statistical method such as the method of least squares and a method based on LUT. Further, considering that the characteristics of color reproduction of single color is different from the characteristics of color reproduction of mixing colors in subtractive mixture, a method of color reproduction by separating the process for single color from the process for mixing colors is known (see Japanese Patent Application Publication (JP-B) No. 7-123284). However, although the process for each single color is separated from the process for mixing colors in this technology, a relation between single color and mixing of colors are not considered sufficiently, so that it is difficult to obtain a sufficient precision of color reproduction. Further, because it is difficult to unify the single color characteristic of color material by a process for each single color, it is difficult to compensate for a difference in color for example between color material production lots.

As a method based on LUT, a method of color reproduction by utilizing single color LUT for analytical optical density is known (see Japanese Patent Application Publication (JP-B) No. 7-28426). Because colors are reproduced from only single color LUT at the time of output when this method is used, sufficient precision of color reproduction cannot be obtained. Further, because the single color LUT is adapted for analytical optical density, a number of processes are necessary for data unit management, measuring process and the like.

A method of color reproduction by utilizing 3D-LUT is known (see Japanese Patent Application Laid-Open (JP-A) Nos. 53-123201 and 56-14237). Although this method reproduces colors by using 3D-LUT, because characteristics different among the single colors are not taken into account, it is difficult to compensate for a difference in color between color material production lots. Thus, to improve precision of color reproduction by using 3D-LUT, a method using spline interpolation is known (see Japanese Patent Application Laid-Open (JP-A) No. 7-50760). According to this technology, the number of data must be cube of integer. For example, the number of data next to 125 (cube of 5) in data number is 216 (cube of 6) so that a tremendous number of data is necessary.

As described above, to improve precision of color reproduction in the hard copy apparatus, it is necessary to consider detailed tone reproduction characteristics of each color (heat generating temperatures/color material transfer amount characteristics). If this improvement is made in 3D-LUT, a great amount of storage capacity is required, high processing speed is required and production cost of the apparatus increases. Further, to obtain a relation between the signal value and the chromaticity directly and in detail, a great number of data is necessary. Further, when making various compensations for color reproduction, for example, compensating for a difference in color between the color material production lots, the 3D-LUT is required to be produced by performing measurement and arithmetic operation again so that the number of processes increases and the processing time increases. Further, when performing adjustment of tone (color adjustment), such as white balance adjustment, a treatment for distorting a partial or entire correspondence of the 3D-LUT is necessary so that process is very complicated.

As described above, according to the conventional color reproduction methods, the precision of color reproduction depends on a number of measuring points. To improve the precision, the number of the measuring points must be increased and a large number of measuring processes are needed. Because the characteristics of the CRT and hard copy machine change with a passage of time, it is necessary to measure the characteristics frequently and reflect the characteristics of the apparatus at that time for color reproduction. However, a great number of preparatory steps for measurement or the like become an obstacle to maintaining high precision of color reproduction. Further, in an office or the like in which many CRTs and hard copy machines are used, if the number of preparatory steps for respective apparatuses increases, it becomes difficult to maintain color reproduction precision in all the apparatuses.

Further, when reproducing colors with a hard copy machine, it is difficult, different from a case in which color reproduction is made on the CRT, to express the characteristics of ink which originates color production by model formula, different from a case in which color reproduction is made on the CRT, and the characteristic of non-linearity is strong. Thus, to obtain sufficient precision by using a method based on linear interpolation, a great number of measurements are needed.

SUMMARY OF THE INVENTION

An object of the present invention is to provide a color reproduction method capable of reproducing arbitrary color simply and at high precision without requiring a great number of preparatory steps.

To this end, according to the first aspect of the present invention, there is provided a color reproduction method using a color reproduction apparatus which has a plurality of primary colors, converts color information values expressed by a first color space as predetermined colors to device values expressed by a second color space different from the first color space in order to determine formation amounts of respective primary colors for reproducing the color information values by colors by mixing the primary colors on a medium in which the colors are to be reproduced and outputs colors corresponding to the device values to reproduce the predetermined colors on the medium in which the colors are to be reproduced, the method comprising: obtaining single color characteristic of each of the primary colors which expresses a relation between the formation amount of each primary color for color reproduction by mixing the plurality of the primary colors and the device value for determining the formation amount; obtaining color mixing characteristic which expresses a relation between a predetermined formation amount of each of the plurality of the primary colors and chromaticity of colors reproduced by formation of the colors depending on the each predetermined formation amount, according to the obtained single color characteristic; and converting the color information value of each arbitrary color of the first color space to the device value according to the obtained single color characteristic and color mixing characteristic.

According to the second aspect of the present invention, there is provided a color reproduction method according to the first aspect, wherein the single color characteristic and the color mixing characteristic are obtained by using a color reproduction apparatus based on subtractive mixture capable of forming arbitrary colors by synthesizing a plurality of primary colors in which subtractive mixture is established.

According to the third aspect of the present invention, there is provided a color reproduction method according to the first or second aspect, wherein the color mixing characteristic estimates the formation amount of each primary color corresponding to arbitrary chromaticity by conducting spline interpolation based on a plurality of relations between the predetermined formation amount of each of the plurality of the primary colors and chromaticity of color reproduced by formation of the color depending on the formation amount.

According to the fourth aspect of the present invention, there is provided a color reproduction method according to any one of the first through third aspect, wherein when another color material different from a color material for forming the primary colors used for obtaining the single color characteristic and the color mixing characteristic is used, if the another color material is a color material having substantially same color, only the single color characteristic is obtained.

According to the fifth aspect of the present invention, there is provided a color reproduction method according to the fourth aspect, wherein when the single color characteristic is obtained by using the another color material, the single color characteristic of the another color material is obtained from a relation between the formation amount of the another color material and the device value for determining the formation amount, and when a maximum formation amount in the obtained single color characteristic of the another color material is less than a maximum formation amount in the single color characteristic of other substantially same color material other than the another color material, as a maximum formation amount in the single color characteristic of the other color material, a maximum formation amount of the another color material is set and the maximum formation amount in the single color characteristic of the another color material is made to correspond to a device value corresponding to a formation amount exceeding the maximum formation amount of the another color material to obtain the single color characteristic of each of the primary colors.

According to the sixth aspect of the present invention, there is provided a color reproduction method according to any one of the first through fifth aspect, wherein when tone of the predetermined color to be reproduced is adjusted, a single color characteristic corresponding to a tone to be adjusted of the plurality of the single color characteristics is adjusted.

According to the seventh aspect of the present invention, there is provided a color reproduction method according to any one of the first through sixth aspect, wherein the formation amount is a variable depending on a color difference between a color formed by the device value for determining a color formed depending on the formation amount or the formation amount and color of the medium in which the colors are to be reproduced.

According to the eighth aspect of the present invention, there is provided a color reproduction method according to the seventh aspect, wherein the single color characteristic is obtained by using charts, the charts being produced for a plurality of colors having substantially same color difference between the color of the medium and the color produced by the maximum formation amount.

According to the color reproduction method of the first aspect, the single color characteristic of each primary color which expresses a relation between the formation amount of each primary color for reproducing colors by mixing a plurality of the primary colors used in the color reproduction apparatus and the device value for determining the formation amount is obtained. The primary colors mentioned here refer to colors to be used in color mixing for color reproduction, for example, colors depending on respective colors such as cyan, magenta, yellow in the hard copy machine which performs color reproduction by subtractive mixture or colors depending on fluorescent substances emitting respective colors such as red light, green light and blue light in CRT which performs color reproduction by additive mixture. This color reproduction apparatus comprises a means for forming a plurality of primary colors, i.e., a plurality of single colors depending on the color material or fluorescent substances, and reproduces predetermined colors on such a medium in which colors are to be reproduced as paper, CRT or the like. The medium in which colors are to be reproduced mentioned here refers to material medium such as paper, CRT or the like for forming a plurality of single colors depending on the color material, fluorescent substances or the like.

For example, predetermined colors are expressed by color information values (e.g. tristimulus value XYZ) based on the first color space of the generally standard XYZ CIE colorimetric system. A plurality of the primary colors depending on this color information value are mixed, that is, a plurality of the primary colors are formed on the medium in which the colors are to be reproduced by amounts of the color materials, light emission amount of the fluorescent substances or the like, and they are sensed. Therefore, in the color reproduction apparatus, the color information values based on the first color space are converted to the device values expressed by the second color space different from the first color space, that is, the formation amounts of respective primary colors for use in color reproduction by mixing a plurality of the primary colors on the medium in which the colors are to be reproduced, namely, amounts of the color materials or light emission amounts, namely, the YMCK value of a color space in which subtractive mixture is established or the RGB value of a color space in which additive mixture is established. By outputting colors corresponding to the device values, the predetermined colors are reproduced in the medium in which the colors are to be reproduced. Because the relation between the formation amount of each of the plurality of color materials and the device value for determining the formation amount can be determined independently for each primary color, the single color characteristic of each of the primary colors which indicates a relation between the formation amount and the device value can be obtained.

Based on the respective single color characteristics, the color mixing characteristics indicating a relation between a predetermined formation amount of each of the plurality of the color materials and the chromaticity of color reproduced by formation of the color are obtained. That is, the chromaticity of color on the medium in which the color is reproduced, formed by mixing of the plurality of the color materials, that is, the amount of the color material, light emission amount of the fluorescent substance or the like, corresponds to respective formation amounts of the primary colors. Because the respective formation amounts can be determined independently for each of the primary colors by using the single color characteristics, a relation between a predetermined formation amount of each primary color when a plurality of the primary colors are mixed and the chromaticity of color reproduced by formation of the color by each predetermined formation amount can be obtained as the color mixing characteristics.

According to these single color characteristic and color mixing characteristic, the color information value of each arbitrary color of the first color space is converted to the device value. The color information value of each arbitrary color of the first color space of the predetermined color is converted to the formation amount according to the color mixing characteristic and the converted formation amount is converted to the device value according to the single color characteristic. Consequently, the predetermined color can be reproduced on the medium.

To achieve color reproduction at high precision by the color reproduction apparatus based on subtractive mixture, it is important to grasp a relation between the CMYK signal value and the chromaticity. Then, as in the second aspect, by obtaining the single color characteristic and the color mixing characteristic in a color reproduction apparatus based on subtractive mixture capable of forming arbitrary colors by synthesizing a plurality of primary colors in which the subtractive mixture is established, a relation between the signal value and the chromaticity which is usually not in linear relation can be grasped by separating the single color characteristic for only the primary colors for forming colors and the color mixing characteristic which is valid when respective primary colors are mixed.

To achieve color reproduction at high precision, it is necessary to grasp a relation between the color information value and the chromaticity. Generally, this relation is obtained by at least measuring the chromaticity of a reproduced color. However, if all the relations are obtained by measurement, the required process becomes tremendously large. Thus, as in the third aspect, by spline interpolating the color mixing characteristic based on a plurality of relations between the predetermined formation amount of each of the plurality of the primary colors and the chromaticity of color reproduced by formation of the color depending on each predetermined formation amount, the formation amount of each single color corresponding to arbitrary chromaticity is estimated. Consequently, it is possible to obtain at least the color mixing characteristic at high precision by a limited number of measurements.

As the single color characteristic, it is permissible to obtain a relation between arbitrary formation amount and the device value for each of the primary colors by spline interpolating a plurality of relations between the formation amount of the primary colors and the device values. Consequently, it is possible to obtain the single color characteristic at high precision by a limited number of measurements.

In the color reproduction apparatus, replacement or change of the color material which is a means for forming the primary color is sometimes necessary. When the replacement or change of the color material is performed, the single color characteristic or the color mixing characteristic may be changed so that they sometimes have to be obtained again. In this case, as in the fourth aspect, when another color material different from a color material for forming the primary colors used in obtaining the single color characteristic and the color mixing characteristic is used, if both of the color material are of substantially same color, the color mixing characteristic is not or less changed because the substantially same color material is used. Thus, by obtaining only the single color characteristic with the color mixing characteristic being regarded as the same, it is possible to achieve color reproduction at high precision.

If the replacement or change of the color material is performed as described above, the formation amount corresponding to same device value may be deviated from its previous formation amount corresponding to the same device value. For example, if the maximum formation amount based on the single color characteristic of a replaced or changed color material becomes smaller than its previous formation amount, a smaller maximum formation amount than previous after the replacement or change is made to correspond to a device value corresponding to the previous maximum formation amount and a change in the formation amount of the replaced or changed color material results in losing balance with color materials other than the replaced or changed color material. That is, the device value which does not correspond to a formation amount after the replacement or change produces a loss of balance. Thus, as in the fifth aspect, if the single color characteristic is obtained by using another color material, the single color characteristic of the another color material is obtained according to a relation between the formation amount of the another color material and the device value for determining the formation amount. If the maximum formation amount in the obtained single color characteristic of the another color material is less than the maximum formation amount in the single color characteristic of other color material than the another color material, the maximum formation amount of the another color material is set as the maximum formation amount of the material of the other color. Then the maximum formation amount in the single color characteristic of the another color material is made to correspond to a device value corresponding to a formation amount exceeding the maximum formation amount of the another color material. Consequently, the device value corresponds to a formation amount after the color material is replaced or changed. As a result, there never occurs a device value which does not correspond to the formation amount after the color material is replaced or changed.

In reproduction of a predetermined color in the color reproduction apparatus, adjustment of tone, for example increasing red element or decreasing blue element, is sometimes performed. According to the present invention, the tone can be changed by only the single color characteristic. Then, as in the sixth aspect, if the tone of a predetermined color to be reproduced is adjusted, a single color characteristic corresponding to a tone to be adjusted of a plurality of the single color characteristics is adjusted while the color mixing characteristic is kept the same. Consequently, the tone can be adjusted according to a user's desire without breaking a relation between color information value and chromaticity.

As in the seventh aspect, as the formation amount, a color difference between a color formed depending on its formation amount or a color formed by a device value for determining the formation amount and white or gray of the medium in which colors are to be reproduced can be used. In this case, as in the eighth aspect, it is desirable to produce, as the single color characteristic, a plurality of charts (color patches) in which color differences between the color of the medium in which colors are to be reproduced and colors to be formed by the maximum formation amount are substantially the same for each of the primary colors and obtain desired colors by using the produced charts.

According to the ninth aspect of the present invention, there is provided color reproduction method using a color reproduction apparatus in which color information values expressed by a first color space as predetermined colors are converted to device values expressed by a second color space different from the first color space and colors corresponding to the device values are output to reproduce the predetermined colors, the color reproduction method comprising: inputting a plurality of predetermined device values for each color of the second color space, measuring each of a plurality of output colors and obtaining intensity information values of colors to be output from the color reproduction apparatus based on color measuring values; obtaining a characteristic of conversion between the device value and the intensity information value for each color of the second color space based on a plurality of correspondences between the device value and the intensity information value, such that the plurality of correspondences are included and correspondences between the device value and the intensity information value except the plurality of correspondences are such that, of neighboring correspondences caused when the device values or the intensity information values are arranged from larger to smaller, any device value located between a device value of correspondence on one side, which value is small and a device value of correspondence on the other side, which value is large corresponds to any intensity information value located between an intensity information value of correspondence on one side, which value is small and an intensity information value of correspondence on the other side which value is large; and converting arbitrary color information value of respective colors of the determined color space to the device value by utilizing the obtained conversion characteristic.

According to the tenth aspect of the present invention, there is provided color reproduction method using a color reproduction apparatus based on additive mixture, in which color information values expressed by a first color space as predetermined colors are converted to device values expressed by a second color space different from the first color space and colors corresponding to the device values are output to reproduce the predetermined colors, the color reproduction method comprising: inputting a device value of single color of a predetermined value for each color of the second color space, measuring respective output colors, inputting a plurality of the device values for mixed color in which respective colors of the second color space are preliminarily determined, and measuring respective colors of a plurality of output colors; obtaining a characteristic of conversion between the device value and the intensity information value for each color of the second color space based on a plurality of correspondences between the device value and the intensity information value, such that the plurality of correspondences are included and correspondences between the device value and the intensity information value except the plurality of correspondences are such that, of neighboring correspondences caused when the device values or the intensity information values are arranged from larger to smaller, any device value located between a device value of correspondence on one side, which value is small and a device value of correspondence on the other side, which value is large corresponds to any intensity information value located between an intensity information value of correspondence on one side, which value is small and an intensity information value of correspondence on the other side which value is large; and converting arbitrary color information value of respective colors of the determined color space to the device value by utilizing the obtained conversion characteristic.

According to the eleventh aspect of the present invention, there is provided color reproduction method according to the ninth or tenth aspect, wherein spline function is determined by a correspondence between the device value and the intensity information value and the conversion characteristic is obtained by using the spline function.

According to the twelfth aspect of the present invention, there is provided color reproduction method according to any one of ninth through eleventh aspect, wherein a plurality of correspondences between the device value and the intensity information value, the plurality of correspondences being preliminarily obtained, utilize correspondences in which intervals between obtained intensity information values are of substantially the same.

In the ninth aspect, the color information value expressed by the first color space is converted to the device value expressed by the second color space different from the first color space and colors are output depending on the device value so that the color reproduction apparatus reproduces and outputs determined colors. The color reproduction apparatus includes display units such as CRT and printing machines such as color printer. The first color space includes a color space expressed by well known CIE calorimetric system and the second color space different from the first color space includes a color space expressed by RGB used in display unit or the like and a color space expressed by YMCK used in printing. The device values include digital signal values for displaying pictures on the display units and digital signal values for outputting prints on printing machines. A plurality of the device values preliminarily set for respective colors of the second color space are input and then respective colors of the plurality of output colors are measured. Based on these measuring values, intensity information values of colors to be output in the color reproduction apparatus are obtained. The intensity information value includes luminous intensity and luminance for such display units as CRT and color difference and CIELAB value for determining colors of output results for such printing machines as color printers.

Based on correspondences between the obtained plurality of the device values and intensity information values, conversion characteristic between the device values and the intensity information values including the plurality of correspondences is obtained for each of colors of the second color space. The correspondences between the device value and the intensity information value except the plurality of correspondences are such that, of neighboring correspondences caused when the device values or the intensity information values are arranged from larger to smaller, any device value located between a device value of correspondence on one side, which value is small and a device value of correspondence on the other side, which value is large corresponds to any intensity information value located between an intensity information value of correspondence on one side, which value is small and an intensity information value of correspondence on the other side which value is large. Consequently, the conversion characteristic between the device value and the intensity information value has a relation of monotonous increase. Thus, as regards the correspondence between the device value and the intensity information value, by interpolating from neighboring correspondence relation, a correspondence of that neighboring relation can be obtained. Because this conversion characteristic is in a relation of monotonous increase as mentioned previously, as in the eleventh aspect, spline function is determined by a correspondence between the device value and the intensity information value and then the conversion characteristic can be obtained by using the spline function.

Therefore, by using the obtained conversion characteristic, color information values of respective arbitrary colors of the first color space which do not exist in the preliminarily obtained correspondences can be converted to the device values. Because color information values of arbitrary colors can be converted to the device values without using any model expression, deterioration of accuracy due to a gap between the model expression and actual value does not occur. Further, because linear interpolation is not used to obtain a correspondence of neighboring relation, it is possible to achieve high accuracy with a small number of measuring data. Further, because the conversion characteristic between the color information value and the device value is obtained including the preliminarily obtained plurality of correspondences, always the preliminarily obtained plurality of the correspondences are possessed so that management of accuracy to be obtained is facilitated. Further, the conversion characteristic between the intensity information value and the device value is obtained such that a relation between the neighboring intensity information value and device value when the intensity information values and the device values are arranged in the order of size applies an intermediate value of the respective neighboring intensity information values and device values having a correspondence. Thus, a change (e.g. differential value) in each correspondence is positive or negative, so that vibration phenomenon which generally occurs in well known interpolation method such as spline interpolation does not occur, thereby obtaining a stable result.

In the tenth aspect, the color information values expressed by the first color space as predetermined colors are converted to the device values expressed by the second color space different from the first color space, colors corresponding to the device values are output so that the predetermined colors are reproduced by the color reproduction apparatus based on additive mixture and output. As a color reproduction apparatus based on the additive mixture, display units such as CRT are well known. The device value of a predetermined value of single color is input to the color reproduction apparatus for respective colors of the second color space and respective output colors are measured. At the same time, a plurality of device values in which each color of the second color space is determined preliminarily are input and a plurality of the output colors are measured. Consequently, the measuring values obtained by the device values of single colors and the measuring values obtained by the device values of mixed colors can be obtained. It is well known that the additive mixture is capable of estimating the chromaticity from the intensity information value such as luminous intensity by utilizing a matrix of 3×3. That is, if the intensity information values are integrated to a matrix of 3×3 in which the tristimulus values at maximum intensity of each color are elements, the chromaticity of measuring values can be obtained. If an inverse matrix of 3×3 is used, the luminous intensity or the like which is intensity information value can be obtained by integrating the measuring values. Therefore, by using the measuring values corresponding to the device values of single colors, the intensity information value, for example, the luminous intensity, of respective single colors to be output is obtained from the color reproduction apparatus based on the measuring values corresponding to the devices value of mixed color.

Then, based on the measuring values corresponding to the device values of single colors and the measuring values corresponding to the device values of mixed colors, the intensity information values, for example, the luminous intensities, which will be output from the color reproduction apparatus corresponding to respective device values of mixed color are obtained. As a result, correspondences between the device values and the intensity information values, of respective single colors the color mixing characteristic of which has been considered are obtained. Based on the obtained plurality of correspondences between the device values and the intensity information values, the conversion characteristic between the device value and the intensity information value including the plurality of the correspondences is obtained for respective colors of the second color space. The correspondences between the device value and the intensity information value except the plurality of correspondences are such that, of neighboring correspondences caused when the device values or the intensity information values are arranged from larger to smaller, any device value located between a device value of correspondence on one side, which value is small and a device value of correspondence on the other side, which value is large corresponds to any intensity information value located between an intensity information value of correspondence on one side, which value is small and an intensity information value of correspondence on the other side which value is large; and converting arbitrary color information value of respective colors of the determined color space to the device value by utilizing the obtained conversion characteristic. Consequently, the conversion characteristic between the color information value and the device value has a relation of monotonous increase. Thus, by interpolating the correspondence between the color information value and the device value from a relation of the neighboring correspondence, it is possible to obtain a relation of the neighboring correspondence. Because this conversion characteristic is in a relation of monotonous increase, spline function is obtained from the color information value and the device value and then the conversion characteristic can be obtained by using this spline function.

Thus, by obtaining the device value-intensity information value characteristic from the measuring values obtained when mixed color is output, the number of measuring points is reduced. If color information values in the vicinity of achromatic colors are used, it is possible to achieve excellent color reproduction in even display system in which the intensity information value such as the luminous intensity changes due to color mixing.

In the above color reproduction apparatus, as in the twelfth aspect, a plurality of correspondences between the device value and the intensity information value, the plurality of correspondences being preliminarily obtained, can utilize correspondences in which intervals between obtained intensity information values are of substantially the same. Thus, from the measuring values having substantially the same interval to a system of sensing colors, the correspondence between the device value and the intensity information value is obtained so that redundancy in measuring values can be avoided and deterioration of accuracy due to sparse intervals of the measuring values can be prevented.

BRIEF DESCRIPTION OF THE DRAWINGS

FIG. 11 is a flow chart of arithmetic operation processing routine to be executed in the color reproduction apparatus according to the present embodiment.

FIG. 16 is a diagram for showing g value for use in spline interpolation.

FIG. 19 is a flow chart of processing for introducing the single color characteristic.

FIG. 34 is a diagram showing a relation between L* of target achromatic colors in high brightness range used for evaluation of color reproduction accuracy and color difference ΔEab.

FIG. 35 is a diagram showing a composition of a color reproduction apparatus according to a second embodiment.

FIG. 36 is a diagram showing a conceptual composition of a micro computer.

FIG. 37 is a flow chart of table generation/storage processing according to the second embodiment.

FIG. 43A and FIG. 43B are diagrams showing a result of experiment for obtaining a relation between the signal value and the luminous intensity, which provides brightnesses having substantially the same interval for G color.

DESCRIPTION OF THE PREFERRED EMBODIMENTS

Hereinafter, an embodiment of the present invention will be described in details with reference to the accompanying drawings.

[Principle]

First, a principle of color reproduction will be explained about an arbitrary color.

Figure 1:
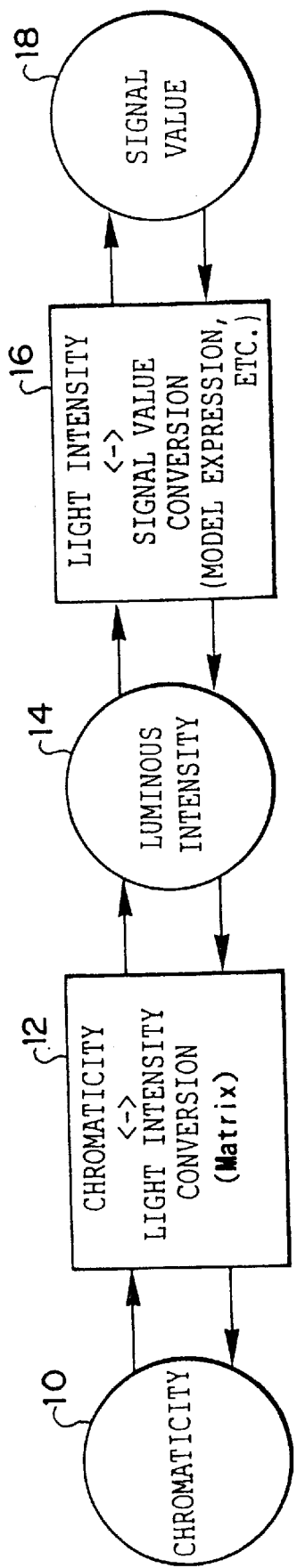
FIG. 1 is a block diagram showing a flow of general processing for displaying arbitrary color on CRT.
Figure 2:
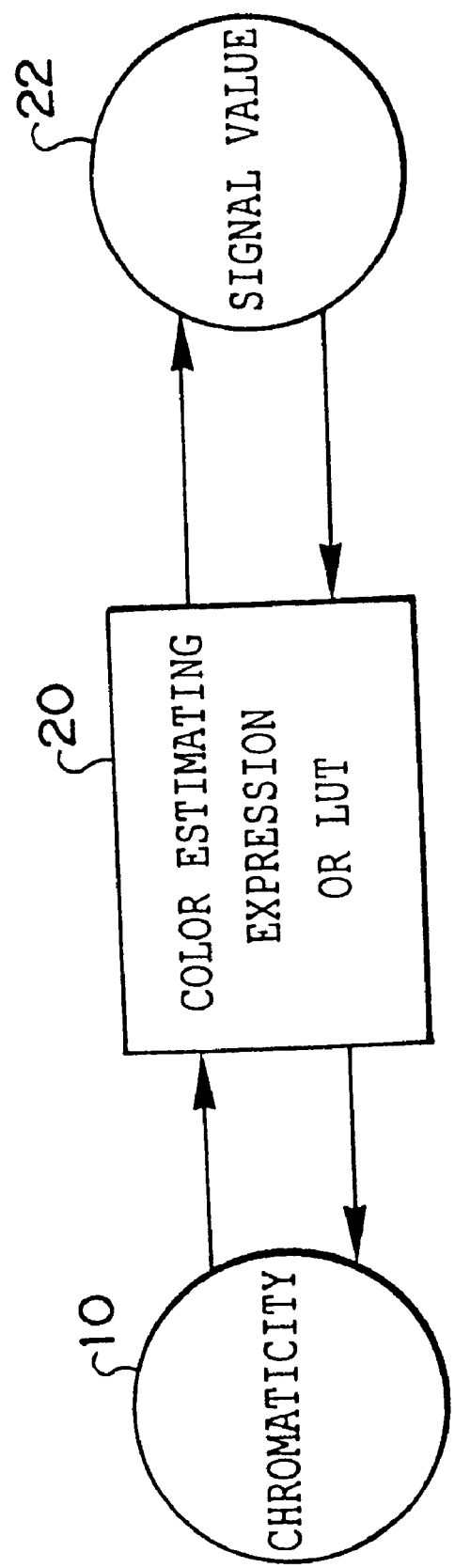
FIG. 2 is a block diagram showing a flow of processing for producing a hard copy having arbitrary chromaticity with a hard copy machine.
Figure 3:
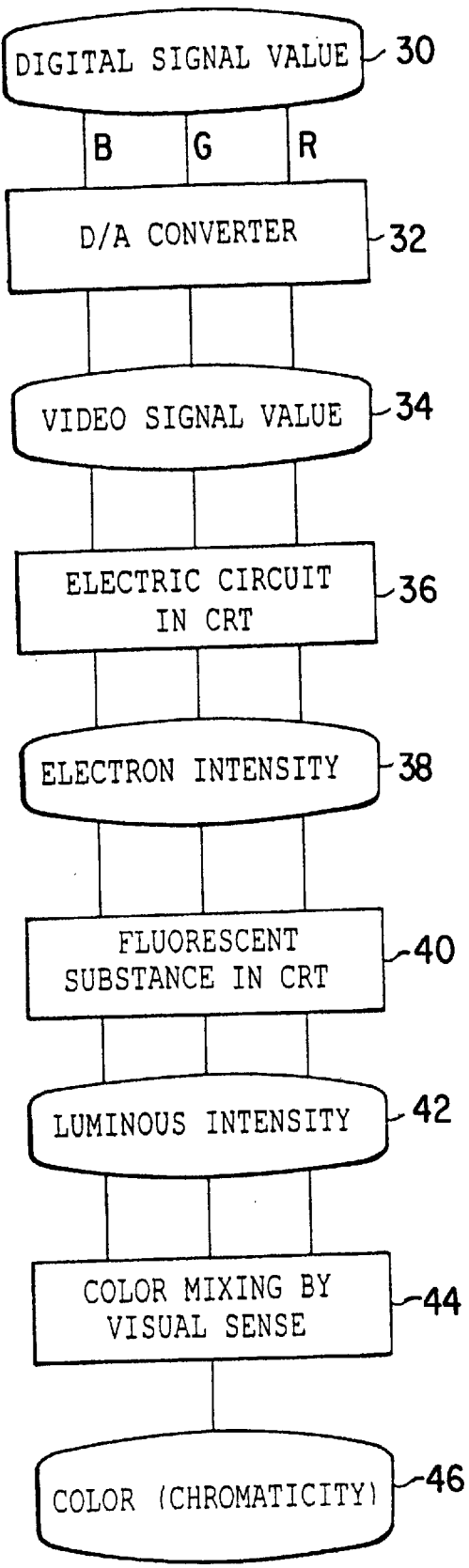
FIG. 3 is a conceptual diagram showing a color reproduction process from a step of displaying on the CRT with signal value indicating a color to a step of sensing of the color (chromaticity).

FIG. 3 shows a process of color reproduction from a step of displaying colors on CRT by signal values indicating the colors to a step of sensing of those colors (chromaticity).

Colors to be expressed on computer are often expressed by a signal value controlling light intensity of Red (hereinafter referred to as R signal value), a signal value controlling light intensity of Green (hereinafter referred to as G signal value) and a signal value controlling light intensity of Blue (hereinafter referred to as B signal value) A digital signal value 30 consisting of the R signal value, the G signal value and the B signal value is converted to an analog picture signal 34 by a conversion process 32 which is a processing of a D/A converter. This picture signal 34 is input to a CRT and converted to electron intensity 38 by a circuit process 36 which is a processing in an electric circuit (not shown) in the CRT. In the CRT, electrons are irradiated to fluorescent substances corresponding to electron intensity 38 so that light is emitted corresponding to an intensity of electrons irradiated by a light emitting process 40 of the fluorescent substance. Thus, respective fluorescent substances of RGB colors emit lights at their own light-emitting intensities 42. Lights emitted from these fluorescent substances are mixed (sensing process 44) by well known visual sensing if they are emitted at the same time so that they are recognized as a color (chromaticity) 46. It is generally known that these fluorescent substances have constant hue regardless of the luminous intensity. Thus, lights emitting by the fluorescent substances which is caused corresponding to the intensity of electron can be expressed to be that only scalar quantity changes in a determined vector direction in color space.

Figure 4:
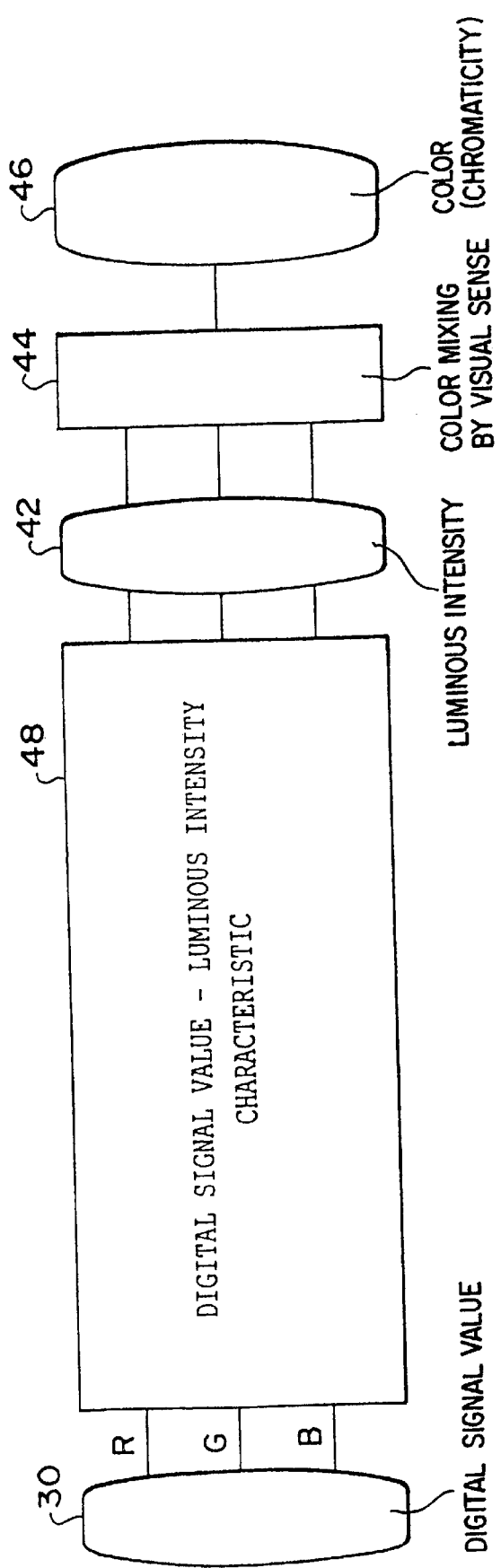
FIG. 4 is a diagram for showing that the process of FIG. 3 can be largely classified to conversion process and sensing process.

As shown in FIG. 4, the above-described process of color reproduction is divided to a conversion process 48 in which the signal value 30 is converted to the luminous intensity 42 of the fluorescent substance as intensity information value and a sensing process 44 in which the respective fluorescent substances emit lights at the luminous intensity 42 at the same time so that the respective lights are mixed so as to be recognized as color (chromaticity) 46.

In principle, a conversion process 48 exists independently for each of the RGB. Thus, it becomes possible to estimate the luminous intensity of the fluorescent substances from the signal value or estimate the signal value from the luminous intensity of the fluorescent substance by grasping a relation between the signal value and the light-emitting intensity of the fluorescent substance for each color.

On the other hand, the sensing process 44 is capable of estimating the chromaticity sensed from the luminous intensity of the fluorescent substance and estimating the luminous intensity of the fluorescent substance from the chromaticity according to a calculation with a matrix 3×3 by utilizing a fact that the hue of respective fluorescent substances is constant as described above and the principle of additive mixture. Thus, it is possible to estimate the chromaticity from the signal value or the signal value from the chromaticity.

However, some CRT systems which do not indicate an ideal behavior to additive mixture exist. For example, comparing a case in which each of the RGB colors is expressed in each single color by each predetermined signal value and a case in which the respective colors of the RBG colors are expressed at the same time by each predetermined signal value by mixing them, there sometimes occurs a case in which the luminous intensities of respective colors are different despite the same signal value. In this case, it is difficult to reproduce colors at a high precision with the luminous intensity/signal value characteristic obtained by measuring colors expressed by single color. That is, tristimulus values obtained by synthesizing (adding) tristimulus values obtained when respective colors of RGB colors are displayed in single color do not coincide with tristimulus values obtained when respective RGB colors are displayed at same time, so that mismatching occurs between tristimulus values obtained when respective single colors of RGB colors are displayed in single color and tristimulus values obtained when respective RGB colors are displayed at same time (mismatching of additive mixture). For example, if the signal value is assumed to be 127, as shown in the above inequality, the tristimulus values obtained by synthesizing tristimulus values of respective colors of RGB in single color sometimes coincide with the tristimulus values measured when the respective colors of RGB are displayed by mixing.

In accurate color reproduction with the CRT system, the same problem as in a case of a color reproduction apparatus based on subtractive mixture exists.

Figure 5:
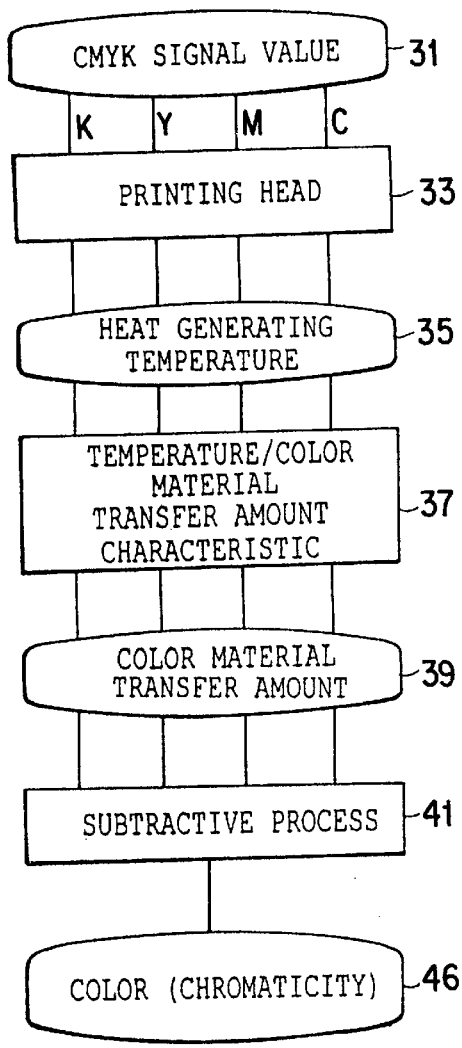
FIG. 5 is a conceptual diagram showing a color reproduction process in the color hard copy machine.
Figure 6:
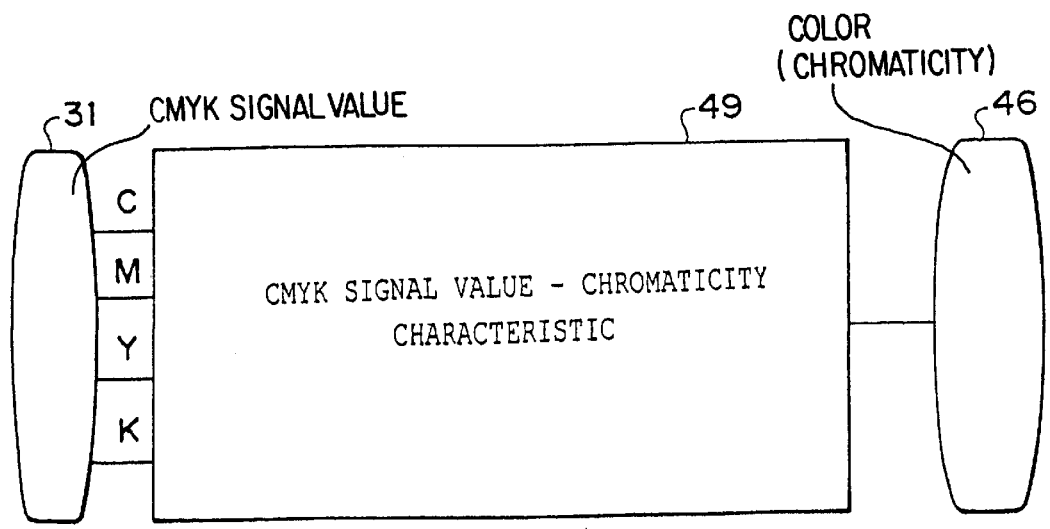
FIG. 6 is a conceptual diagram showing a conceptual composition for determining CMYK value by estimating a chromaticity of printing result.

FIG. 5 shows a process for color reproduction with a color printer as a hard copy machine. Here, an example of a heat sublimation type color printer using CMYK color materials as printing color material will be described. With respect to this color printer, a case in which color materials, cyan (C), magenta (M), yellow (Y, yellow is expressed as Ye if it is used as a single color in the description below to prevent it from being confused with Y in the tristimulus values) and black (K) are used as printing color materials will be described.

Signals of respective colors of CMYK are output from a computer to the color printer. These signal values 31 are converted to heat generating temperature 35 by a process in which they are converted to analog voltage by means of a D/A converter and a conversion process 33 of the printing head in which the printing head is heated by that voltage. In the heat sublimation type color printer, the heat generation temperature 35 of the printing head is converted to color material transfer amount 39 by a process in which sublimation type ink film is heated so that color material is sublimated to be transferred to a paper. The amount of color material to be transferred corresponding to the heat generation intensity (temperature) of the printing head is determined by the temperature/color material (dye) transfer amount characteristic of the sublimation type ink film. Because the color material (dye) transferred to a paper is semi-transparent, a color obtained by overlapping respective color materials (dye) indicates characteristic provided by subtractive mixture and is recognized as color (chromaticity) 46 by well known visual sensing (or measuring device) (subtractive mixture). In this subtractive mixture, a linear relationship is not established between the color material (or dye) transfer amount of the respective colors and a color to be sensed and the relation is very complicated. Further, for example in an apparatus which prints in the order of CMYK, actually there sometimes occurs a case in which color material (dye) of C is inversely transferred to the ink film when M is printed. Thus, analytical modeling is difficult. Although the analytical modeling is enabled to some extent for a subtractive mixture by using dots which is an area printing method for offset printing or the like, here general subtractive mixture is handled.

To achieve color reproduction at a high precision with such an apparatus, it is necessary to determine signal values of CMYK after estimating the chromaticity of printed colors and it is necessary to grasp a relation between the signal values of CMYK and chromaticity (CMYK signal value chromaticity characteristic 49). For this purpose, statistical methods or a method of interpolation in three dimensional space have been used.

Figure 7:
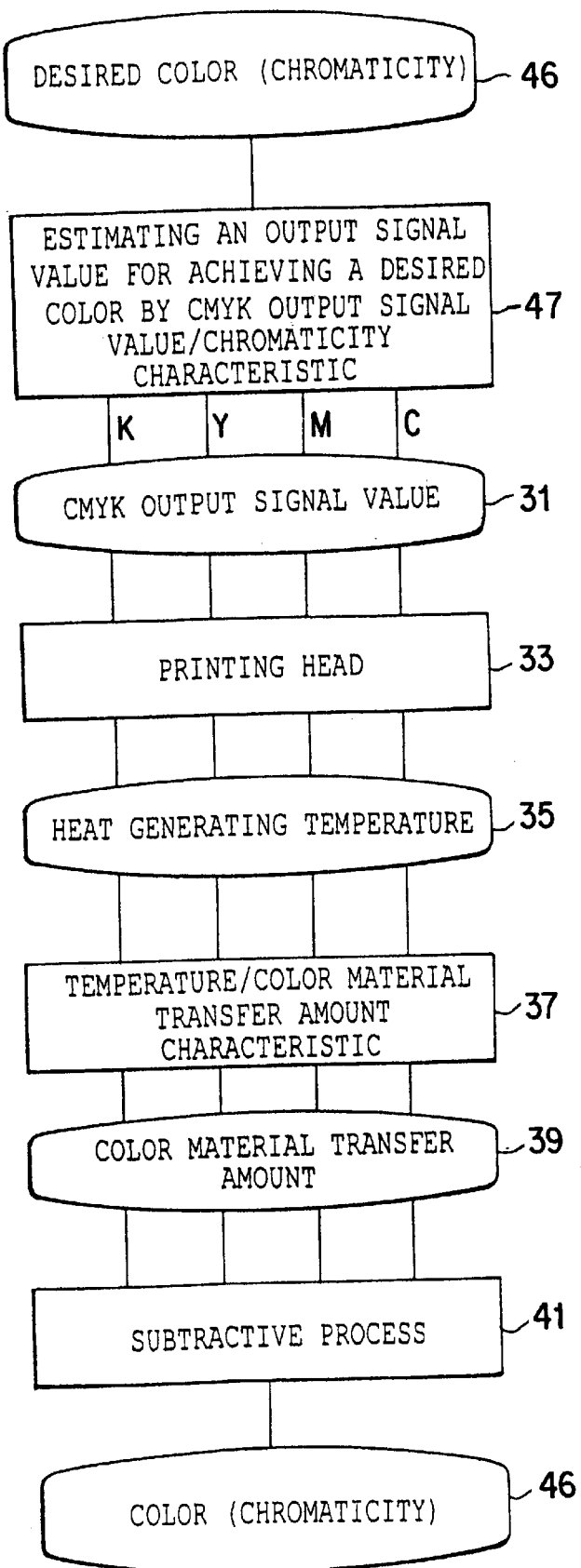
FIG. 7 is a conceptual diagram showing details of a process of color reproduction by estimating the chromaticity of printing result in the color hard copy machine.

By grasping this relation, it is possible to estimate the signal values of CMYK which represent a chromaticity from arbitrary chromaticity. Thus, a process for estimating a relation between the signal values of CMYK which can reproduce this arbitrary chromaticity and that chromaticity should be obtained. That is, as shown in FIG. 7, a desired color is converted to CMYK output signal value 31 by a conversion process 47 which estimates the CMYK output signal value for reproducing the desired chromaticity value 46A. Consequently, the desired chromaticity value 46A is estimated as the CMYK output signal value for reproducing that chromaticity. By providing the color printer with the output signal value, a predetermined chromaticity print image is obtained. That is, the converted CMYK output signal value 31 reach a subtractive mixture 41 so that it is recognized as a color (chromaticity) 46.

[First Embodiment]

Next, an embodiment in which the present invention is applied to color reproduction in the sublimation type color printer as a hard copy apparatus in which subtractive mixture can be established will be described in details. This embodiment will be described by taking a sublimation type printer as an example, as a 8-bit system printing apparatus using cyan, magenta, yellow and black as primary colors. Although this embodiment will be described by taking the sublimation type printer as an example, this embodiment is not restricted to this but can be applied to ink jet type printers, bubble jet type printers and thermal transfer type printers.

Figure 8:
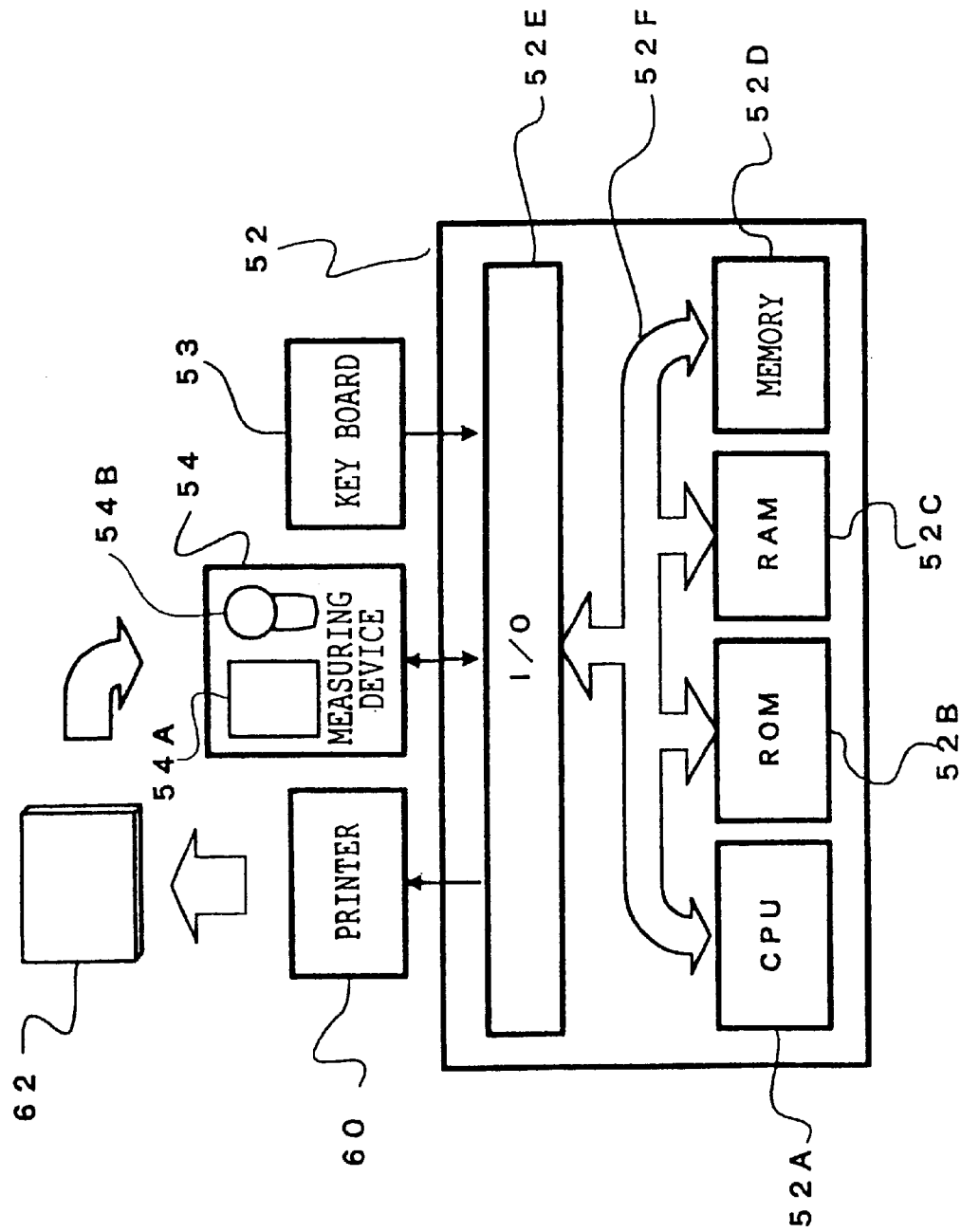
FIG. 8 is a block diagram showing a substantial composition of a color reproduction apparatus according to the present embodiment.

As shown in FIG. 8, a color reproduction apparatus according to this embodiment comprises a color printer 60, a micro computer 52, a key board 53 which is an input device for inputting instructions for executing processing programs which will be described later and data, and a color measuring device 54. The key board 53, the color measuring device 54 and the color printer 60 are connected to the micro computer 52. This micro computer 52 comprises CPU52A, ROM52B, RAM52C, memory 52D for storing tables and processing routines which will be described later and I/O device (I/O) 52E. A bus 52F for enabling transmission and reception of data and commands is connected to these components. The key board 53 is connected to this I/O device 52E and the color printer 60 and the color measuring device 54 are also connected thereto. The color printer 60 outputs print 62 in which colors depending on signals input from the micro computer 52 are formed. The color measuring device 54 comprises a drive unit 56 for moving or scanning the print 62 in which colors are formed and a probe 56B which functions as a color measuring sensor synchronously with the moving or scanning of the drive unit. The color measuring device 54 automatically measures colors formed on the print 62 by input of control signals from the micro computer 52 and outputs to the micro computer 52. Meanwhile, the present invention is not restricted to automatic measuring of printed colors (chromaticity) by means of the color measuring device 54 but can use data in which colors are measured manually. In this case, data obtained by measuring colors manually may be input through the key board or the color measuring device 54.

[Operation of the Embodiment]

Next, an operation of this embodiment will be described.

An image of arbitrary chromaticity is formed by mixing color materials of CMYK by each predetermined transfer amount (including formation by overlapping). The transfer amount of the color material corresponds to the signal value and can be determined independently for each color material. Further, a color obtained by mixing colors is considered to correspond to the color material transfer amounts of the respective color materials. Then, the inventor of the present invention has found that by separating these two relations, it is possible to achieve high precision color reproduction even with a small number of measuring points.

That is, it is possible to determine a relation between the signal value and the chromaticity from a relation of color material transfer amount with respect to the signal value when respective inks are printed in each single color and a characteristic of chromaticity (thereafter referred to as color mixing characteristic) with respect to the respective ink amounts used in mixing a plurality of the inks. The inventor has found that color reproduction at high precision can be achieved by separating the single color characteristic and the color mixing characteristic.

Figure 9:
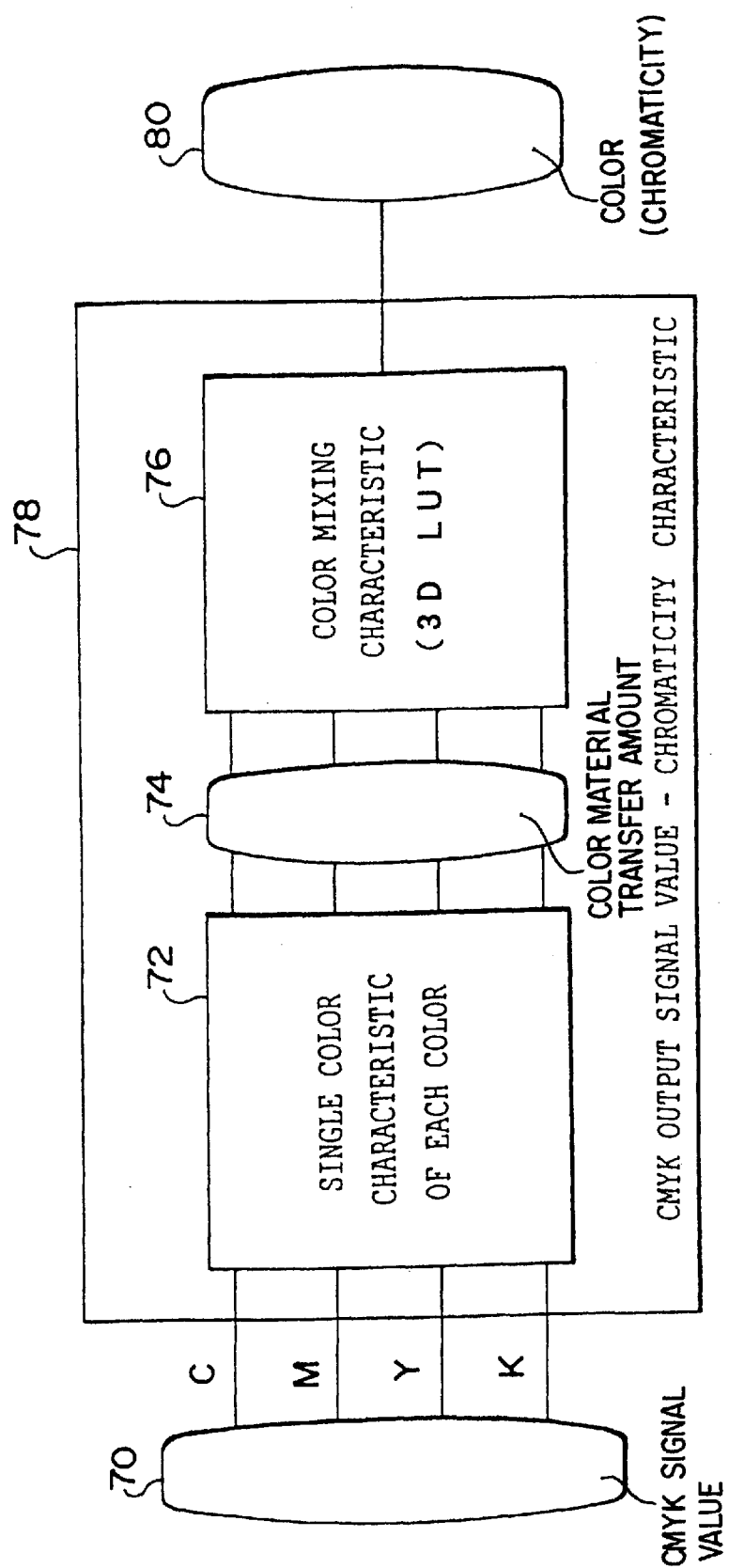
FIG. 9 is a conceptual diagram showing a conceptual composition of the color conversion table.

Then, according to this embodiment, as shown in FIG. 9, as a means for conversion between the signal value 70 of CMYK and an arbitrary chromaticity 80, the color material transfer amount 74 which is a physical quantity is handled as an intermediate amount. Then, single color characteristic indicating a relation of the color material transfer amount 74 with respect to the signal value 70 and color mixing characteristic indicating a relation between the color material transfer amounts (ink amount) of a plurality of inks and the chromaticity 80 are obtained. By synthesizing the obtained single color characteristic 72 and color mixing characteristic 76, signal value/chromaticity characteristic is obtained as a color conversion table 78. By obtaining the single color characteristic and the color mixing characteristic separately and using the color conversion table 78 based on these characteristics, it is possible to determine a relation between the signal value and the chromaticity so that high precision color reproduction is achieved.

This color conversion table (3D-LUT) is a collection of information indicating a relation between ink color which gives an arbitrary chromaticity CIELAB value and ink level. Obtaining this 3D-LUT means obtaining the ink color giving an arbitrary chromaticity and ink level. By the way, the number of combinations of the ink color and ink level is finite (the number of the ink colors is finite and the ink level is a discrete value having a upper limit and a lower limit). Substantially, a chromaticity nearest an arbitrary chromaticity is selected from "the finite chromaticities". Therefore, it is possible to obtain the 3D-LUT by obtaining a relation between finite arbitrary ink colors/ink level and chromaticity.

Although a simple and high precision method for obtaining this 3D-LUT is producing and measuring samples with respect to all combinations of the ink colors and ink levels and then obtaining a relation between the finite chromaticity and the ink color/ink level, this method requires a tremendous amount of samples so that load for processing of that data is tremendous.

Therefore, according to this embodiment, a relation between arbitrary ink color/ink level and chromaticity is estimated from a result of measurement on a small number of samples and then a relation between the finite chromaticity and the ink color/ink level is determined based on that estimation result. The detailed method will be described below.

[Definition of Single Color Characteristic and Color Mixing Characteristic]

Figure 10:
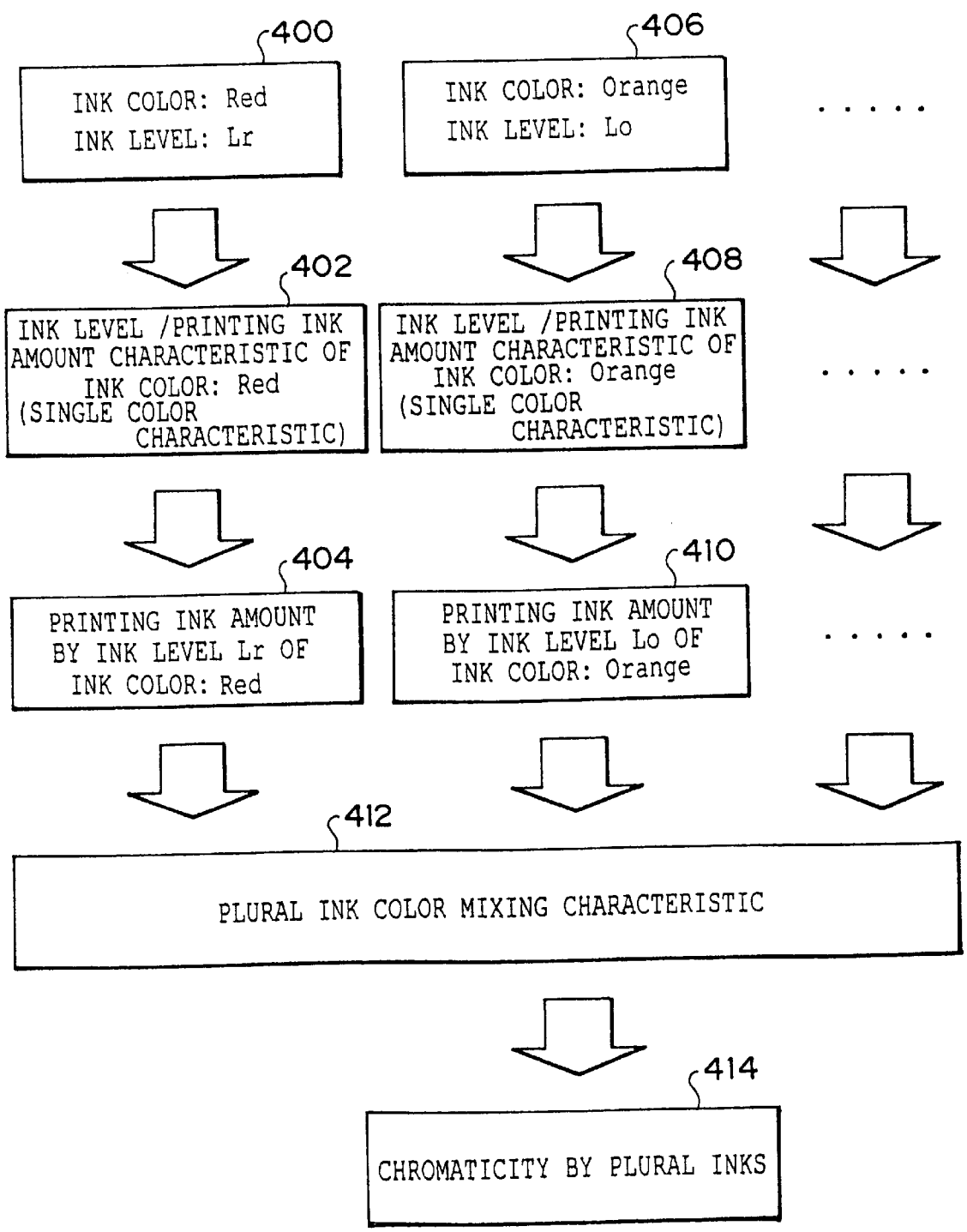
FIG. 10 is a conceptual diagram showing a process until ink level is converted to chromaticity.

FIG. 10 shows a process in which the ink level is converted to color. Ink level Lc of cyan (C) which is data 400 is converted to printing ink amount by ink level/printing ink amount characteristic 402. More specifically, the ink level/printing ink amount characteristic is determined in a process of ink level→heat generated by the printing head→ink amount to be printed. Likewise, magenta (406, 408, 410) and other colors are also converted so that the printing ink amounts of the respective colors are determined. After that, by the color mixing characteristic 412 which is a characteristic obtained when the respective color inks are overlapped, a final color is determined so that its chromaticity 414 is obtained.

The relation between the ink level and printing ink amount is affected by a state (color mixing condition) of mixing colors as described above. That is, between a case in which print is made on a surface where something has been already printed and a case in which print is made on a surface where nothing is printed, the amount of ink to be applied differs even despite the same ink level. Sometimes, by printing another color after an arbitrary color is printed, the ink printed in advance is reduced (inversely transferred to an ink sheet used for printed later).

According to this embodiment, the characteristic of ink level/printing ink amount when respective ink colors are printed in each single color is called single color characteristic and the relation between the printing ink amount based on the single color characteristic and the chromaticity resulting from color mixing is called color mixing characteristic. A phenomenon caused by an actual change in printing ink amount as described above is handled as the color mixing characteristic. This separation has such advantages in that the complicated color mixing characteristic is simplified and an accuracy of interpolation is improved and it is easier to correspond to changes in ink sheet characteristic due to a difference in production lot.

When obtaining an actual sublimation ink amount in a sublimation type printer for the single color characteristic, chemical analysis is necessary so that this method is not practical. Thus, according to this embodiment, instead of the ink amount, a difference in chromaticity measured from white color of paper is utilized. The color difference obtained by a maximum ink level is standardized so as to be 1.0. Thus, the single color characteristic according to this embodiment indicates a relation between the standardized color difference from the white color of paper capable of providing respective ink levels and the ink level.

Hereinafter, a process for outputting images by reproducing arbitrary colors will be described by introducing the single color characteristic 72, the color mixing characteristic 76 and the color conversion table 78.

If the color reproduction apparatus according to this embodiment is turned ON, a processing routine shown in FIG. 11 is executed. A color conversion table 78 about YMCK is generated as described later and this is stored in a memory of the micro computer 52 (step 100). To output a desired color for each picture element, a correspondence between the signal value and the chromaticity is obtained and a color arithmetic operation for printing is executed (step 102). This procedure is repeated until the processing of step 102 is terminated for all the picture elements (step 104). If this routine is terminated, a print 62 in which a desired color is formed is output from the color printer 60.

Next, generation of the table (processing at step 100 in FIG. 11) and color arithmetic operation (processing at step 102 in FIG. 11) according to this embodiment will be outlined. The color conversion table generated according to this embodiment indicates a correspondence of respective signal values to arbitrary color (chromaticity) for obtaining respective color material amounts of YMCK colors.

Figure 12:
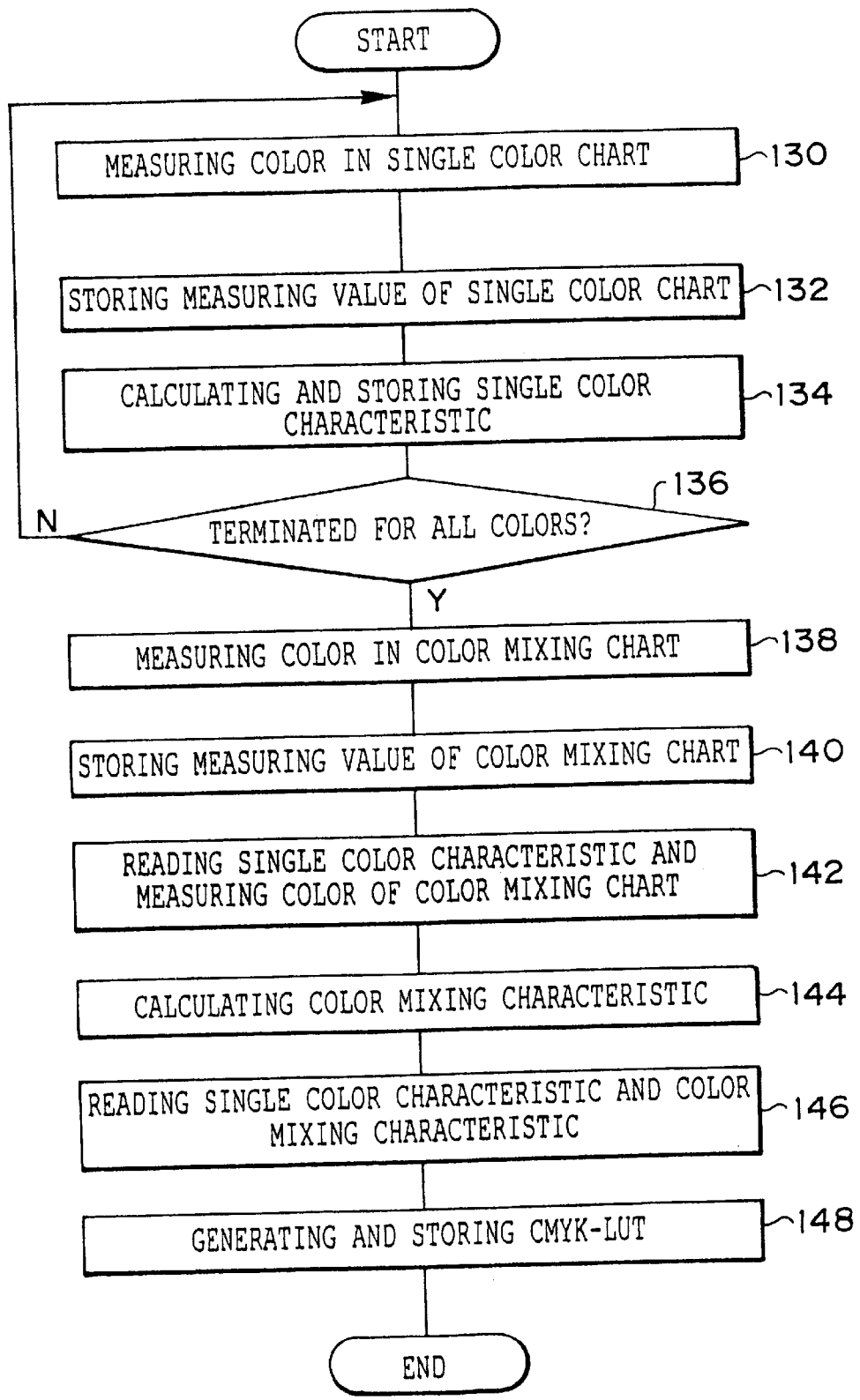
FIG. 12 is a flow chart of processing for generating the color conversion table.

FIG. 12 shows a flow of processing for producing the color conversion table (3D-LUT) capable of color reproduction with four color materials corresponding to step 100.

First, at step 130, the single color chart (described in detail later) of each color material having a single color, which is preliminarily produced by the printer 60 is measured by the measuring device 54 which is a color measuring device which automatically measures the chromaticity of each color. At next step 132, the measured value is stored in the memory of the measuring device 54 as single color measuring data. At next step 134, the single color characteristic indicating a relation between the signal value and the color material transfer amount is obtained by using the stored single color measuring data and the obtained single color characteristic is memorized. This calculation for the single color characteristic is conducted independently for each color (step 136). Although if More specifically, it is desirable to use the spline function increasing monotonically which will be described later, this is not always limited.

After the single color characteristic is obtained (affirmative determination at step 136), at step 138, respective color mixing charts (described in detail later) preliminarily produced are measured by the measuring device 54 which is a color measuring device and at next step 140, the measured value is stored as mixing color measuring data. At next step 142, the memorized single color characteristic and mixing color measuring data are read. At step 144, the color mixing characteristic (indicating a relation of respective color material transfer amounts of CMYK with respect to arbitrary chromaticity) is obtained by using the single color characteristic and the mixing color measuring data. This calculation of the color mixing characteristic comprises a process (described in detail later) of converting the signal value of each color material in the color mixing chart to the color material transfer amount (color difference from white color of paper) using the single color characteristic and a process of estimating a combination of the color material transfer amounts for a chromaticity not measured by using the color material transfer amount and the measuring data (chromaticity). Although the latter process of estimating the combination is desired to be made by introducing the color material transfer amount instead of an output signal value mentioned in a method described in Japanese Patent Application Laid-Open (JP-A) No. 7-50760 which this inventor has already applied, this is not always limited but it is permissible to estimate a combination of the color material transfer amounts for a chromaticity not measured by making linear interpolation about a plurality of the color material transfer amounts and the chromaticity in three dimensional space.

At step 146, the single color characteristic and the color mixing characteristic are read and at step 148, the 3D-LUT (indicating combinations of output signals of respective colors of CMYK with respect to arbitrary chromaticity) which is the color conversion table is obtained by synthesizing the above single color characteristic and the color mixing characteristic. More specifically, by converting the color material transfer amount obtained for each chromaticity to the signal value in accordance with the single color characteristic, combinations of the signal values of respective colors of CMYK with respect to a plurality of chromaticities are obtained.

Figure 13:
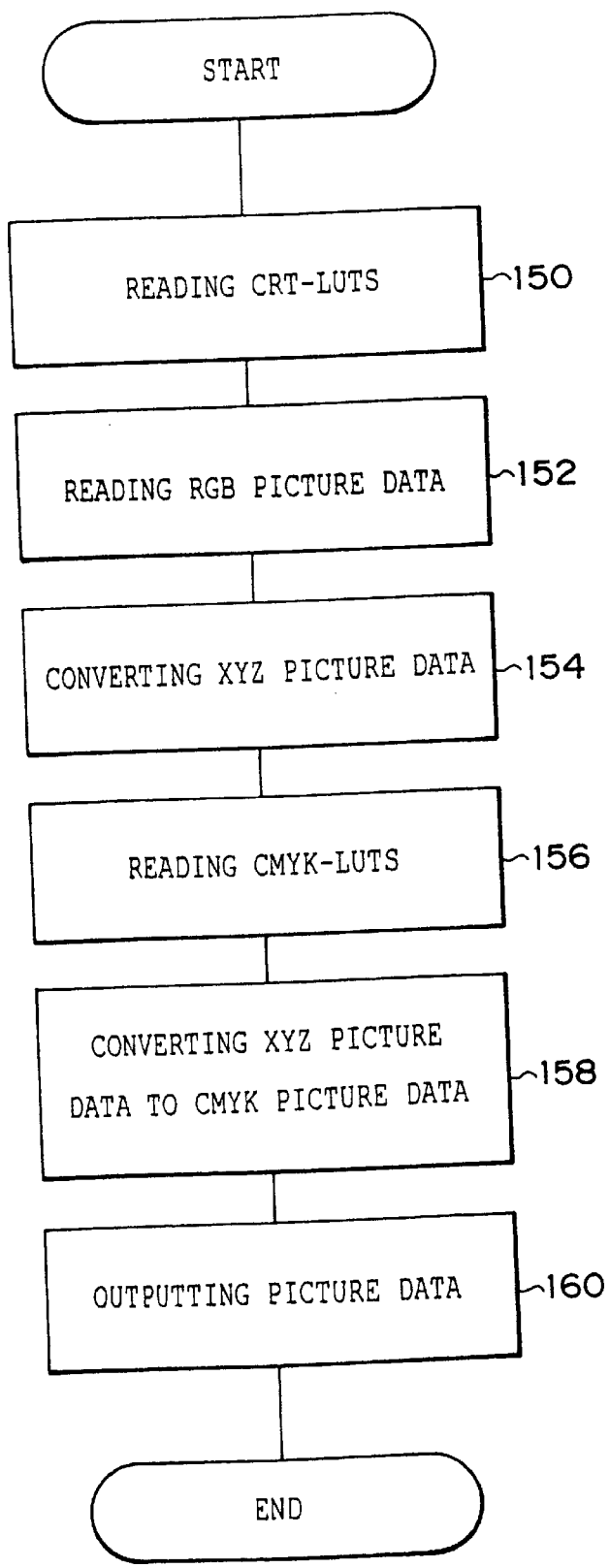
FIG. 13 is a flow chart of processing for printing a picture.

FIG. 13 shows a flow of processing for printing images corresponding to step 102. First, at step 150, the CRT-LUT in which the CRT characteristic for displaying the RGB pictures optimally is read and then at step 152, an image to be printed which is expressed by the RGB values is read. At step 154, the RGB values of the RGB picture are converted to a XYZ picture based on tristimulus values by utilizing the CRT-LUT read previously. This conversion is made by using the spline function increasing monotonically and a matrix. Meanwhile, this is not restricted to using the spline function increasing monotonically and the matrix, but it is permissible to use other function and matrix. If a picture to be output is the XYZ picture expressed by the tristimulus values, the processing at this step 154 is not necessary. At step 156, the 3D-LUT which will be described later is read and at step 158, the tristimulus values of the XYZ picture is converted to CMYK signal values by using the read 3D-LUT to obtain the CMYK picture. At step 160, the CMYK signal values of the CMYK picture is output and printed. Meanwhile, usually the picture is printed after a particular treatment such as picture enlargement processing possessed by the color printer is made.

[Three Dimensional Spline Interpolation Method for y=f(x) Increasing Monotonically Next, the spline interpolation for obtaining a relation between the aforementioned signal value and the color material transfer amount will be described. Here, the spline interpolation about the function (y=f(x)) increasing monotonically with two variables (x, y) which have a relation of function will be described.

First, assume that the two variables (x, y) having a relation of function have n values (x[j], y[j]; j=0, 1, . . . , n−1) exist and these two variables (x, y) increase monotonically (x[j] <=x[j+1], y[j]<=[j+1]).

The interpolation of these two variables (x, y) with the spline function can be expressed in the following expression.

$$y = f(x) \qquad (2)$$
$$= \sum_{i=0}^{2n-1} N[i, 4, x]p[i]$$

where,
n: a number which is a value which can become original data for the interpolation.

i: 0,1, . . . ,2n−1

In the expression (2) above, N[i,4,x] is determined by an element u[i] which is obtained from a value x[j] as described later and p[i] is determined by an element c[i] and N[i,4,x] which are obtained from a value y[j] as described later. This variable p[j] can be obtained in the following manner.

The element which is obtained from the value y[j] in a manner described later is assumed to be c and its matrix is assumed to be C. A matrix of N[i,4,x[j]] relating to each value x[j] and each i is assumed to be N and a matrix of element p[i] is assumed to be P. Then, a relation shown by the following expression (3) is provided.

$$C = N \cdot P \qquad (3)$$

Because the matrix C, N can be determined by the value y [i], the matrix P is established by the following expression (4).

$$P = N^{-1} \cdot C \qquad (4)$$

The element p[i] can be obtained from this matrix P. Thus, the value y can be obtained from N[i,4,x] relating to each i and the element p[i] by using the expression (2).

Figure 14:
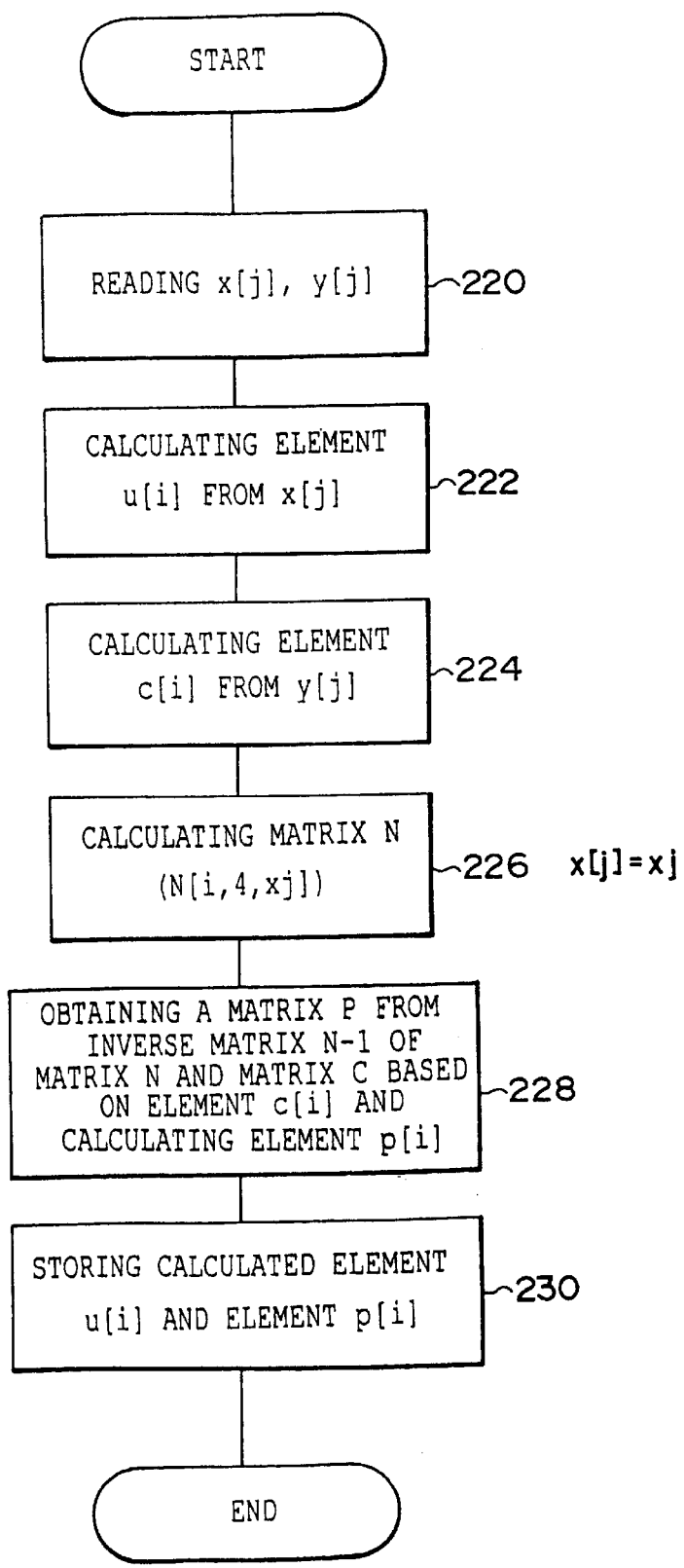
FIG. 14 is a flow chart of pretreatment for spline interpolation.

A processing for obtaining a parameter N[i,4,x] and a parameter p[i] of this spline function will be described with reference to FIG. 14. First, at step 220 of FIG. 14, values x[j], y[j] are read. At step 222, an element u[i] of a matrix having (2n+4) rows is calculated from the value x[j] as shown in [definition 1].

[Definition 1]
u[0]=x[0]
u[1]=x[0]
u[2]=x[0]
u[3]=x[0]
u[4]=x[1]
u[5]=x[1]
u[(j−1)·2+4]=x[j]
u[(j−1)·2+4+1]=x[j]
where w≦j≦(n−2)
u[(n−2)·2+4]=x[n−1]
u[(n−2)·2+4+1]=x[n−1]
u[(n−2)·2+4+2]=x[n−1]
u[(n−2)·2+4+3]=x[n−1]

At next step 224, as shown in [Definition 2], an element c[i] of a matrix having (2n−1) rows is calculated from a measuring value y[j].

[Definition 2]
c[0]=y[0]
c[0]=left end condition (g value of value x[0] is set to arbitrary value)
c[2]=y[1]
c[3]=g value of value x[1]
c[j·2]=y[j]
where 2≦j≦(n−2)
c[j·2+1]=g value of value x[j]
where 2≦j≦(n−2)
c[(n−1)·2]=y[n−1]
c[(n−1)·2+1]=right end condition (g value of value x[n−1] is set to arbitrary value)
where g value is obtained from the expression (5).

$$g = Dy[i]/Dxy[i] \qquad (5)$$

The Dy[i] and Dxy[i] indicate a distance in y direction and a linear distance between a point (x[i−1], y[i−1]) and a point (x[i+1], y[i+1) which are points before and behind the point (x[i], y[i]). In spline interpolation, the g value has a linear gradient at the point (x[i], y[i]) as shown in FIG. 16. If the value g is determined by using the expression (5), a gradient at a point (x'[i], y'[i]) resulting from the interpolation coincides with a gradient of a line connecting points which are before and behind that point.

At step 226, as shown in Table 1, respective elements of the matrix N having 2n rows, 2n columns are calculated.

TABLE 1

[Matrix N]

| $N[0, 4, x_0]$ | $N[1, 4, x_0]$ | ... | $N[i, 4, x_0]$ | ... | $N[2n-1, 4, x_0]$ |
|---|---|---|---|---|---|
| $N'[0, 4, x_0]$ | $N'[1, 4, x_0]$ | ... | $N'[i, 4, x_0]$ | ... | $N'[2n-1, 4, x_0]$ |
| $N[0, 4, x_1]$ | $N[1, 4, x_1]$ | ... | $N[i, 4, x_1]$ | ... | $N[2n-1, 4, x_1]$ |
| $N'[0, 4, x_1]$ | $N'[1, 4, x_1]$ | ... | $N'[i, 4, x_1]$ | ... | $N'[2n-1, 4, x_1]$ |
| . | . | | . | | . |
| . | . | | . | | . |
| . | . | | . | | . |
| $N[0, 4, x_j]$ | $N[1, 4, x_j]$ | ... | $N[i, 4, x_j]$ | ... | $N[2n-1, 4, x_j]$ |
| $N'[0, 4, x_j]$ | $N'[1, 4, x_j]$ | ... | $N'[i, 4, x_j]$ | ... | $N'[2n-1, 4, x_j]$ |
| . | . | | . | | . |
| . | . | | . | | . |
| . | . | | . | | . |
| $N[0, 4, x_{n-1}]$ | $N[1, 4, x_{n-1}]$ | ... | $N[i, 4, x_{n-1}]$ | ... | $N[2n-1, 4, x_{n-1}]$ |
| $N'[0, 4, x_{n-1}]$ | $N'[1, 4, x_{n-1}]$ | ... | $N'[i, 4, x_{n-1}]$ | ... | $N'[2n-1, 4, x_{n-1}]$ |

The respective elements N[i,4,x], N'[i,4,x] of the matrix N above are obtained from the expression (6).

$$N[i, k, x] = \frac{x - u[i]}{u[i + k - 1] - u[i]} \cdot N[i, k - 1, x] + \frac{u[i + k] - x}{u[i + k] - u[i + 1]} \cdot N[i + 1, k - 1.x] \quad (6)$$

Where when k=1, x ≠u[2n+4−1] and when (u[i]<[i+1] and [i]≦x<u[i+1]), 1.0 is set and in other cases, 0.0 is set. Further, when k=1 and x=u[2n+4−1] and when (u[i]<u[j+1] and u[i]<x≦u[i+1], 1.0 is set and in other cases, 0.0 is set.

On the other hand, N'[i,k,x] is obtained from the expression (7).

$$N'[i, k, x] = (k - 1) \cdot \left\{ \frac{1.0}{u[i + k - 1] - u[i]} \cdot N[i, k - 1, x] - \frac{1.0}{u[i + k] - u[i + 1]} \cdot N[i + 1, k - 1, x] \right\} \quad (7)$$

The processing for obtaining the respective elements of the matrix is a recurrent processing (recurrence formula) and N[i,1,x], N[i,2,x] and N[i,3,x] must be obtained to obtain N[i,4,x]. In this case, x is a signal value obtained by measurement, i is from 0 to 2n−1 and the u[i] for use in this processing is obtained in the above method.

At step 228, the matrix P is calculated from an inverse matrix $N^{-1}$ of the matrix N and a matrix C based on a variable c[i]. That is, the matrix P is calculated from a determinant shown in the expression (6) above. The variable p[i] can be obtained from this matrix P.

At step 230, the calculated element u[i] and the element p[i] are stored in the memory.

Figure 15:
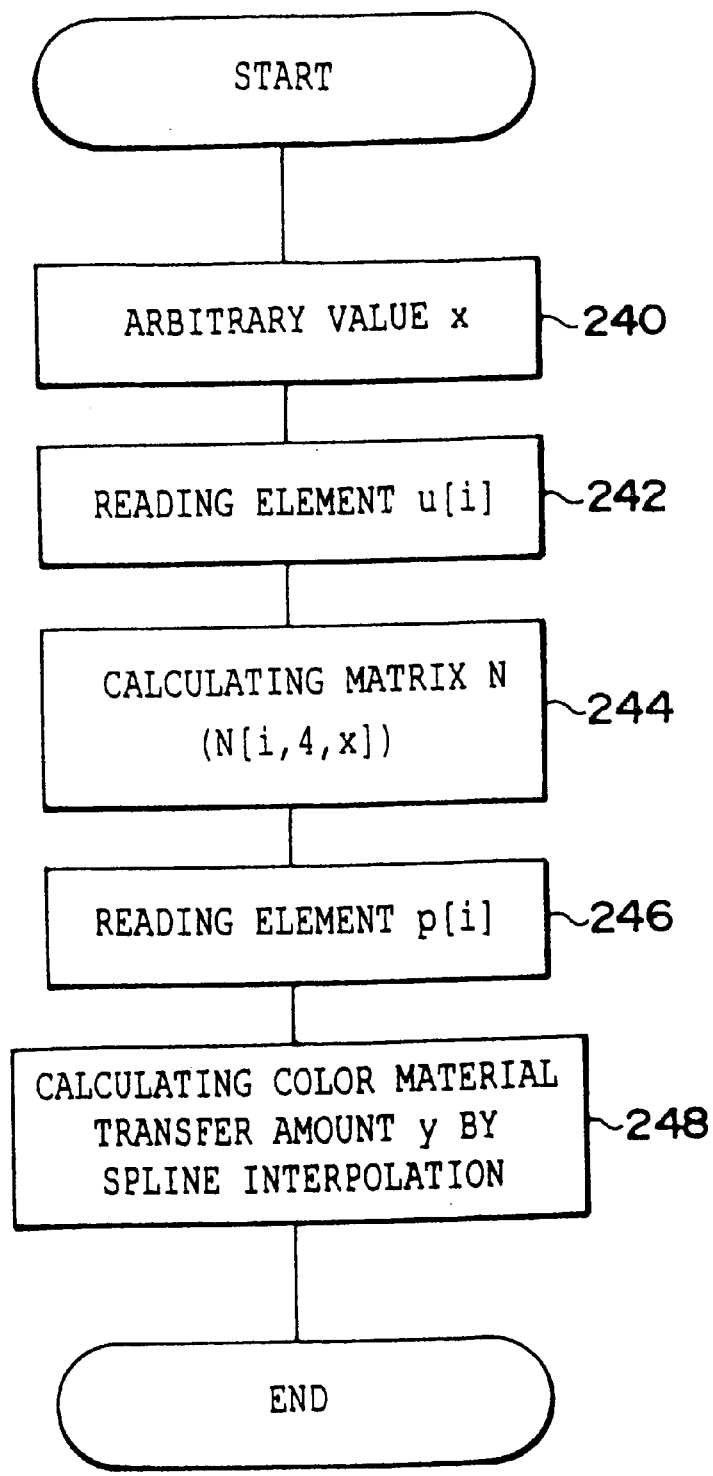
FIG. 15 is a flow chart of arithmetic operation processing for obtaining a color material transfer amount corresponding to arbitrary signal value.

Next, a calculation of the color material transfer amount corresponding to arbitrary signal value will be described with reference to FIG. 15. At step 240 of FIG. 15, arbitrary signal value x is read. At step 242, the element u[i] stored in the memory at step 230 of FIG. 14 is read. At step 244, the element N[i,4,x] is obtained as described above, with i being from 0 to 2n−1. That is, the matrix N having 2n rows and 1 column which is from i=0 to 2n−1 is obtained. At step 246, the element p[i] is read and at step 248, the color material transfer amount y is calculated by using the expression (4) expressing the spline function.

As described above, relative color material transfer amounts of all the signal values are obtained. That is, with respect to all signal values from 0 to 255, their color material transfer amounts can be obtained according to the spline function (see the expression (4)) which uses the element N[i,4,x] and p[i] which are parameters.

[CIELAB Taking Into Account Observation Light Source Color]

Next, a concept of CIELAB conversion taking into account observation light source color will be described. In this embodiment, when reproducing colors with a color printer, the CIELAB value taking into account observation light source color is used without directly operating the tristimulus values.

The tristimulus values (X,Y,Z) of a picture indicate a color of reflection from an object which is irradiated by an arbitrary light source. In a description below, the tristimulus values (X,Y,Z) will be abbreviated as tristimulus value. Thus, a color which should be reproduced by the print (hard copy) which is an output from the color printer or the like to obtain an reproduced picture from a picture is not a reproduction of just the color of a real object but a color by reflection or a color produced by reflection as a result of irradiating the object by arbitrary light source.

On the other hand, the print is always observed under arbitrary light source. That is, a color of the print is sensed under the observation light source. Thus, an object of substantial color reproduction is that a color sensed under an environment (under a light source) as a result of irradiating an object by the light source is reproduced on the print under the observation light source for the print. Therefore, to achieve color reproduction at high precision, adaptation to the environment by the light source should be considered. Then, in color reproduction according to this embodiment, it is assumed that the colors should be expressed at a corresponding chromaticity in the CIELAB space in which the light source color is white as standard. That is, the tristimulus value of a picture is converted to the CIELAB value including the observation light source in the following manner.

The tristimulus value of a picture can be expressed in the next expression (8). Although actually geometric quantity of light is necessary, a description thereof is omitted to avoid complicatedness.

$$X_0 = K_0 \cdot \int S_0(\lambda) \cdot R_0(\lambda) \cdot \bar{x}(\lambda) d(\lambda)$$

$$Y_0 = K_0 \cdot \int S_0(\lambda) \cdot R_0(\lambda) \cdot \bar{y}(\lambda) d(\lambda)$$

$$Z_0 = K_0 \cdot \int S_0(\lambda) \cdot R_0(\lambda) \cdot \bar{z}(\lambda) d(\lambda) \quad (8)$$

where $K_0$: coefficient for standardizing luminance level (inverse number of luminance of a complete diffusion white board directed in such a direction that illuminance is maximum)

$S_0(\lambda)$: spectral reflectance of a light source at real place $R_0(\lambda)$: spectral reflectance of a reflecting object at real place $\bar{x}(\lambda), \bar{y}(\lambda), \bar{z}(\lambda)$: spectral tristimulus values Further, this tristimulus value can be converted to the CIELAB value in the following expressions (9), (10).

$$X'_0 = \frac{X_0}{\int S_0(\lambda) \cdot \overline{x}(\lambda) d\lambda} \quad (9)$$

$$Y'_0 = \frac{Y_0}{\int S_0(\lambda) \cdot \overline{y}(\lambda) d\lambda}$$

$$Z'_0 = \frac{Z_0}{\int S_0(\lambda) \cdot \overline{z}(\lambda) d\lambda}$$

$$L^*_0 = 116 \cdot Y_0'^{\frac{1}{3}} - 16 \quad (10)$$

$$a^*_0 = 500 \cdot \left( X_0'^{\frac{1}{3}} - Y_0'^{\frac{1}{3}} \right)$$

$$b^*_0 = 200 \cdot \left( Y_0'^{\frac{1}{3}} - Z_0'^{\frac{1}{3}} \right)$$

On the other hand, the chromaticity of a printed color can be obtained in the following expression (11).

$$X = \frac{\int S(\lambda) \cdot R(\lambda) \cdot \overline{x}(\lambda) d\lambda}{\int S(\lambda) \cdot \overline{y}(\lambda) d\lambda} \quad (11)$$

$$Y = \frac{\int S(\lambda) \cdot R(\lambda) \cdot \overline{y}(\lambda) d\lambda}{\int S(\lambda) \cdot \overline{y}(\lambda) d\lambda}$$

$$Z = \frac{\int S(\lambda) \cdot R(\lambda) \cdot \overline{z}(\lambda) d\lambda}{\int S(\lambda) \cdot \overline{y}(\lambda) d\lambda}$$

where
$S(\lambda)$: spectral reflectance of a light source at a place where the print is observed
$R(\lambda)$: spectral reflectance of a print This tristimulus value can be converted to the CIELAB value in the following expressions (12), (13).

$$X' = \frac{X}{\int S(\lambda) \cdot \overline{x}(\lambda) d\lambda} \quad (12)$$

$$Y' = \frac{Y}{\int S(\lambda) \cdot \overline{y}(\lambda) d\lambda}$$

$$Z' = \frac{Z}{\int S(\lambda) \cdot \overline{z}(\lambda) d\lambda}$$

$$L^* = 116 \cdot Y'^{\frac{1}{3}} - 16 \quad (13)$$

$$a^* = 500 \cdot \left( X'^{\frac{1}{3}} - Y'^{\frac{1}{3}} \right)$$

$$b^* = 200 \cdot \left( Y'^{\frac{1}{3}} - Z'^{\frac{1}{3}} \right)$$

An object of color reproduction is to achieve spectral reflectance R(1) in which respective CIELAB values coincide with each other as shown in the expression (14).

$$L^*o = L^*$$
$$a^*o = a^*$$
$$b^*o = b^* \quad (14)$$

Here, because the expression (10) above is equivalent to the expression (13), the object of color reproduction can be replaced as shown in the expression (15).

$$\frac{X_0}{\int S_0 \cdot \overline{x}(\lambda) d\lambda} = \frac{X}{\int S \cdot \overline{x}(\lambda) d\lambda} \quad (15)$$

$$\frac{Y_0}{\int S_0 \cdot \overline{y}(\lambda) d\lambda} = \frac{Y}{\int S \cdot \overline{y}(\lambda) d\lambda}$$

$$\frac{Z_0}{\int S_0 \cdot \overline{z}(\lambda) d\lambda} = \frac{Z}{\int S \cdot \overline{z}(\lambda) d\lambda}$$

Here, the spectral reflectance $So(\lambda)$ of the light source at a real place varies depending on, for example, a direction of a plane and generally it is difficult to calculate. Thus, according to this embodiment, the spectral reflectance $So(\lambda)$ of the light source in the expression (9) is simply assumed to be C light source and it is assumed that a light source for observing the print is the same C light source. Thus, the expression (9) above can be expressed in the following expression (16).

$$X'_0 = \frac{X_0}{\int S(\lambda) \cdot \overline{x}(\lambda) d\lambda} \quad (16)$$

$$Y'_0 = \frac{Y_0}{\int S(\lambda) \cdot \overline{y}(\lambda) d\lambda}$$

$$Z'_0 = \frac{Z_0}{\int S(\lambda) \cdot \overline{z}(\lambda) d\lambda}$$

Because the color conversion is conducted by the 3D-LUT in the CIELAB space in this embodiment, the tristimulus values (Xo,Yo,Zo) of a picture is converted to the CIELAB value according to the above expressions (16) and (10). A processing of converting the tristimulus value which is the tristimulus value according to the expression (16) is called light source compensation for convenience in following descriptions.

A detailed processing of this light source compensation is necessary at the time of printing. In this embodiment, light source compensation coefficients KSX, KSY, KSZ are obtained in the following expression (17) using the spectral reflectance $So(\lambda)$ of the observation light source.

$$KSX = \frac{1}{\int s(\lambda) \cdot \overline{x}(\lambda) d\lambda} \quad (17)$$

$$KSY = \frac{1}{\int s(\lambda) \cdot \overline{y}(\lambda) d\lambda}$$

$$KSZ = \frac{1}{\int s(\lambda) \cdot \overline{z}(\lambda) d\lambda}$$

The light source compensation at the time of printing can be performed by multiplying the light source compensation coefficients KSX, KSY, KSZ with the tristimulus value of each picture element of a picture as shown in the expression (18).

$$Xo' = KSX \cdot Xo$$
$$Yo' = KSY \cdot Yo$$
$$Zo' = KSZ \cdot Zo \quad (18)$$

[Color Conversion to Ink Level]

Colors converted to the CIELAB value in the above manner needs to be converted to ink level of ink to be actually used for printing. A concept of color conversion to the ink level will be described. Meanwhile, in the following description, eight colors (R, O, Ye, G, B, P, M, K) will be used.

The picture data of the tristimulus values is converted to the CIELAB value in the above expression (10) after light source compensation is conducted according to the above expression (16). This CIELAB value is converted to such a printing ink amount (ink level) to reproduce that CIELAB value by means of the 3D-LUT. That is, a picture in which respective picture elements are expressed by three kinds of values, X, Y, Z is converted to a picture expressed by values of eight kinds of ink levels of respective colors (R, O, Ye, G, B, P, M, K).

Figure 17:
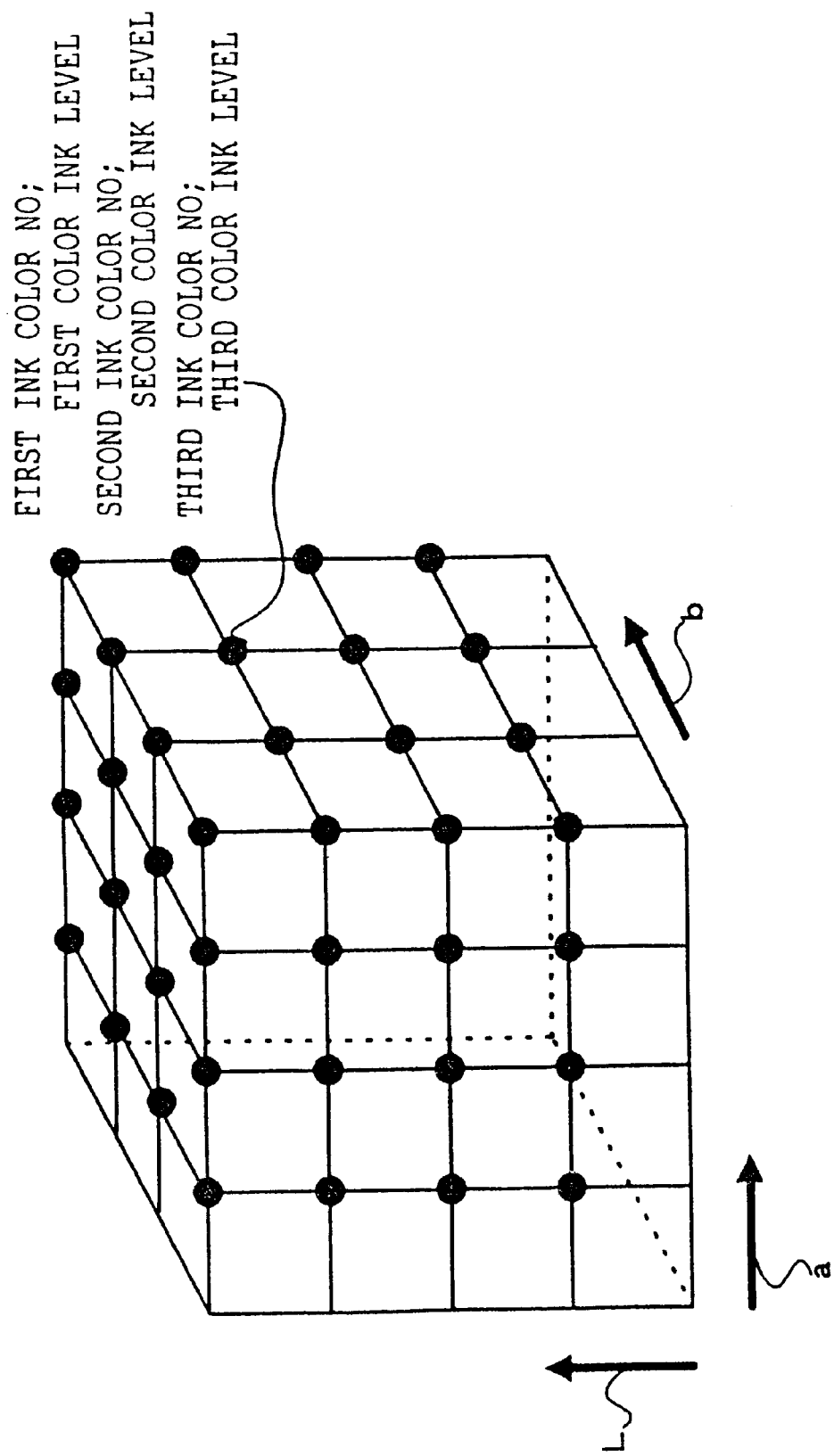
FIG. 17 is a conceptual diagram showing a color conversion table (3D-LUT) in CIELAB space.

As shown in FIG. 17, the 3D-LUT is data group in which the CIELAB color space is divided to stereoscopic grids having equal intervals in height, horizontal and vertical directions and the CIELAB chromaticity of each grid point is reproduced to describe the ink color and ink level. In this embodiment, the chromaticity of each grid point D is described by three color inks and the 3D-LUT in which three kinds of the ink color and the ink level each are stated for grid points of 100×100×100 points is used.

Figure 18:
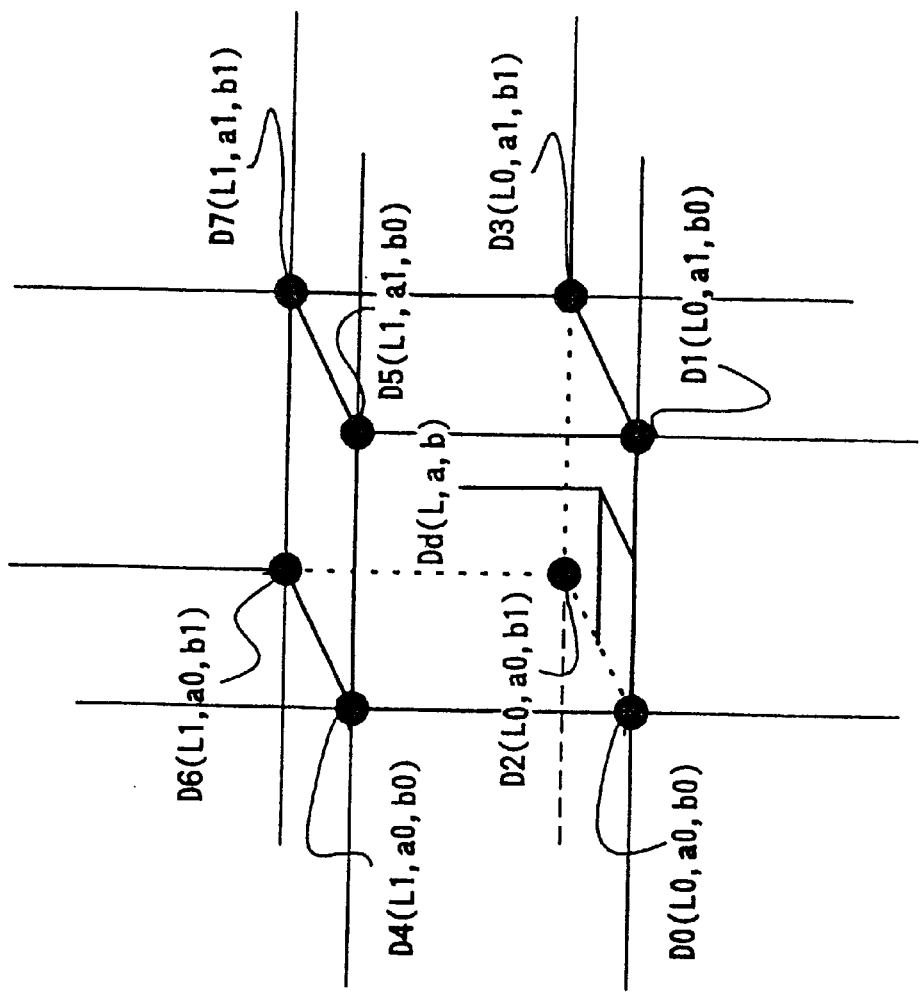
FIG. 18 is a conceptual diagram for showing a procedure for obtaining ink color and ink level from arbitrary CIELAB value in the color conversion table (3D-LUT) in the CIELAB space of FIG. 17.

As shown in FIG. 18, an arbitrary CIELAB value or chromaticity (L*, a*, b*) is located at eight grid points D0–D7 or within a cube surrounded by the eight grid point D0–D7. With respect to all the eight grid points D0–D7, their ink colors and ink levels are referred to reproduce that chromaticity. Ink level interpolation is performed by weightening depending on distance between a desired chromaticity point and the respective grid points in the Lag space and then an ink color and ink level which give an appropriate chromaticity to the chromaticity point Dd are determined. If the chromaticity point Dd and the eight grid points D0–D7 have a relation shown in FIG. 18, the ink color and ink level of each grid point can be expressed as shown in the expression (19).

$$(C1n, L1n, C2n, L2n, C3n, C3n) \quad (19)$$

where n: 0,1,2,3,4,5,6,7 (number of each grid point)
C1n: ink color of first color
L1n: ink level of first color
C2n: ink color of second color
L2n: ink level of second color
C3n: ink color of third color
L3n: ink level of third color As shown in the following expression (20), the expression (19) is replaced with vectors of the ink levels of respective inks to interpolate the chromaticity point Dd for generalization.

$$(Lrn, Lon, Lyn, Lgn, Lbn, Lpn, Lmn, Lkn) \quad (20)$$

where n: 1=0,1,2,3,4,5,6,7(number of each grid point)
Lrn: ink level of R
Lon: ink level of O
Lyn: ink level of Ye
Lgn: ink level of G
Lbn: ink level of B
Lpn: ink level of P
Lmn: ink level of M
Lkn: ink level of K With respect to any one of the ink colors of the first, second and third colors used in the expression (19), its ink level is stored and for the other ink colors, ink level 0 is stored.

In the interpolation, three kinds of weights corresponding to each axis of the CIELAB are used as shown in the expression (21).

$$WL = (L - L0)/(L1 - L0)$$

$$Wa = (a - a0)/(a1 - a0)$$

$$Wb = (b - b0)/(b1 - b0) \quad (21)$$

The ink level of each color is obtained in the following expression (22).

$$\begin{aligned} Lc = &\ (1-WL) \cdot (1-Wa) \cdot (1-Wb) \cdot Lc0 + \\ &\ (1-WL) \cdot (Wa) \cdot (1-Wb) \cdot Lc1 + \\ &\ (1-WL) \cdot (1-Wa) \cdot (Wb) \cdot Lc2 + \\ &\ (1-WL) \cdot (Wa) \cdot (Wb) \cdot Lc2 + \\ &\ (WL) \cdot (1-Wa) \cdot (1-Wb) \cdot Lc4 + \\ &\ (WL) \cdot (Wa) \cdot (1-Wb) \cdot Lc5 + \\ &\ (WL) \cdot (1-Wa) \cdot (Wb) \cdot Lc6 + \\ &\ (WL) \cdot (Wa) \cdot (Wb) \cdot Lc7 \end{aligned} \quad (22)$$

The picture data of the tristimulus values in which light source compensation is made according to the expression (16) is converted to the CIELAB values according to the above expression (10). Where the tristimulus values are values other than 0. It is possible to obtain the eight grid points from these CIELAB values.

Next, the single color characteristic and the color mixing characteristic will be described.

[Single Color Characteristic]

Details of a processing for obtaining the single color characteristic will be described with reference to FIG. 19. The processing of FIG. 19 corresponds to processing of steps 130–136. At step 310 of FIG. 19, signals of the ink levels of a predetermined number (in this embodiment, 37 points densely distributed around 0) are output to the color printer as described later in order to produce a color chart (sample) of each ink color in single color for every ink level. That is, the color printer outputs a color chart for every single color. In this case, the ink level li is designed so as to cover from a minimum value (in this embodiment, ink amount is 0) of the ink level to a maximum value thereof with an appropriate interval. At next step 312, an output color chart is measured in terms of color and the measured value is stored. That is, by measuring colors, chromaticity data L*[li]a*[li]b*[li] corresponding to each single color and each ink level is obtained and stored as chromaticity data. In this embodiment, as measuring condition, <specular exclude/small(s) opening> is set and a spectral reflectance measuring device (CMS-35SP) made by Nurakami Shikisai Gijutsukenkyujo is utilized to measure respective patches of each single color chart.

At step 314, the chromaticity data Lw, aw, bw of the minimum value (0) of the ink level is subtracted from the obtained chromaticity data to obtain color difference. At step 316, this color difference is stored as data about color difference DE[li] of an output color chart of each single color from white color of paper. That is, data of color difference from the white color of paper can be obtained in the following expression (23) with white (that is, CIELAB value corresponding to the ink level 0) being considered as standard.

$$\Delta Eab = \{(L-Lw)^2 + (a-aw)^2 + (b-bw)^2\}^{1/2} \quad (23)$$

where
$\Delta Eab$: color difference (DE)

L,a,b: CIELAB value corresponding to each ink level
Lw,aw,bw: CIELAB value corresponding to the ink level of white If the ink level is densely set to 0, 1, 2, 3 and a color chart is produced and measured, the color difference data does not increase monotonically with respect to the ink level. That is, although the ink level is increased, the color difference sometimes decreases. This phenomenon is due to instability of a color printer or a color measuring device and may be an obstacle to the spline interpolation increasing monotonically which is to be conducted later. Thus, it is desirable to compensate the color difference data so that it increases monotonically by judging in viewpoints of a tendency of the ink level and color difference before and behind.

At step 318, whether or not color difference compensation is needed is determined from a tendency of the ink level and color difference before and behind. If it is determined that the compensation is needed, at step 320, an inverted portion due to an error in measurement or the like is compensated and at step 322, the compensate data is stored as color difference data DE'[li]. That is, whether or not the color difference data with respect to each ink level has an inverted portion or whether or not there is a portion of DE(i1)>DE(i2) despite the ink level of i1<i2 is determined. If yes, the following correction is made. First, a color difference is set again so that the characteristic in the vicinity of the inverted portion is smooth. For example, the color difference is set so that a change in gradient of a curve expressing the characteristic of the color difference data is smaller. In this case, it is possible to correct the color difference data by providing an average value of color difference values before and behind and heavy load average value instead of a tremendously large or small color difference value.

On the other hand, if it is determined that compensation is not needed at step 318 or the color difference data increases monotonically with respect to the ink level, the color difference date DE[li] is assumed to be a compensated color difference data DE'[li] and then the processing proceeds to step 324.

At step 324, a color difference data obtained at the maximum ink level is standardized so as to be 1 by subtracting the color difference data DE[255] at the maximum ink level from the color difference data DE'[li]. At step 326, the standardized color difference data is memorized as a standardized data D(=DE'[li]/DE[255]).

At step 328, a color difference with respect to an ink level other than the ink level in which a color chart is produced by the above described spline interpolation increasing monotonically (see FIGS. 14, 13) is obtained. At step 330, the color difference data D[L] with respect to arbitrary ink level L obtained by interpolation is memorized. By performing this processing for respective colors (step 332), a color difference from white color of paper with respect to arbitrary ink level is obtained for every color and a relation between the ink level and the color difference data are memorized as single color characteristic table.

Figure 21A:
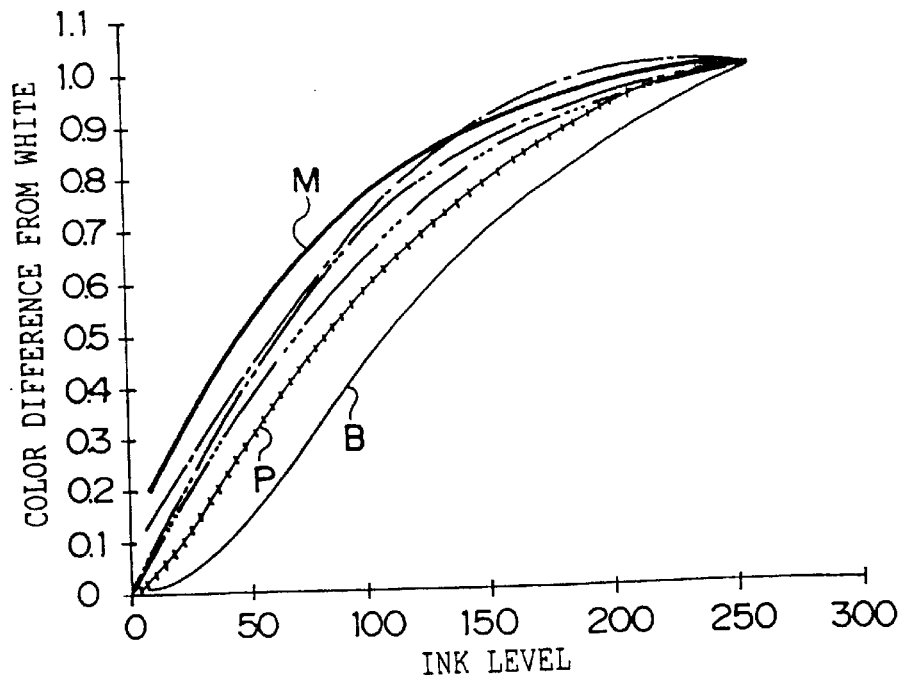
FIG. 21A and FIG. 21B are diagrams showing the single color characteristic expressed by ink level and a color difference from white.
Figure 21B:
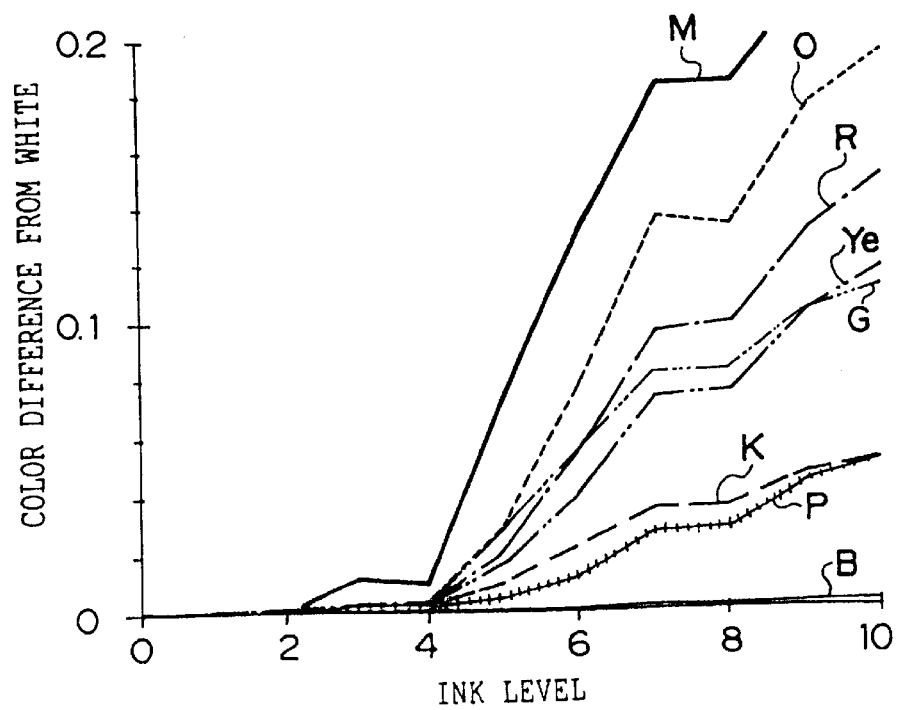

With respect to the single color characteristic table produced as described above, the single color characteristic data (has a color difference value with respect to only the ink level undergoing measurement) is subjected to the spline interpolation which is limited to monotonous increase. Then, the color differences with respect to all the ink levels are obtained. FIG. 21A and FIG. 21B show examples of the single color characteristic. FIG. 21B shows a relation of the color difference to the ink level up to ink level 10.

[Production of Single Color Chart]

The single color chart (sample) produced at step 310 of FIG. 19 is produced by printing each color of R, O, Ye, G, B, P, M, K at a predetermined ink level. According to this embodiment, to produce the single color chart of each color, 38 ink levels (0, 1, 2, 3, 4, 5, 6, 7, 8, 9, 10, 15, 20, 25, 30, 40, 50, 60, 70, 80, 90,100, 110, 120, 130, 140, 150, 160, 170, 180, 190, 200, 210, 220, 230, 240, 250, 255) are used.

The sublimation type color printer has such a characteristic of changing printed picture density depending on a printing area in the printing head direction (main scanning direction). Thus, according to this embodiment, respective single color charts are placed in line in a direction perpendicular to the main scanning direction (subsidiary scanning direction) and only a chart corresponding to an ink level is formed in the main scanning direction. A sublimation type color printer having a function to compensate the above phenomenon is not limited to the above described operation for forming the single color charts.

[Color Mixing Characteristic]

Next, a processing for obtaining color mixing characteristic will be described in detail with reference to FIG. 20. The processing of FIG. 20 corresponds to processing of steps 138–148 of FIG. 12. First, at step 360 of FIG. 20, a color mixing chart is produced (described in detail later). At this step 360, using the single color characteristic of each color described above, several points of ink levels with a substantially same color difference (according to this embodiment, five points of ink levels including 0 and 255 which are the minimum and maximum values respectively) are obtained and a color chart of each ink level is produced with respect to combinations of plurality of ink colors. According to this embodiment, (P, O, K), (O, Ye, K), (Ye, G, K), (G, B, K), (B, P, K), (P, M, K), (R, M, K) are set as combination of a plurality of ink colors. For each of combinations of ink colors, 5×5×5=125 colors are produced and then color mixing charts of totally 875 colors are produced.

As described above, each combination comprises two colors near each other in terms of hue and K color. Consequently, color space is substantially divided by each hue so that respective colors are reproduced by two chromatic colors and K color.

At step 362, respective color mixing charts produced are measured in terms of colors. According to this embodiment, <specular exclude/small(s) opening> is set as its measuring condition and the spectral reflectance measuring apparatus (CMS-35SP) made by Murakami Sikisai Gijutsu Kenkyujo is used to measure respective patches of the color mixing chart.

At step 364, the ink level is converted to ink amount and at step 366, a chromaticity corresponding to each ink amount is obtained. For example, paying attention to a combination of an arbitrary ink color, it is assumed that the color name of the first color is x1, the color name of the second color is x2, the color name of the third color is x3 and at the same time, the ink levels used for producing the color chart are lx, li, lx2i, lx3i (according to this embodiment, i=1, 2, 3, 4, 5 and 1×1=0, 1×5=255). These ink levels are converted to printing ink amounts ax1i, ax2i, ax3i depending on the single color characteristic of each color obtained previously.

More specifically, the respective color mixing characteristic measuring data (spectral reflectance) are classified depending on combination of respective ink colors and converted to the CIELAB value according to the above expression (10) and then memorized as color mixing data. Meanwhile, at the time of this conversion, C light source data is used as light source data. Then, a printing ink amount corresponding to single color ink level is obtained from the ink level of the color mixing chart and the single color characteristic table and a plurality of correspondences between that value and the above CIELAB value are compiled and memorized for each combination of the respective ink colors. According to this embodiment, the ink amounts are converted to integers (discrete printing ink amount) 0–255. Conversion to the discrete printing ink amount facilitates instructions from existing application or the like.

At step 368, three-dimensional spline interpolation (Japanese Patent Application Laid-Open (JP-A) No. 7-50760 by the applicant of the present invention) in which the above described spline interpolation is extended to three dimensions is performed by the discrete printing ink amounts (ax1i, ax2i, ax3i) and corresponding chromaticity data (extrapolation of high brightness and low brightness). Then, brightnesses to all the discrete printing ink amounts from 0 to 255 are obtained. At step 370, a chromaticity corresponding to arbitrary combination of ink amounts is obtained.

The above processing is performed for each of the above seven ink color combinations (step 372) and finally, data base indicating relations of the chromaticities to all the ink color/printing ink amount combinations is produced.

At step 374, a grid point of the 3D-LUT is set and at step 376, a chromaticity nearest the chromaticity of the set grid point is retrieved from the above data base and an ink color and printing ink amount corresponding to the retrieved chromaticity are obtained as the ink color and printing ink amount of the set grid point. At step 378, this ink color and printing ink amount are converted to the ink level by referring to the single color characteristic obtained above and a combination of the ink color and ink level which provide the chromaticity of a grid point is obtained. By conducting the above processing for all the grid points of the 3D-LUT (step 380), a combination of the ink color and the ink level for providing the chromaticity of each grid point of the 3D-LUT is obtained so as to obtain the color mixing characteristic. This color mixing characteristic is memorized as a final color conversion table. Thus, the color conversion table is for relating the chromaticity (ABC value) to the ink level and indicates a synthesis of the single color characteristic and the color mixing characteristic.

[Production of the Color Mixing Characteristic Measuring Chart]

Figure 20:
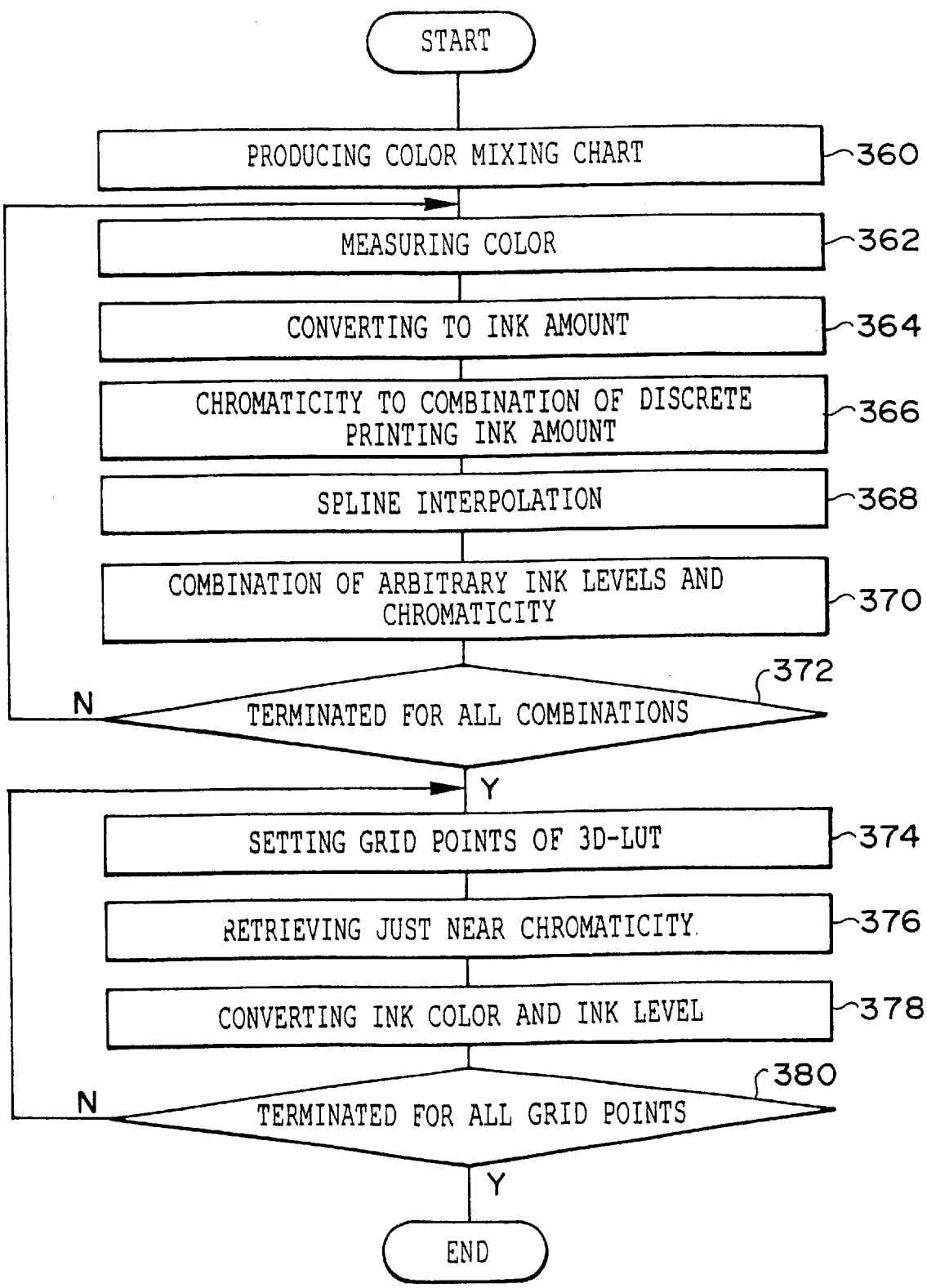
FIG. 20 is a flow chart of processing for introducing the color mixing characteristic.

The color mixing chart to be produced at step 360 of FIG. 20 is produced by first setting the ink level for the color mixing chart and then printing at each ink level. That is, from the above single color characteristic, as shown below, five points of the ink levels (including the ink levels 0, 255) are set so that the color difference in single color is substantially equal for each of the colors. According to this embodiment, the ink levels are set to (R: 0,29, 59,113, 255), (O: 0.34, 73,121, 255), (Ye: 0,34, 73,121, 555), (G: 0.37, 80,135, 255), (B: 0.74, 113, 167,255), (G: 0.37, 80, 135, 255), (B: 0,74, 113, 167, 255), (P: 0, 46, 95, 154, 255), (M: 0, 28, 57, 111, 255), (K: 0,45, 93, 152, 255).

As described above, the color mixing chart is produced by combining three groups of the ink colors, that is, by combining (R, O, K), (O, Y, K),(Y, G, K), (G, B,K), (B, P, K), (P, M, K) and (R, M, K) with the above ink levels. Thus the number of color patches to be produced totals 5×5×5×7=875 colors.

In a single color mixing chart formed according to this embodiment, a color patch having a predetermined value (e.g. 137) in ink level of each single color is formed. This color patch having this predetermined value can be used for checking the stability. This color patch can be used for checking a change in printed picture density as described later, so that a reliability of measured value in the color measuring device can be improved.

Although the printed single color chart and the color mixing chart are measured by the measuring device connected to the computer to obtain the chromaticity according to the above embodiment, it is permissible to use an another independent color measuring device and use measuring values obtained by that measuring device.

In the above described embodiment, such a case that first, the 3D-LUT which is a color conversion table is obtained to determine a relation between the ink level (signal value) and the chromaticity and then the tristimulus image data are converted to image data consisting of the ink level values by utilizing the obtained color conversion table has been described. However, the present invention is not restricted to this. As shown in FIG. 9, it is permissible to use the single color characteristic 72 and the color mixing characteristic 76 individually as table (LUT), construct the single color characteristic and the color mixing characteristic separately, convert the tristimulus values of the image data to color material transfer amounts by using the color mixing characteristic and then convert the color material transfer amounts to the signal values by using the single color characteristic.

Further, although in the above embodiment, a case in which white paper is used as a medium in which color is reproduced has been described, the present invention is not restricted to this, but it is permissible to use a transparent or semi-transparent paper or arbitrary color paper or medium.

In the present embodiment, the single color characteristic and the color mixing characteristic are obtained separately. That is, after the single color characteristic is obtained, the 3D-LUT is produced together with the color mixing characteristic. By obtaining the single color characteristic and the color mixing characteristic separately, for example, adjustment at a time when color materials of different production lots are used (replacement of color materials having substantially the same hue, etc.) and adjustment for compensation of changes in the color printer with a passage of time are facilitated. That is, in a case in which the color materials of different production lots are used or changes in the printer with a passage of time are compensated, the single color characteristic of each single color is of substantially the same hue and a change in the measuring value depending on the color mixing chart is low. Thus, by adjusting the measuring values by the single color chart, it is possible to restore to a state in which sufficient color reproduction is enabled. Thus, only a single color chart is produced and measured to obtain a new single color characteristic. By obtaining the 3D-LUT by combining this new single color characteristic with the existing color mixing characteristic, it is possible to perform color compensation to an optimum state with small number of measuring counts and small calculation amounts.

Figures 22A, 22B:
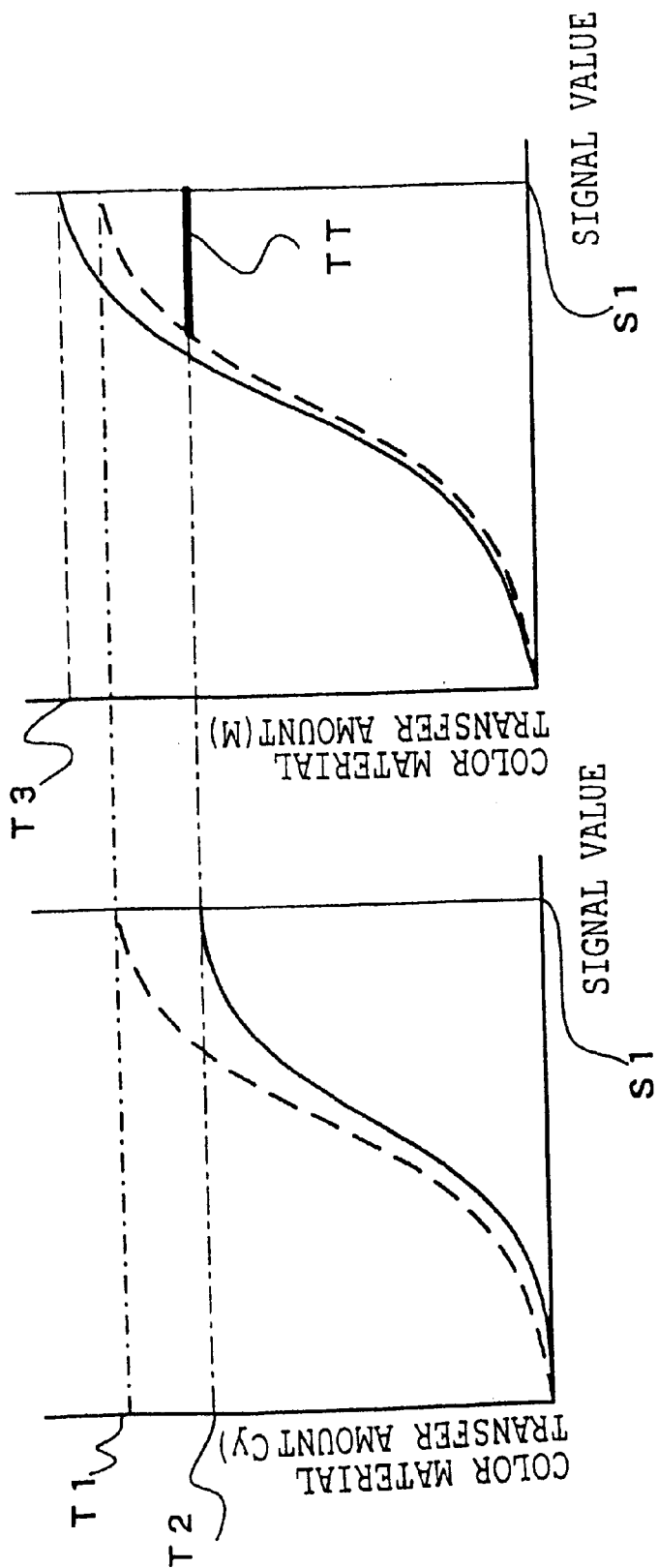
FIG. 22A and FIG. 22B are diagrams showing a relation between the signal value (ink level) and the color material transfer amount in cases of cyan color and magenta color at the time of color material replacement.

In adjustment at a time when color materials of different production lots are used (replacement of color materials having substantially the same hue, etc.) or adjustment for compensating a change in the color printer with a passage of time, it is desirable to compensate the color material transfer amount of each color material. For example, FIG. 22A and FIG. 22B show respective characteristics with respect to the color material transfer amount provided when the color material is replaced with that of a different production lot and previous color material transfer amount. FIG. 22A shows the previous characteristic of Cy color material with dotted line and the characteristic provided after the replacement with a solid line. FIG. 22B shows the characteristic of the color material M with a solid line and the previous characteristic of the color material Cy with dotted line. As understood through these FIGs., as for the color material Cy, the maximum transfer amount in the previous characteristic (dotted line) is T1 and the maximum transfer amount of the characteristic after the replacement (solid line) is T2 (T1>T2). As for the color material M, the maximum transfer amount is T3 (T3>T2>T1).

Here, the single color characteristic obtained prior to the replacement is shown by dotted lines in FIG. 22A and FIG. 22B. That is, the color material of C (cyan) is secured by a dynamic range up to the maximum transfer amount T1. Thus, if only the single color characteristic is changed, the color material transfer amount of the color material Cy corresponding to the ink level (signal value) S1 indicating the maximum transfer amount T3 in the case of the color material M indicates a value exceeding its maximum transfer amount T2 and therefore substantially it is not possible to instruct the transfer amount of Cy. Thus, if the maximum transfer amount of the color material C is lower than prior to the replacement, for example, in a case when a color material of a different production lot is used or the like, the single color LUTs are set so that the maximum transfer amount of other color material (e.g. three colors of MYK, M in a case shown in FIG. 22A and FIG. 22B) coincides with the maximum transfer amount of the color material C (straight line TT shown in FIG. 22B). That is, if the maximum transfer amount of a color material which is changed or adjusted decreases below its previous maximum transfer amount, the transfer amount of the color material which exceeds the maximum transfer amount of the changed or adjusted color material is made to coincide with the maximum transfer amount of the changed or adjusted color material and then a corresponding single color characteristic is set. If the maximum transfer amount of the color material C decreases below that prior to the change, a single color LUTs are set so that the maximum transfer amount of other color material coincides with the maximum transfer amount of the color material C, thereby preventing color balance of low brightness portion from being deteriorated.

If the hue (tone) of a color to be reproduced is adjusted, the single color characteristic of each color material is changed and the 3D-LUT is obtained by calculation from the single color characteristic and the existing color mixing characteristic data. For example, if it is desired to stress the yellow element of a picture image, the single color characteristics of the colors C and M are changed so that their color material transfer amounts corresponding to respective signal values are smaller than actually (e.g., entirely multiplying with 0.9) and the single color characteristic of the color Ye is changed so that its color material transfer amount corresponding to respective signal value is larger than actually (e.g. entirely multiplying with 1.1).

Although in the above embodiment, a case in which the present invention is applied to a color printer in which subtractive mixture is established has been described, the present invention is also valid to CRT system in which additive mixture is not established.

[Evaluation of Color Reproduction Accuracy]

Figure 23:
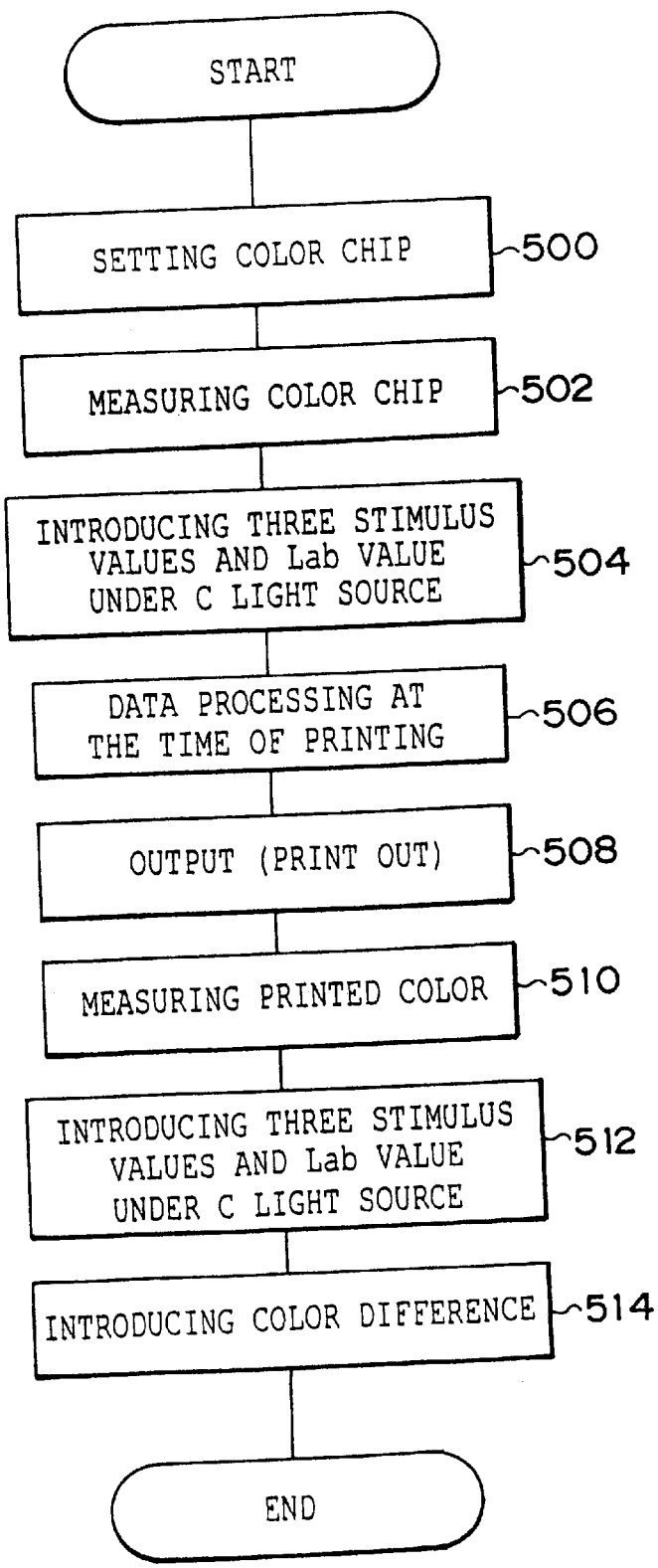
FIG. 23 is a flow chart of processing for evaluation of color reproduction accuracy.

Next, reproduction accuracy of arbitrary color reproduced by using the color conversion table produced in the above manner was evaluated. FIG. 23 shows a flow of evaluation of color reproduction accuracy. Meanwhile, the evaluation was conducted in two kinds for a case in which achromatic colors and chromatic colors are included and a case in which only achromatic colors are used.

First, evaluation of color reproduction accuracy by using arbitrary 50 color chips selected from existing color chips will be described. At step 500 of FIG. 23, the color chips which serve as a criterion for evaluation of color reproduction accuracy are determined. According to this embodiment, these arbitrary 50 colors are selected from DIC color chips so that their hues, saturations and brightnesses are not inclined to one side (including achromatic colors). In Table 2 below, these color chip names are indicated together with results of the evaluation of the chromaticity (e.g. color difference) which will be described later. At step 502, a plurality of the set color chips are measured (in terms of color) with a calorimeter which is a measuring device (CMS-35SP, made of Nurakami Shikisai already mentioned previously) and at step 504, the tristimulus values (tristimulus values) are obtained under C light source (namely, under the same light source in which a color conversion table is produced). At this step 504, the CIELAB values are obtained and memorized. At step 506, the obtained tristimulus values are processed for printing (including light source compensation for observation under the C light source) and at step 508, are output. Consequently, the prints 62 in which color patches are printed are output (print out) from the color printer 60.

More specifically, after the tristimulus values are obtained, the CIELAB values are calculated under the C light source and then picture data is produced so that color patches are formed in the above shape (series arrangement) and transmitted to the color printer 60, which forms the print 62.

At step 510, the color patches formed on the output print 62 are measured by means of the calorimeter with respect to the printed color thereof like at step 502 and then the CIELAB values under the C light source are obtained at step 512.

Next, at step 514, the CIELAB value of the color chip obtained at steps 504, 512 and the CIELAB value of the color patch formed by printing the color chip are read and then color difference is obtained by subtraction.

Figure 24:
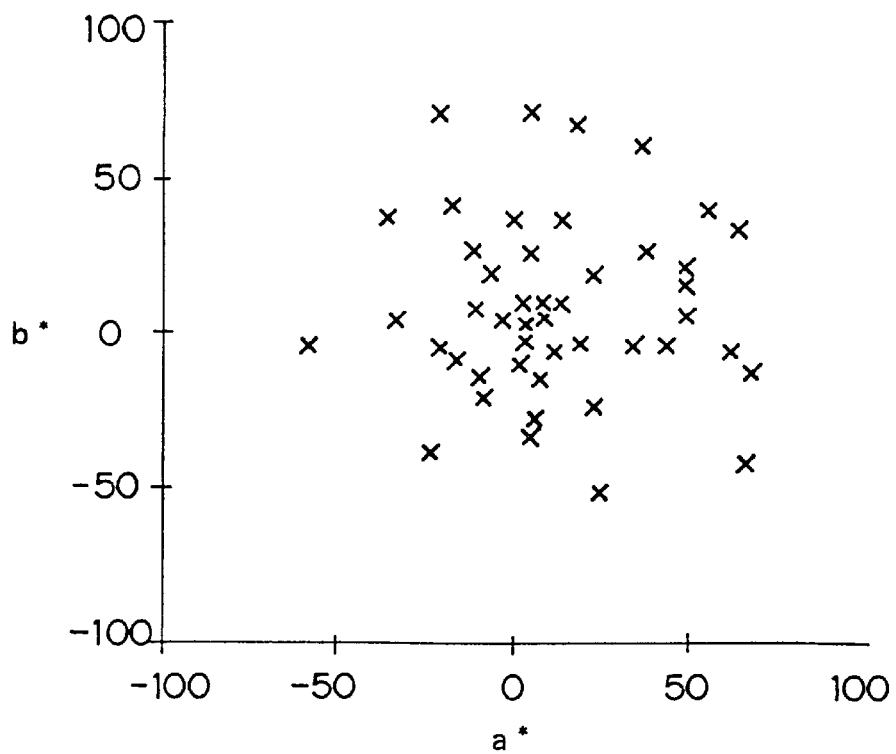
FIG. 24 is a diagram showing a distribution of arbitrary target colors used for evaluation of color reproduction accuracy on a*–b* chromaticity diagram.
Figure 25:
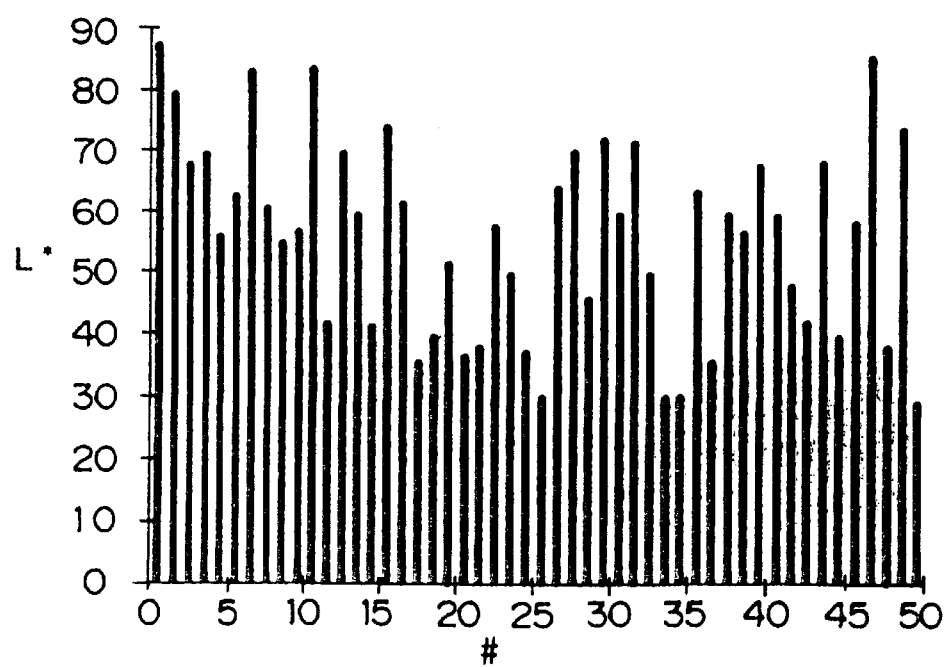
FIG. 25 is a diagram showing a distribution of L* of arbitrary target color used for evaluation of color reproduction accuracy.
Figure 26:
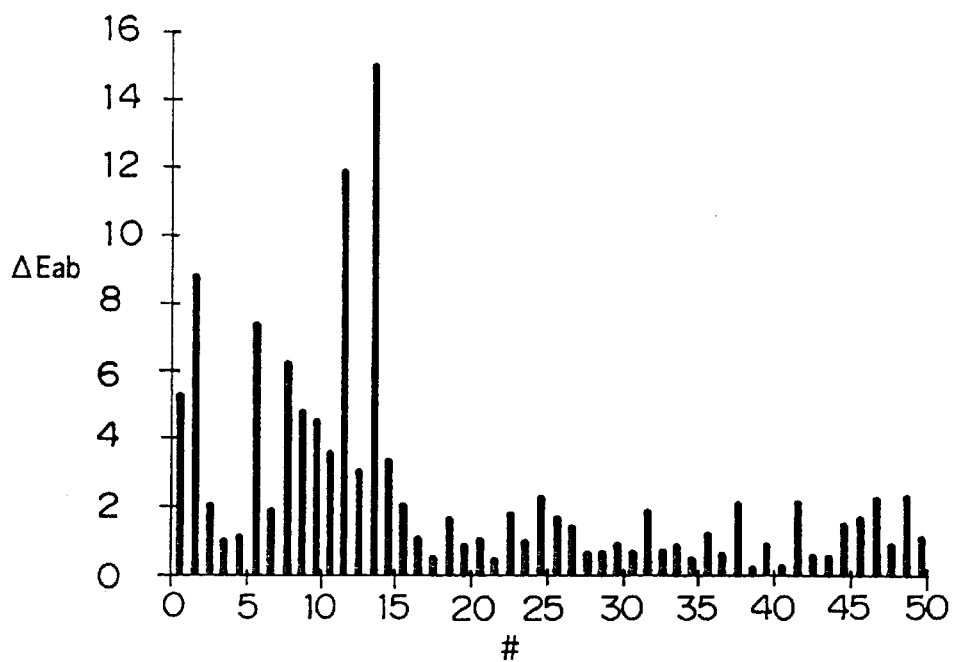
FIG. 26 is a diagram showing a distribution of color difference of arbitrary target color used for evaluation of color reproduction accuracy.

Table 2 below shows DIC# of arbitrary 50 colors, CIELAB value (target color) of each DIC#, CIELAB value of printed color, and a color difference relative to the target color. FIGS. 24, 25, 26 show a relation between the target color and the printed color. FIG. 24 shows a distribution of the target colors in a chromaticity diagram with a* in vertical axis and b* in horizontal axis. FIG. 25 shows a distribution of the target colors in coordinate system with L* in vertical axis and DIC# in horizontal axis. From this, it is understood that the distribution of the chromaticity diagram is not deviated to one side. FIG. 26 shows the color difference ΔEab relative to each color of DIC#.

From this, it is understood that each of printed colors of arbitrary colors has been reproduced in a target color. Meanwhile, a target color (#14) which provides a maximum color difference is considered t be out of the color reproduction range.

TABLE 2

Arbitrary color

| # | DIC # | Target color L* | a* | b* | Printed color L* | a* | b* | Color difference ΔEab |
|---|---|---|---|---|---|---|---|---|
| 1 | 1 | 88.14 | 5.37 | 11.09 | 90.83 | 0.72 | 11.89 | 5.43 |
| 2 | 15 | 79.55 | −35.76 | 4.33 | 79.66 | −27.65 | 8.04 | 8.92 |
| 3 | 27 | 68.31 | 41.60 | −3.60 | 70.18 | 40.48 | −3.77 | 2.18 |
| 4 | 43 | 70.16 | −11.83 | −14.05 | 71.20 | −11.89 | −13.57 | 1.14 |
| 5 | 70 | 56.70 | 2.72 | −32.73 | 57.72 | 3.14 | −33.13 | 1.17 |
| 6 | 80 | 63.20 | 52.34 | 41.24 | 62.96 | 44.97 | 40.27 | 7.44 |
| 7 | 86 | 83.64 | 0.75 | 72.49 | 83.71 | 2.43 | 73.65 | 2.04 |
| 8 | 99 | 61.06 | −25.18 | −38.23 | 61.45 | −20.85 | −33.58 | 6.37 |
| 9 | 112 | 55.63 | 65.30 | −12.54 | 56.29 | 60.56 | −13.75 | 4.94 |
| 10 | 116 | 57.04 | 60.78 | 35.17 | 56.44 | 56.58 | 33.45 | 4.58 |
| 11 | 127 | 84.28 | −24.99 | 71.34 | 86.52 | −23.05 | 73.43 | 3.63 |
| 12 | 150 | 42.22 | 64.74 | −41.74 | 43.31 | 54.96 | −34.84 | 12.02 |
| 13 | 162 | 70.61 | 33.25 | 61.78 | 70.12 | 30.74 | 60.04 | 3.09 |
| 14 | 175 | 59.95 | −61.00 | −4.08 | 60.27 | −47.09 | 1.73 | 15.07 |
| 15 | 195 | 42.02 | 59.59 | −5.37 | 43.78 | 60.61 | −8.18 | 3.47 |
| 16 | 205 | 74.40 | 14.14 | 68.33 | 74.75 | 16.21 | 68.85 | 2.16 |
| 17 | 212 | 61.93 | −39.06 | 37.65 | 62.86 | −39.42 | 36.91 | 1.24 |
| 18 | 222 | 36.00 | 23.23 | −50.92 | 36.39 | 23.54 | −51.21 | 0.58 |
| 19 | 234 | 40.10 | 46.62 | 16.83 | 39.76 | 47.70 | 15.56 | 1.70 |
| 20 | 243 | 51.95 | −3.41 | 37.97 | 52.03 | −2.69 | 37.33 | 0.97 |
| 21 | 251 | 37.17 | −23.26 | −4.58 | 38.13 | −23.68 | −4.10 | 1.16 |
| 22 | 283 | 38.38 | 47.09 | 6.22 | 38.75 | 47.11 | 5.80 | 0.56 |
| 23 | 294 | 58.13 | 46.06 | 22.32 | 57.84 | 47.87 | 22.81 | 1.90 |
| 24 | 301 | 50.87 | 34.84 | 27.57 | 50.56 | 35.86 | 27.57 | 1.07 |
| 25 | 303 | 37.70 | 19.69 | 19.63 | 36.71 | 21.13 | 21.32 | 2.44 |
| 26 | 312 | 30.71 | 9.81 | 10.25 | 29.80 | 10.86 | 11.46 | 1.84 |
| 27 | 313 | 64.47 | 10.39 | 37.72 | 63.26 | 11.22 | 37.25 | 1.55 |
| 28 | 334 | 71.08 | 1.04 | 26.38 | 71.17 | 0.74 | 27.07 | 0.76 |
| 29 | 351 | 46.38 | −9.19 | 20.11 | 45.71 | −8.78 | 20.24 | 0.80 |
| 30 | 358 | 72.63 | −14.58 | 27.64 | 71.73 | −14.24 | 27.28 | 1.02 |
| 31 | 362 | 60.14 | −21.07 | 42.29 | 59.45 | −21.07 | 42.02 | 0.74 |
| 32 | 390 | 71.97 | −13.11 | 8.47 | 71.61 | −11.58 | 9.58 | 1.92 |
| 33 | 401 | 50.30 | −18.51 | −8.51 | 50.92 | −18.25 | −7.97 | 0.87 |
| 34 | 410 | 30.98 | −10.09 | −20.38 | 31.96 | −10.04 | −20.14 | 1.00 |
| 35 | 433 | 29.27 | 4.27 | −26.86 | 29.20 | 4.78 | −27.13 | 0.58 |
| 36 | 443 | 63.56 | −0.62 | −9.49 | 63.71 | 0.67 | −9.98 | 1.38 |
| 37 | 448 | 35.85 | 5.43 | −14.64 | 35.83 | 6.15 | −14.72 | 0.72 |
| 38 | 453 | 60.47 | 21.10 | −23.48 | 60.04 | 23.01 | −24.49 | 2.20 |
| 39 | 459 | 57.06 | 9.16 | −5.43 | 57.31 | 9.16 | −5.52 | 0.26 |
| 40 | 467 | 68.06 | 6.31 | 5.27 | 67.14 | 6.73 | 4.94 | 1.06 |
| 41 | 480 | 59.85 | 31.98 | −3.55 | 60.01 | 32.29 | −3.55 | 0.34 |
| 42 | 493 | 48.22 | 16.51 | −2.60 | 47.06 | 18.14 | −1.52 | 2.27 |
| 43 | 510 | 42.01 | −5.66 | 4.85 | 41.59 | −5.47 | 4.22 | 0.77 |
| 44 | 517 | 68.86 | −0.02 | 10.35 | 68.49 | −0.24 | 10.86 | 0.67 |
| 45 | 525 | 39.37 | 3.14 | 3.41 | 38.57 | 3.93 | 4.59 | 1.63 |
| 46 | 543 | 58.65 | −0.97 | 2.96 | 57.16 | −0.12 | 3.70 | 1.87 |
| 47 | 546(½) | 86.09 | −1.57 | 5.43 | 86.00 | −1.87 | 3.04 | 2.41 |
| 48 | 546 | 38.33 | 0.45 | −1.57 | 37.60 | 0.82 | −0.83 | 1.10 |
| 49 | 548 | 74.59 | −1.39 | 4.66 | 74.97 | −3.45 | 5.99 | 2.48 |
| 50 | 556 | 28.94 | 0.09 | 2.87 | 28.68 | 0.35 | 4.06 | 1.24 |

TABLE 3

(N:50)

| | ΔEab |
|---|---|
| Average value | 2.53 |
| Standard deviation | 2.90 |
| Maximum value | 15.07 |

Next, evaluation of reproduction accuracy of achromatic colors will be described. The chromaticity of achromatic colors taken as subject to evaluation can be obtained in the microcomputer. Thus, the CIELAB value can be preliminarily obtained. Consequently, at step 500 of FIG. 23, the brightness of achromatic colors which serve as a criterion for evaluation of color reproduction accuracy is set. In Table 4 below, the achromatic colors are indicated by Number # and shown together with results of evaluation of the chromaticity. Because the chromaticity of achromatic colors can be preliminarily obtained, at step 502, the chromaticity of the set achromatic colors is read and at step 504,the tristimulus values (tristimulus values) under the C light source (that is, under the light source in which the color conversion table is produced) are obtained. Next, the obtained tristimulus values are subjected to data processing (including light source compensation for observation under the C light source) for printing at step 506 and then output at step 508. Consequently, the color patches are printed by the color printer 60 and the print 62 is output (print out).

The color patches formed on the output print 62 are measured in terms of the printed color thereof by means of the calorimeter like the processing conducted above (steps 510, 512, 514) and the CIELAB value under the C light source is obtained. Then, the CIELAB value of achromatic color and the CIELAB values of the color patches formed by printing the achromatic colors are read and the color difference is obtained by subtraction.

Evaluation of the reproduction accuracy of the above achromatic colors is conducted by two kinds of considerations, consideration on all bright area and consideration on high brightness area. This is because color reproduction in the high brightness and low saturation area is important for observation of pictures and particularly a consideration on high brightness area is necessary.

\* Consideration on all brightness area

Figure 28:
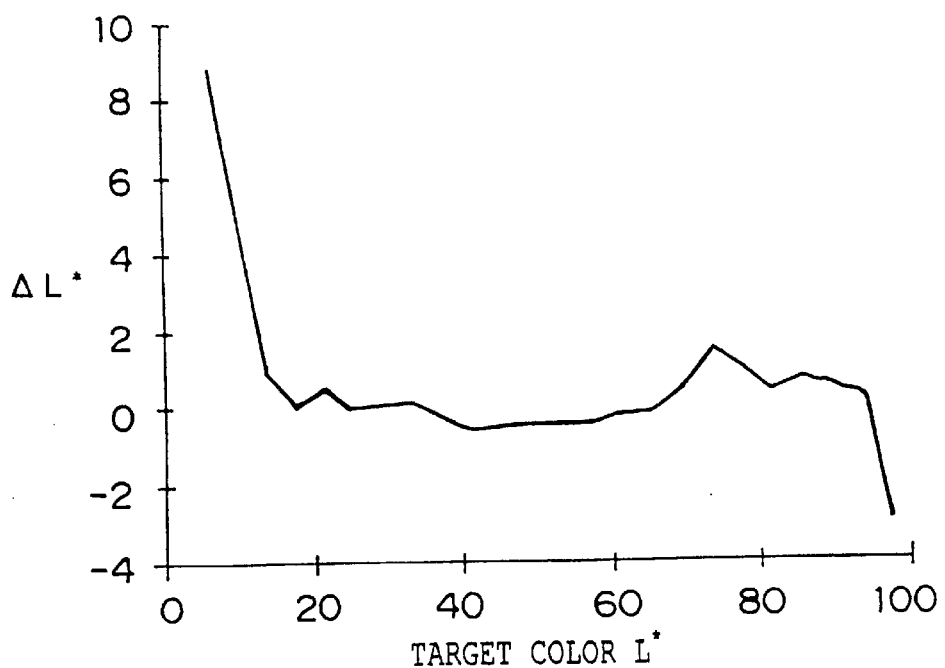
FIG. 28 is a diagram showing a relation between L* of target achromatic colors in all brightness range used for evaluation of color reproduction accuracy and a difference ΔL* between L* of target color and L* of printed color.
Figure 29:
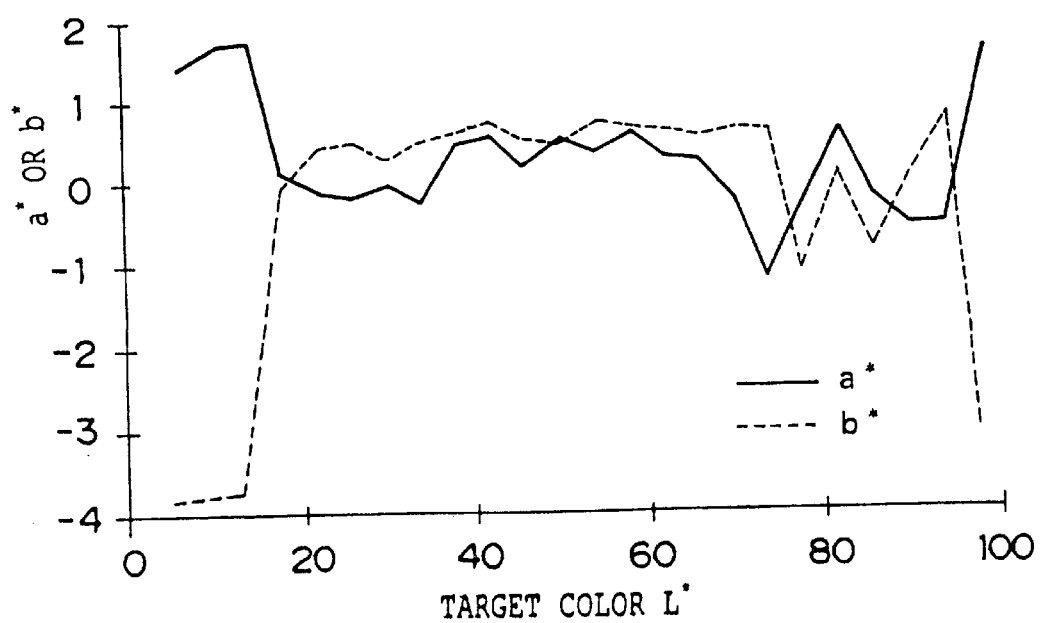
FIG. 29 is a diagram showing a relation between L* of target achromatic colors in all brightness range used for evaluation of color reproduction accuracy and a*/b*.
Figure 30:
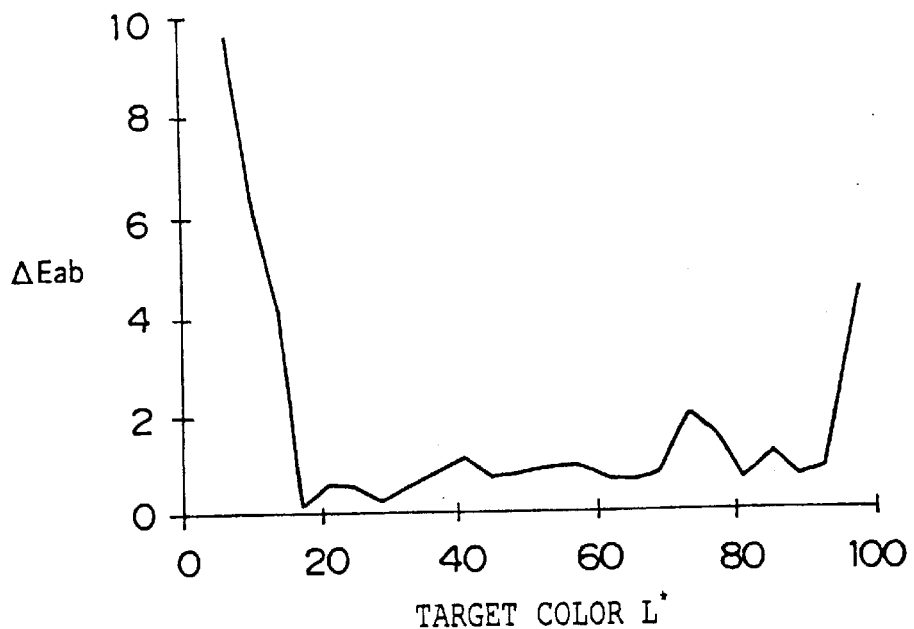
FIG. 30 is a diagram showing a relation between L* of target achromatic colors in all brightness range used for evaluation of color reproduction range and a color difference ΔEab.

Tables 4, 5, 6 and FIGS. 28, 29, 30 show results of consideration on all brightness area.

Table 4 shows the CIELAB chromaticities of target colors in achromatic colors in all brightness area, CIELAB chromaticities of printed colors and color differences relative to target colors. Because this table handles achromatic colors, the a\* value and b\* value of the target colors are 0. The parentheses attached to numbers # in Table indicate colors (brightness) out of the color reproduction range. Table 5 shows an average of color differences and the like in all brightness range. Table 6 shows an average of color differences and the like of only colors within the color reproduction range.

Figure 27:
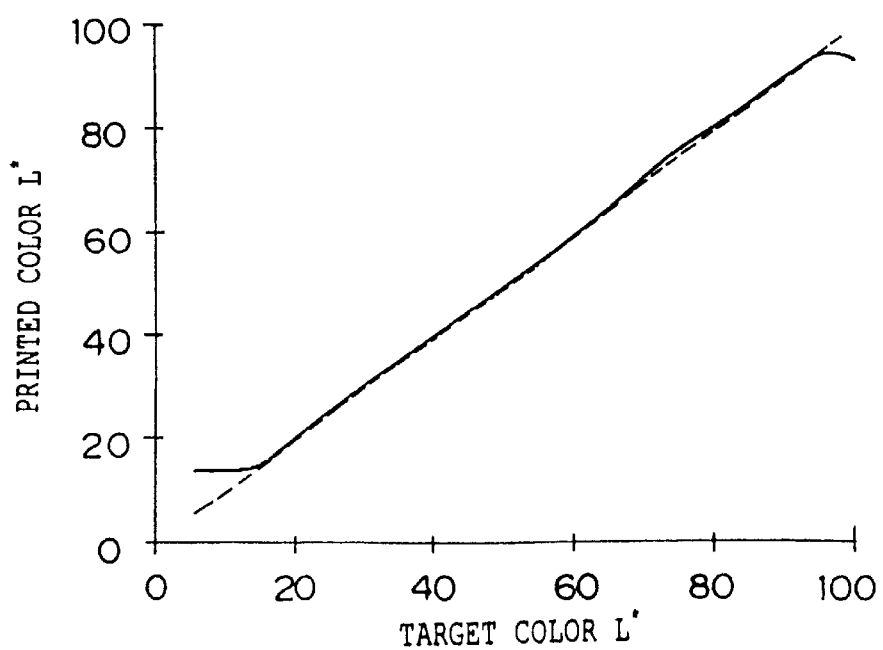
FIG. 27 is a diagram showing a relation between L* of target achromatic colors in all brightness range used for evaluation of color reproduction accuracy and L* of printed color.

FIG. 27 shows L\* of the target colors (that is, input value to the color printer) along the horizontal axis and L\* of printed colors (that is, output value from the color printer) along the vertical axis. As understood from this Figure, this relation therebetween is expressed by a straight line having a gradient 1 indicating a substantially ideal characteristic, but it is deviated from that ideal line in the low brightness range and the high brightness range. This is considered to be because these brightness ranges are out of the color reproduction range.

FIG. 28 shows L\* of the target color along the horizontal axis and a difference between the L\* of the target color and L\* of the printed color along the vertical axis. FIG. 29 shows L\* of the target color along the horizontal axis and a\* and b\* values of the printed color along the vertical axis. Because the a\* and b\* values of the achromatic colors are 0, a distance from a horizontal line which is 0 in terms of vertical axis value in this Figure directly indicates a color difference of the printed color. FIG. 30 shows L\* of the target color along the horizontal axis and a color difference between the target color and the printed color along the vertical axis. As understood from this Figure, a substantially flat characteristic is indicated except low brightness range and high brightness range. From this Figure, it is understood that with respect to arbitrary colors, respective printed colors are reproduced by each target color.

TABLE 4

Achromatic color

| # | Target color | | | Printed color | | | Color difference |
|---|---|---|---|---|---|---|---|
|  | L\* | a\* | b\* | L\* | a\* | b\* | ΔEab |
| (1) | 5.00 | 0.00 | 0.00 | 13.72 | 1.40 | −3.83 | 9.63 |
| (2) | 9.00 | 0.00 | 0.00 | 13.73 | 1.65 | −3.77 | 6.27 |
| (3) | 13.00 | 0.00 | 0.00 | 13.86 | 1.74 | −3.75 | 4.22 |
| 4 | 17.00 | 0.00 | 0.00 | 16.90 | 0.09 | −0.07 | 0.15 |
| 5 | 21.00 | 0.00 | 0.00 | 21.41 | −0.14 | 0.40 | 0.59 |
| 6 | 25.00 | 0.00 | 0.00 | 24.88 | −0.21 | 0.46 | 0.52 |
| 7 | 29.00 | 0.00 | 0.00 | 29.02 | −0.06 | 0.24 | 0.24 |
| 8 | 33.00 | 0.00 | 0.00 | 33.07 | −0.29 | 0.48 | 0.56 |

TABLE 4-continued

Achromatic color

| # | Target color | | | Printed color | | | Color difference |
|---|---|---|---|---|---|---|---|
|  | L\* | a\* | b\* | L\* | a\* | b\* | ΔEab |
| 9 | 37.00 | 0.00 | 0.00 | 36.59 | 0.44 | 0.57 | 0.83 |
| 10 | 41.00 | 0.00 | 0.00 | 40.32 | 0.54 | 0.70 | 1.12 |
| 11 | 45.00 | 0.00 | 0.00 | 44.49 | 0.15 | 0.47 | 0.71 |
| 12 | 49.00 | 0.00 | 0.00 | 48.53 | 0.53 | 0.42 | 0.82 |
| 13 | 53.00 | 0.00 | 0.00 | 52.54 | 0.32 | 0.72 | 0.92 |
| 14 | 57.00 | 0.00 | 0.00 | 56.55 | 0.56 | 0.63 | 0.96 |
| 15 | 61.00 | 0.00 | 0.00 | 60.74 | 0.27 | 0.60 | 0.71 |
| 16 | 65.00 | 0.00 | 0.00 | 64.81 | 0.22 | 0.51 | 0.59 |
| 17 | 69.00 | 0.00 | 0.00 | 69.44 | −0.28 | 0.61 | 0.80 |
| 18 | 73.00 | 0.00 | 0.00 | 74.47 | −1.14 | 0.57 | 2.01 |
| 19 | 77.00 | 0.00 | 0.00 | 77.95 | −0.38 | −1.20 | 1.57 |
| 20 | 81.00 | 0.00 | 0.00 | 81.33 | 0.57 | 0.07 | 0.66 |
| 21 | 85.00 | 0.00 | 0.00 | 85.68 | −0.26 | −0.89 | 1.14 |
| 22 | 89.00 | 0.00 | 0.00 | 89.36 | −0.61 | 0.01 | 0.71 |
| 23 | 93.00 | 0.00 | 0.00 | 93.16 | −0.57 | 0.77 | 0.97 |
| (24) | 97.00 | 0.00 | 0.00 | 94.02 | 1.60 | −3.05 | 4.55 |

TABLE 5

(N:24)

|  | ΔEab |
|---|---|
| Average value | 1.72 |
| Standard deviation | 2.21 |
| Maximum value | 9.63 |

TABLE 6

(N:20)

|  | ΔEab |
|---|---|
| Average value | 0.83 |
| Standard deviation | 0.41 |
| Maximum value | 2.01 |

\* Consideration on high brightness range

Tables 7, 8, 9 and FIGS. 31, 32, 33, 34 show results of consideration on high brightness range.

Table 7 shows the CIELAB chromaticities of the target colors of achromatic colors in high brightness range, the CIELAB chromaticities of printed colors and color difference from the target colors. The a\* and b\* values of the target colors are 0. The parentheses attached to number # in Table indicate colors (brightness) out of color reproduction range. Table 8 shows average value of color differences or the like in all high brightness range. Table 9 shows average value of color difference or the like of only colors within the color reproduction range.

Figure 31:
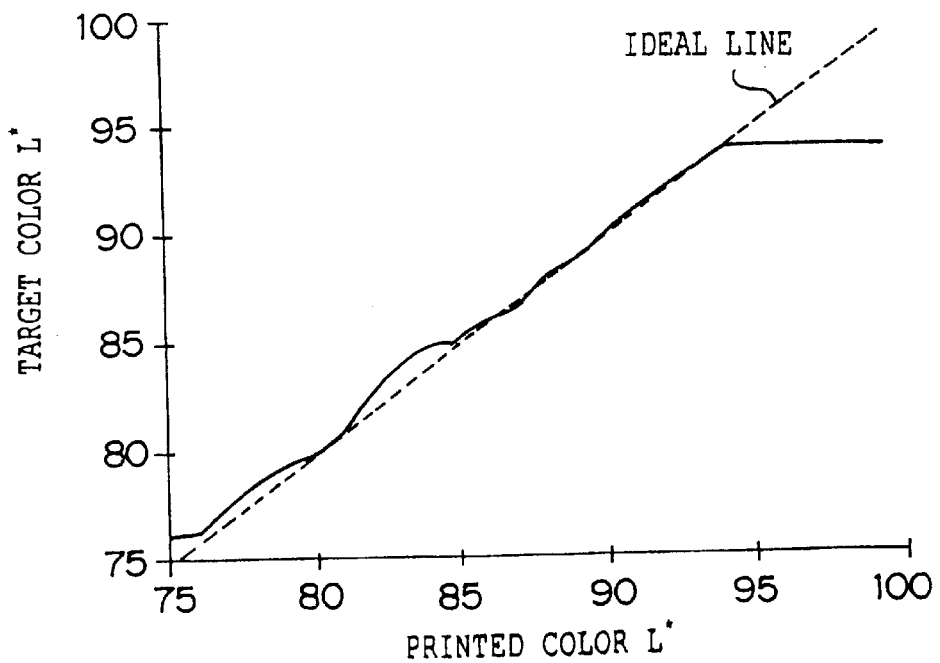
FIG. 31 is a diagram showing a relation between L* of achromatic colors in high brightness range used for evaluation of color reproduction accuracy and L* of printed color.

FIG. 31 shows L\* (that is, input value to the color printer) of the target colors along the horizontal axis and L\* of the printed color (that is, output value from the color printer) along the vertical axis. Although an ideal characteristic is a straight line having a gradient 1, it is easily understood that this result is largely out of the ideal line in high brightness range. This is because this brightness range is out of the color reproduction range.

Figure 32:
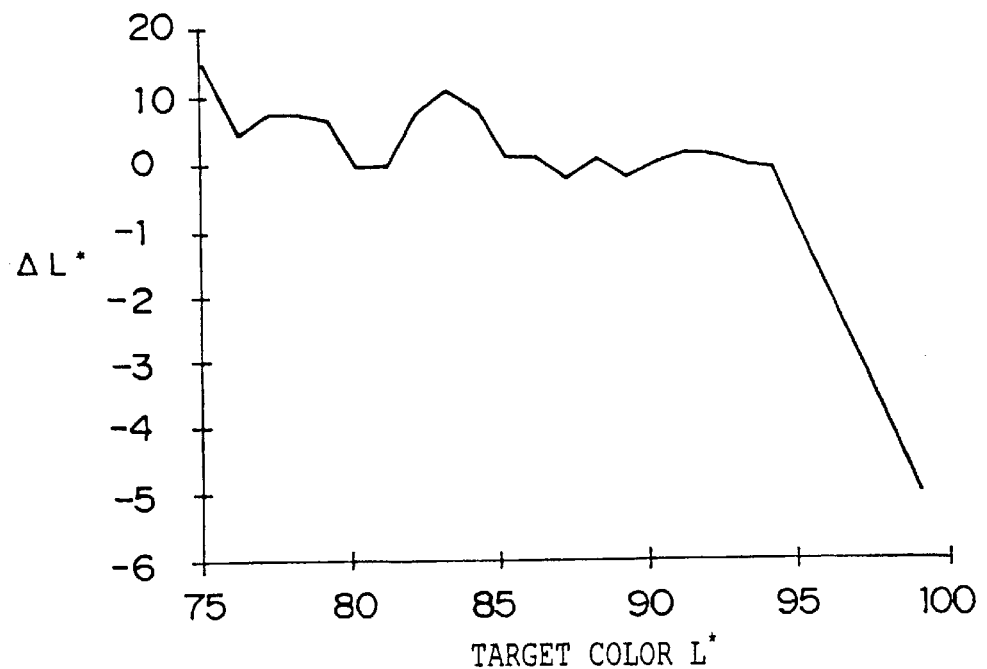
FIG. 32 is a diagram showing a relation between L* of target achromatic colors in high brightness range use for evaluation of color reproduction accuracy and a difference ΔL* between L* of target color and L* of printed color.
Figure 33:
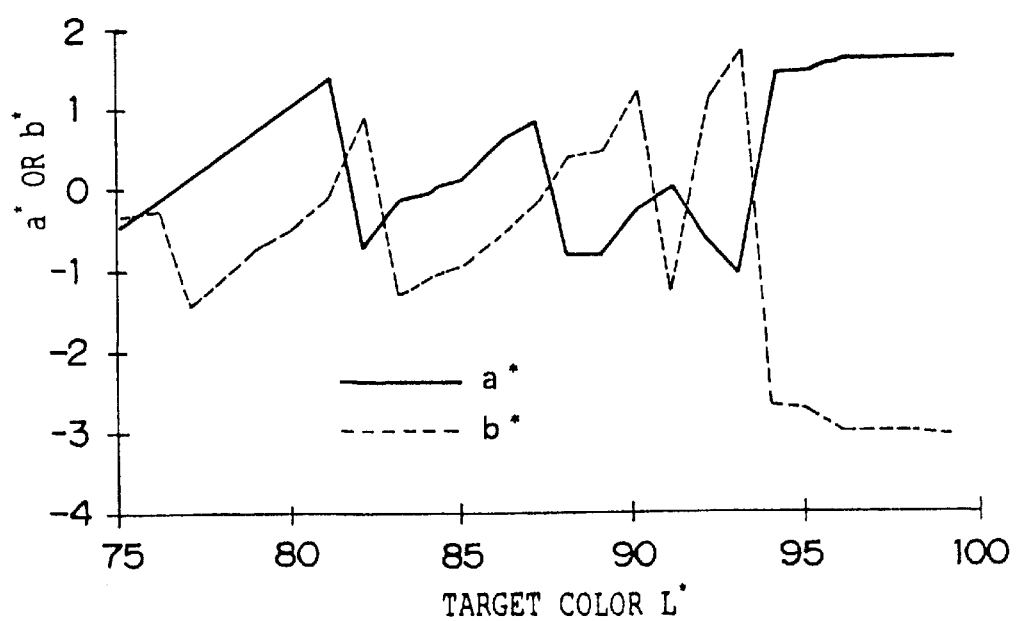
FIG. 33 is a diagram showing a relation between L* of target achromatic colors in high brightness range used for evaluation of color reproduction accuracy and a*/b*.

FIG. 32 shows the target color L\* along the horizontal axis and a difference between the target color L\* and the printed color L\* along the vertical axis. FIG. 33 shows the target color L\* along the horizontal axis and a\* and b\* values of the printed color along the vertical axis. Because the a* and b* values are 0 in case of achromatic colors like the above case, a distance from 0 on the vertical axis in this Figure indicates a color difference relative to the printed color. FIG. 34 shows target color L* along the horizontal axis and a color difference between the target color and the printed color along the vertical axis. As understood from this Figure, a deviation in color difference is small up to quite high brightness and generally, with respect to arbitrary colors, respective target colors are reproduced.

TABLE 7

Achromatic high brightness range

| # | Target color L* | a* | b* | Printed color L* | a* | b* | Color difference ΔEab |
|---|---|---|---|---|---|---|---|
| 1 | 75.00 | 0.00 | 0.00 | 76.31 | −0.38 | −0.49 | 1.45 |
| 2 | 76.00 | 0.00 | 0.00 | 76.44 | −0.22 | −0.18 | 0.52 |
| 3 | 77.00 | 0.00 | 0.00 | 77.74 | 0.13 | −1.45 | 1.63 |
| 4 | 78.00 | 0.00 | 0.00 | 78.74 | 0.43 | −1.11 | 1.40 |
| 5 | 79.00 | 0.00 | 0.00 | 79.62 | 0.76 | −0.74 | 1.23 |
| 6 | 80.00 | 0.00 | 0.00 | 79.90 | 1.05 | −0.49 | 1.16 |
| 7 | 81.00 | 0.00 | 0.00 | 80.97 | 1.35 | −0.15 | 1.36 |
| 8 | 82.00 | 0.00 | 0.00 | 82.75 | −0.75 | 0.89 | 1.38 |
| 9 | 83.00 | 0.00 | 0.00 | 84.10 | −0.17 | −1.33 | 1.73 |
| 10 | 84.00 | 0.00 | 0.00 | 84.81 | −0.04 | −1.12 | 1.38 |
| 11 | 85.00 | 0.00 | 0.00 | 85.09 | 0.11 | −0.98 | 0.99 |
| 12 | 86.00 | 0.00 | 0.00 | 86.10 | 0.54 | −0.65 | 0.85 |
| 13 | 87.00 | 0.00 | 0.00 | 86.78 | 0.82 | −0.27 | 0.89 |
| 14 | 88.00 | 0.00 | 0.00 | 88.08 | −0.88 | 0.32 | 0.94 |
| 15 | 89.00 | 0.00 | 0.00 | 88.80 | −0.87 | 0.40 | 0.98 |
| 16 | 90.00 | 0.00 | 0.00 | 90.02 | −0.32 | 1.19 | 1.23 |
| 17 | 91.00 | 0.00 | 0.00 | 91.17 | −0.01 | −1.37 | 1.38 |
| 18 | 92.00 | 0.00 | 0.00 | 92.11 | −0.66 | 1.07 | 1.26 |
| 19 | 93.00 | 0.00 | 0.00 | 92.97 | −1.11 | 1.68 | 2.02 |
| (20) | 94.00 | 0.00 | 0.00 | 93.90 | 1.40 | −2.73 | 3.07 |
| (21) | 95.00 | 0.00 | 0.00 | 93.90 | 1.43 | −2.77 | 3.31 |
| (22) | 96.00 | 0.00 | 0.00 | 93.98 | 1.57 | −3.00 | 3.94 |
| (23) | 97.00 | 0.00 | 0.00 | 93.97 | 1.56 | −3.01 | 4.55 |
| (24) | 98.00 | 0.00 | 0.00 | 93.95 | 1.57 | −3.02 | 5.29 |
| (25) | 99.00 | 0.00 | 0.00 | 93.98 | 1.59 | −3.07 | 6.10 |

TABLE 8

(N:25)

| | ΔEab |
|---|---|
| Average value | 2.00 |
| Standard deviation | 1.46 |
| Maximum value | 6.10 |

TABLE 9

(N:19)

| | ΔEab |
|---|---|
| Average value | 1.25 |
| Standard deviation | 0.34 |
| Maximum value | 2.02 |

As described above, according to this embodiment, even with a small number of measuring points or of data, color reproduction taking into account detailed characteristic of the color printer is enabled so that high precision color reproduction is realized. If this method is applied to the color reproduction method described in Japanese Patent Application Laid-Open (JP-A) No. 7-50760 by the applicant of the present invention, restriction on data quantity for obtaining a relation between the signal value of each color material in single color and the color material transfer amount is eliminated and a quantity of measuring data and the signal value for measurement can be set appropriately depending on each color material. Thus, it is possible to accurately grasp non-linearity in a relation between the signal value of each color material in single color and the color material transfer amount without increasing data quantity.

Further, according to this embodiment, the color conversion table produced to realize high precision color reproduction, that is, a relation between the signal value and the chromaticity can be determined, the color mixing characteristic and the single color characteristic are separately obtained. Thus, even if the single color characteristic changes due to deviation in color material production lots, deterioration of heat generation efficiency of the printing head or the like, the single color characteristic has only to be updated and the color mixing characteristic does not have to be changed. Because introduction of the color mixing characteristic requires a great number of measuring data and arithmetic operation, if this processing becomes unnecessary, it is possible to reduce the amount of arithmetic operation needed at the time of the above change or updating.

If the maximum transfer amount of a changed or adjusted color material drops below its previous level when a different production lot color material is used in the above color printer or at the like case, the single color characteristic is set by making the transfer amount of other color material which exceeds the maximum transfer amount of the changed or adjusted color material coincide with the maximum transfer amount of the changed or adjusted color material. By limiting the maximum transfer amount of each color material to paper so that it coincides with a minimum value of the standardized maximum transfer amount of each color material, color balance in the low brightness portion can be kept excellent.

Further, because the color mixing characteristic and the single color characteristic are separately obtained in the above color printer, if adjustment of hue (tone) is required for a color to be reproduced, the single color characteristic of each color material is changed and the transfer amount of each color material is changed by operating only the single color characteristic. Consequently, color balance or the like can be easily adjusted.

Here, generally, chemical analysis or the like is necessary to obtain transfer amount of color material. Although optical density may be used as a substitutive means, it does not always coincide with the density of color to be sensed. Particularly if color materials other than the CMYK which is a general color material is used, it is difficult to obtain optical density coinciding with the density of sensed color. Further, because the chromaticity of an output chart absolutely must be obtained to reproduce accurate colors in the color printer, if optical density is used, a plurality of color indication systems (optical density and chromaticity) exists in the same system so that handling of data becomes complicated. Thus, this is not desirable. To obtain optical density and the chromaticity, a precious spectrometer type measuring device is needed or optical density measuring device and color measuring device are both needed so that the composition of the needed devices becomes complicated. If the optical density measuring device and the color measuring device are prepared, they must be operated separately for measurement. According to this embodiment, measurement of density or the like is not needed so that data processing is facilitated with a simple composition. Further, by using the color difference, it is possible to obtain data with a small redundancy to sensing so that high color reproduction accuracy can be achieved with a small number of measuring points.

As described above, according to the present invention, the single color characteristic indicating a relation between the formation amount of each of a plurality of color materials and its device value and the color mixing characteristic indicating a relation to brightness of color reproduced by formation of color depending on each predetermined formation amount of a plurality of color materials are obtained and color information value of each of arbitrary color is converted to the device value based on the single color characteristic and the color mixing characteristic. Thus, the color mixing characteristic and the single color characteristic are separated so that even if the single color characteristic is deteriorated due to deviations in color material production lot, deterioration in heat generation efficiency of the printing head or the like, only the single color characteristic has to be update and the color mixing characteristic does not have to be changed.

With respect to non-linear relation between the device value and chromaticity of color to be reproduced, the device value is converted to color material formation amount by the single color characteristic indicating a relation between the device value and color material formation amount, and a relation between the formation amount of the color material and chromaticity of color to be reproduced is obtained in the form of color mixing characteristic. As a result, with smaller data quantity than when a strongly non-linear relation between the device value and chromaticity of reproduced color is directly obtained, the relation between the device value and the chromaticity of color to be reproduced can be obtained accurately.

Further, if the maximum formation amount of the color material to a medium in which the color is reproduced changes due to replacement of the color material or the like, the maximum formation amount of each color material to the medium in which the color is to be reproduced is limited so that it substantially coincides with a minimum value of the standardized maximum formation amount of each color material, and consequently, it is possible to maintain excellent color balance in low brightness portion. Further, when the hue of a predetermined color to be reproduced is adjusted, only a single color characteristic corresponding to the hue to be adjusted, of a plurality of the single color characteristics has to be adjusted. Thus, adjustment of color balance or the like is facilitated.

Further, as the formation amount, the color difference between a color formed depending on the formation amount or a color formed by the device value specifying that formation amount and white or gray of a medium in which the color is to be reproduced can be utilized. Thus, complicated measurement such as chemical analysis for obtaining the formation amount is not needed so that respective characteristics can be obtained easily. By using this color difference, it is possible to obtain data having a small redundancy to sensing so that high color reproduction accuracy can be achieved with small quantity of measurement.

[Second Embodiment]

Next, a second embodiment of the present invention will be described. This embodiment is an example of a case in which color reproduction is made by using measuring data used in displaying a single color on CRT.

As shown in FIG. 35, a color reproduction apparatus according to this embodiment comprises a CRT system 50, a micro computer 52, and a color measuring device 54 having a probe 56. The color measuring device 54 is connected to the micro computer 52 and the micro computer 52 is connected to the CRT system 50. The micro computer 52 comprises CPU 52A, ROM 52B, RAM 52C, a memory 52D for storing tables and processing routines which will be described later, and I/O device (I/O) 52E. A bus 52F is connected to these components to enable transmission and reception of data and commands therebetween. A key board 53 which serves as an input device for inputting instructions for executing processing programs which will be described later and data is connected to this I/O device 52E and the CRT system and the color measuring device 54 are connected to the I/O device 52E (see FIG. 36). The probe 56 possessed by the color measuring device 54 functions as a sensor for measuring color (chromaticity) displayed on a display screen 50A of the CRT system 50. The CRT system 50 has a D/A converter (not shown).

Next, an operation of this embodiment will be described.

If the color reproduction apparatus of this embodiment is turned ON, an arithmetic operation processing routine shown in FIG. 11 is executed. At step 100 of FIG. 11, tables of respective colors of RGB indicating a correspondence between luminous intensity and signal value are generated and stored in a memory of the micro computer 52. Then, the processing proceeds to step 102. At step 102, color arithmetic operation processing to obtain a correspondence between the signal value and the chromaticity is executed to display a desired color at every picture element and repeated until the processing of step 102 is terminated for every picture element (step 104). If this routine is terminated, a picture image of desired colors is displayed on the screen 50A of the CRT system 50.

Next, details of step 100 will be described. At step 100, the processing shown in FIG. 37 is executed. That is, with respect to respective colors of RGB, color patches colored by each of predetermined signal values are displayed, the displayed colors are measured by a measuring device, tables of respective colors are generated from a relation between the measuring value and the signal value, and respective generated tables are stored in the memory of the micro computer.

First, at step 1100, a color of R, G and B colors is set. Because respective processings for R, G and B colors are the same, this processing will be described with a case in which the R color is set.

At step 1120, as described later, a plurality of signal values are set to measure a plurality of colors. The plurality of the signal values are desired to be signal values having such predetermined values that brightnesses of displayed color patches are at substantially the same interval. In a 8-bit CRT system in which gamma is set to 1.8, for example, such nine levels as 0, 8, 24, 48, 80, 116, 156, 204, 255 are set. The above plurality of the signal values contain a maximum value (255 in this case) and a minimum value (0 in this case). As an example of this 8-bit CRT system, Apple's Power Mac 7500/100 is used as micro computer, BUG's XA-Pro video board is mounted and BARCO's Reference Calibrator is connected. Meanwhile, the signal values are not restricted to the respective values above, but may be set appropriately.

At step 1140, the color patches of the respective signal values are displayed. At step 1160, colors of the respective color patches are measured. As a result of this measurement, tristimulus values $(X_{mL}, Y_{mL}, Z_{mL})$ (m=r, g, b:1=0, 8, 24, ... 255) of colors of the respective color patches are obtained. The tristimulus value $(X_{mL}, Y_{mL}, Z_{mL})$ obtained according to this embodiment contains tristimulus values $(X_{m0}, Y_{m0}, Z_{m0})$ of a color patch displayed by minimum signal values (signal 0 in case of the present embodiment) and tristimulus values ($X_{m255}$, $Y_{m255}$, $Z_{m255}$) of a color patch displayed by a maximum signal value (255 level in case of the present embodiment). The tristimulus values ($X_{m0}$, $Y_{m0}$, $Z_{m0}$) of the color patch displayed by this minimum signal value are tristimulus values of level 0 in which minimum light emission occurs according to the present embodiment and the respective RGB colors have the same value. Thus, in a description below, the tristimulus values ($X_{m0}$, $Y_{m0}$, $Z_{m0}$) at the time of minimum light emission are represented as tristimulus values ($X_0$, $Y_0$, $Z_0$). Meanwhile, the color patches are displayed on entire screen or only the color patches are displayed with a predetermined size in the center of the screen. Although it is preferable to conduct measurement in totally dark environment (e.g. dark room), the measurement according to the present embodiment may be conducted regardless of surrounding environment because bias compensation which will be described later is made. To improve the accuracy of the measurement, it is preferable to repeat the same color measurement several times and obtain an average value as its measuring value.

In this color measurement, by using for example Minoruta's TV color analyzer CA-100 as a measuring device, it is possible to obtain respective values of x, y, and Y.

At step 1180, tristimulus values ($X_{m255}$, $Y_{m255}$, $Z_{m255}$) measured above at the time of maximum light emission are stored and at step 1200, the tristimulus values ($X_0$, $Y_0$, $Z_0$) at the time of minimum light emission are stored as bias values.

At step 1220, luminous intensity is calculated. That is, as shown in an expression (24) below, of the measuring values (tristimulus values), a measuring value (bias value) at signal value 0 is subtracted from Y value corresponding to brightness (brightness) and then its result is divided by a measuring value (tristimulus values at the time of maximum light emission) at signal value 255 in order to obtain a relative brightness in this standardized manner. This relative brightness is regarded to be luminous intensity $y_{mL}$.

$$Y_{mL} = \frac{Y_{mL} - Y_0}{Y_{m255} - Y_0} \quad (24)$$

At step 1240, parameters of spline function for spline interpolation are obtained as described below. Although the details will be described later, as shown in Table 10, with luminous intensity $y_{mL}$, and its signal value $X_{mL}$ as a pair, the values x[j] and y[j] are set and parameter N[i,4,x] and parameter p[i] of the spline function are obtained. In this case, the end condition may be such a condition which coincides with a gradient determined by respective relative brightnesses of 0.0 at the left end and the signal values 204, 255 at the right ends. Values obtained by other measuring values may be used.

TABLE 10

| | | | | |
|---|---|---|---|---|
| $x_m[0] =$ | $0 = x_{m0}$ | , | $y_m[0] =$ | $y_{m0}$ |
| $x_m[1] =$ | $8 = x_{m8}$ | , | $y_m[1] =$ | $y_{m8}$ |
| $x_m[2] =$ | $24 = x_{m24}$ | , | $y_m[2] =$ | $y_{m24}$ |
| ⋮ | ⋮ | , | ⋮ | ⋮ |
| $x_m[j] =$ | $1 = x_{mt}$ | , | $y_m[j] =$ | $y_{mt}$ |
| ⋮ | ⋮ | , | ⋮ | ⋮ |
| $x_m[8] =$ | $255 = x_{m255}$ | , | $y_m[8] =$ | $y_{m255}$ |

At step 1260, by using the obtained parameters of the spline function, relative luminous intensities of all signal values are calculated. That is, with respect to all signal values from 0 to 255, their luminous intensities (relative brightness) are obtained by the spline function using the parameter N[i,4,x] and p[i].

At step 1280, as shown in Table 11 below, tables indicating a correspondence between each signal value and its luminous intensity are generated and stored in the memory. That is, tables in which each signal value pairs with its relative luminous intensity are stored. Further, a measuring value (tristimulus values) at the signal value 255 which undergoes bias compensation is stored. These tristimulus values are used as color conversion matrix which is an element of a matrix expression (expression (26) shown below) which will be described in detail later.

TABLE 11

| Signal value | Luminous intensity |
|---|---|
| $0 = X_{m0}$ | $Y_{m0}$ |
| $1 = X_{m1}$ | $Y_{m1}$ |
| $2 = X_{m2}$ | $Y_{m2}$ |
| . | . |
| . | . |
| . | . |
| $1 = XmL$ | $Y_{mL}$ |
| . | . |
| . | . |
| . | . |
| $255 = X_{m255}$ | $Y_{m255}$ | where 1=1, 2, . . . 255
m=r, g, b

At step 1300, whether or not the above processing is terminated for all colors is determined. That is, for G and B colors, the same processing is performed and for each of the colors, a table is prepared.

Next, a case in which arbitrary color is displayed on CRT by using the generated tables will be described with reference to FIG. 38. To simplify the description, a case in which the CRT is composed by arranging picture elements vertically and horizontally and an arbitrary color is displayed on one picture element will be taken as an example. If arbitrary colors are displayed on the entire display screen, a following processing is carried out for all picture elements composing the screen.

Figure 38:
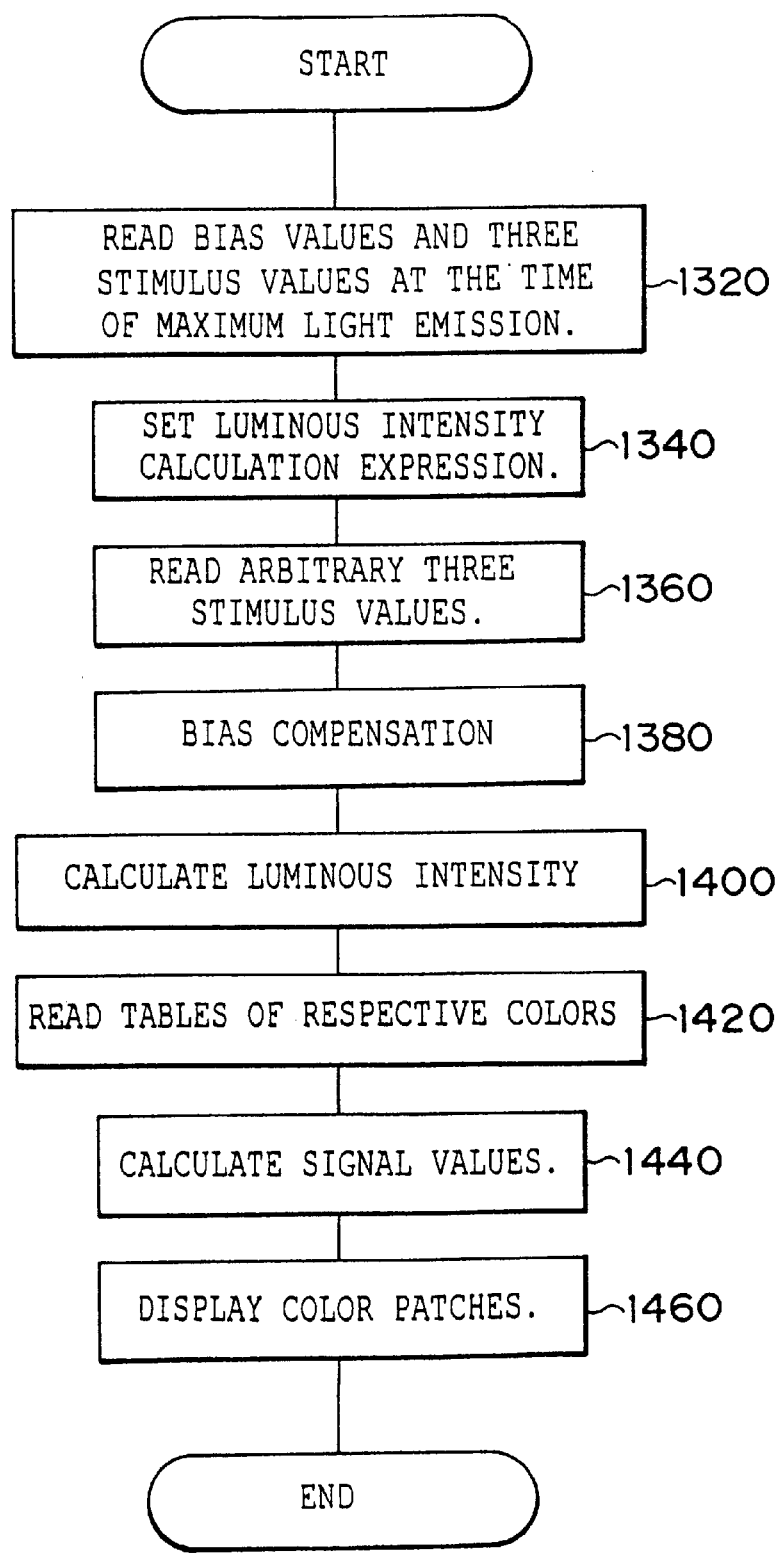
FIG. 38 is a flow chart of processing for displaying arbitrary color on CRT.

At step 1320 of FIG. 38, a bias value preliminarily stored and tristimulus values at the time of maximum light emission are read and at step 1340, a following luminous intensity calculating expression is set.

$$\begin{bmatrix} yr \\ yg \\ yb \end{bmatrix} = \begin{bmatrix} X'r & X'g & X'b \\ Y'r & Y'g & Y'b \\ Z'r & Z'g & Z'b \end{bmatrix}^{-1} \begin{bmatrix} X - X_0 \\ Y - Y_0 \\ Z - Z_0 \end{bmatrix} \quad (25)$$

Next, step 1360, arbitrary color to be displayed is read. This arbitrary color is expressed by tristimulus values. The tristimulus values of this arbitrary color are subjected to bias compensation at step 1380 and the luminous intensities of respective colors to be displayed are calculated according to the above matrix expression (25).

At step 1420, a table of each color is read and at step 1440, the signal value $X_{mL}$ of each color corresponding to the luminous intensity is obtained by using the table. At step 1460, it is displayed. Meanwhile, the bias value refers to a measuring value at the signal value 0 stored in the memory. As a processing method for determining the signal value of integer by using a relative brightness which is a real number and a table, for example, there is a method in which two relative brightness for surrounding a target relative brightness is obtained according to binary search method and of the two values, a signal value nearer the target relative brightness is obtained. By displaying with the obtained signal value on the screen, arbitrary color can be displayed.

This inventor conducted various experiments with regard to a relation between digital signal value as a signal value to the CRT and luminous intensity.

[Experiment by Measuring Points Having the Same Interval]

FIGS. 39A, 39B, 40A, 40B, 41A, 41B show results of experiments in which, with 65 points of respective colors of RGB having the same interval as measuring points (signal value), digital signal values of the respective measuring points are measured, luminous intensities of each single color are obtained, and a relation between the digital signal value and the luminous intensity is obtained from that data by using the above method.

Figure 39A:
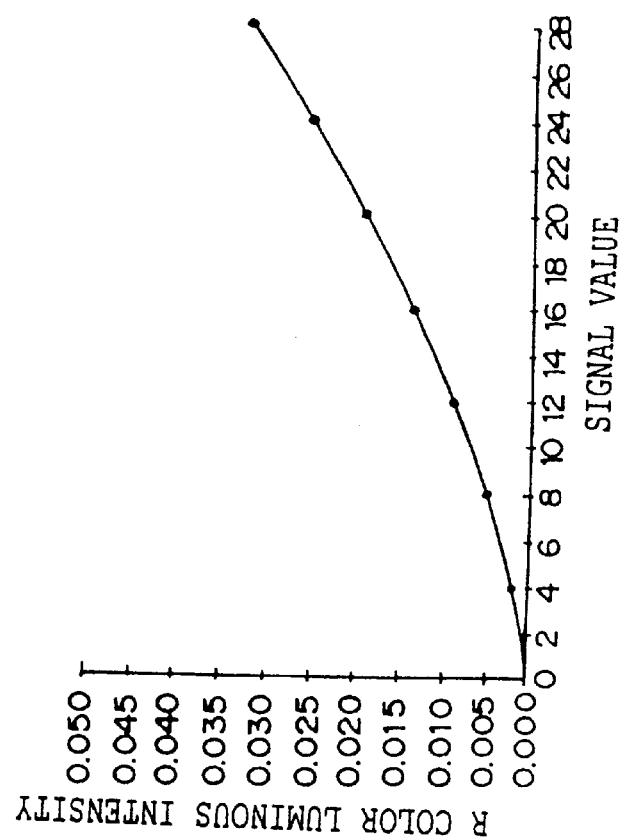
FIG. 39A and FIG. 39B are diagrams showing a result of experiment showing a relation of the R color luminous intensity to the signal value having the same interval.
Figure 39B:
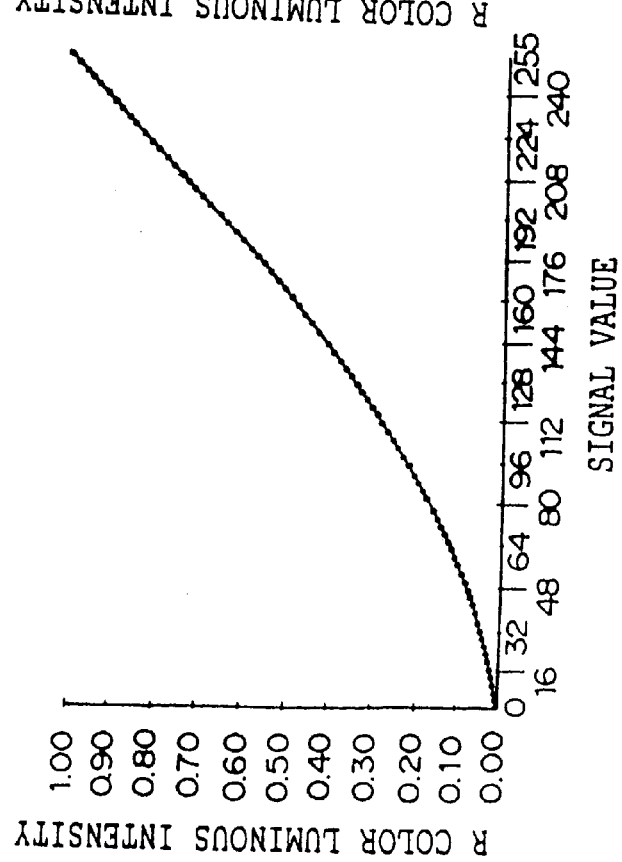

FIG. 39A shows a relation between the digital signal value and the luminous intensity of R color according to the present embodiment, the obtained luminous intensity always passes through a measuring point of the measured luminous intensity. Thus, as shown in an enlarged diagram from 0 to 28 in terms of digital signal value, in respective signal values measured, the measured luminous intensity coincides with the calculated luminous intensity.

Figure 40A:
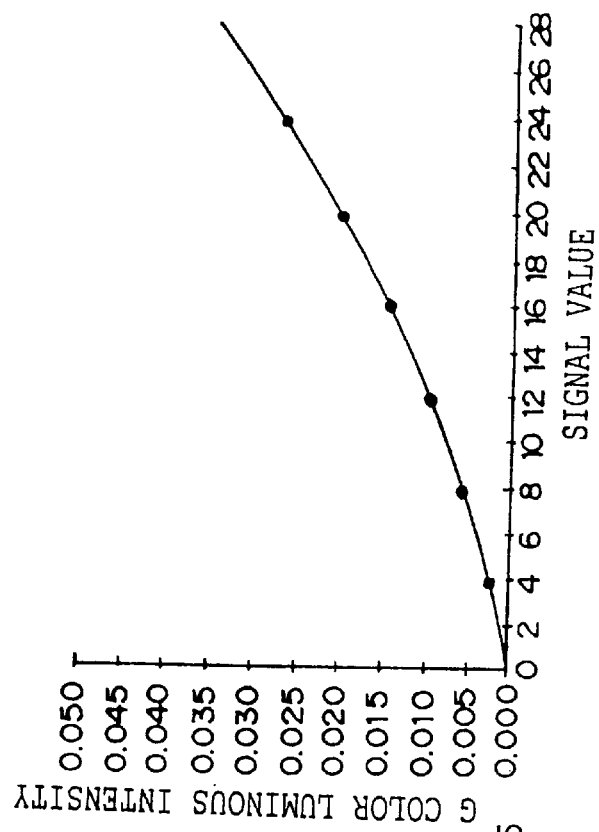
FIG. 40A and FIG. 40B are diagrams showing a result of experiment showing a relation of the G color luminous intensity to the signal value having the same interval.
Figure 40B:
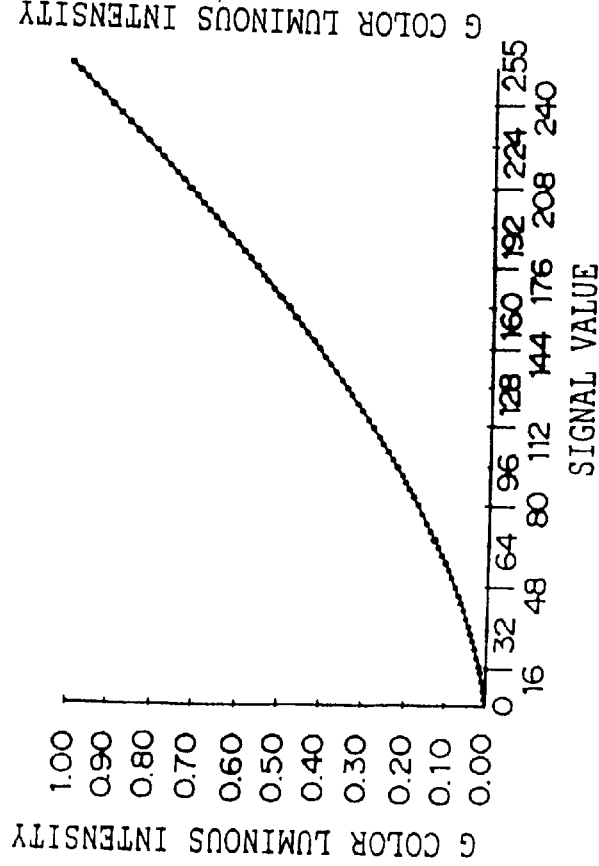
Figure 41A:
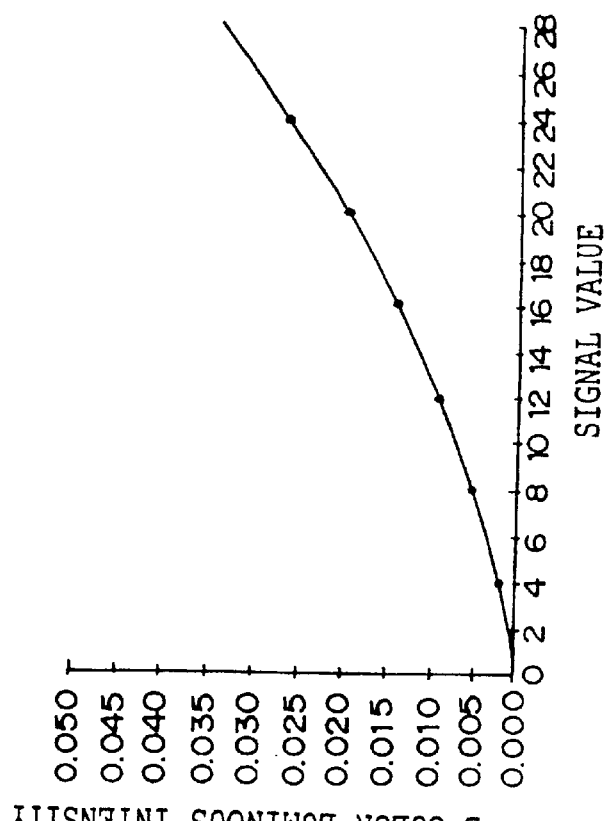
FIG. 41A and FIG. 41B are diagrams showing a result of experiment showing a relation of the B color luminous intensity to the signal value having the same interval.
Figure 41B:
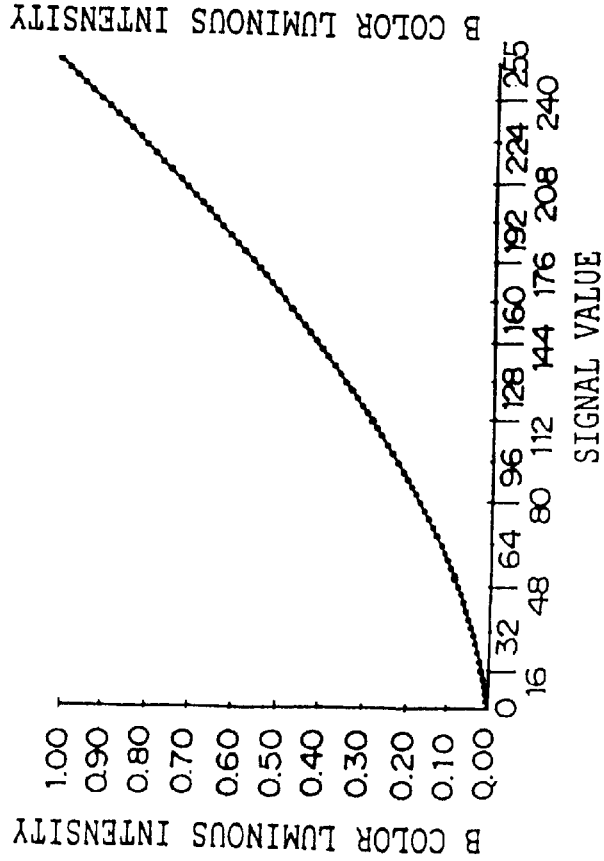
Figures 42A, 42B:
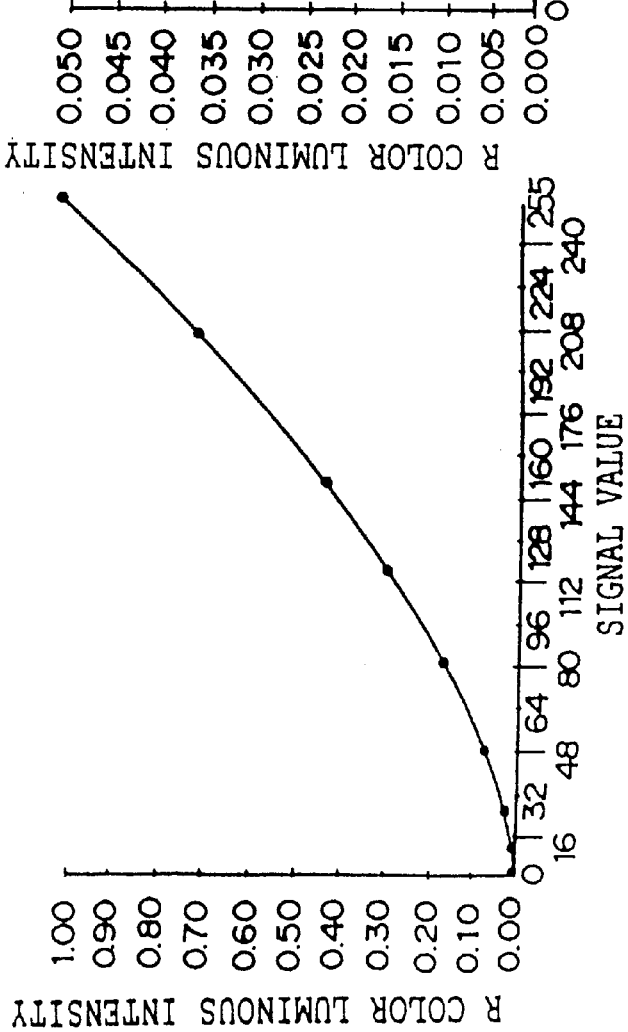
FIG. 42A and FIG. 42B are diagrams showing a result of experiment for obtaining a relation between the signal value and the luminous intensity, which provides brightnesses having substantially the same interval for R color.
Figure 44B:
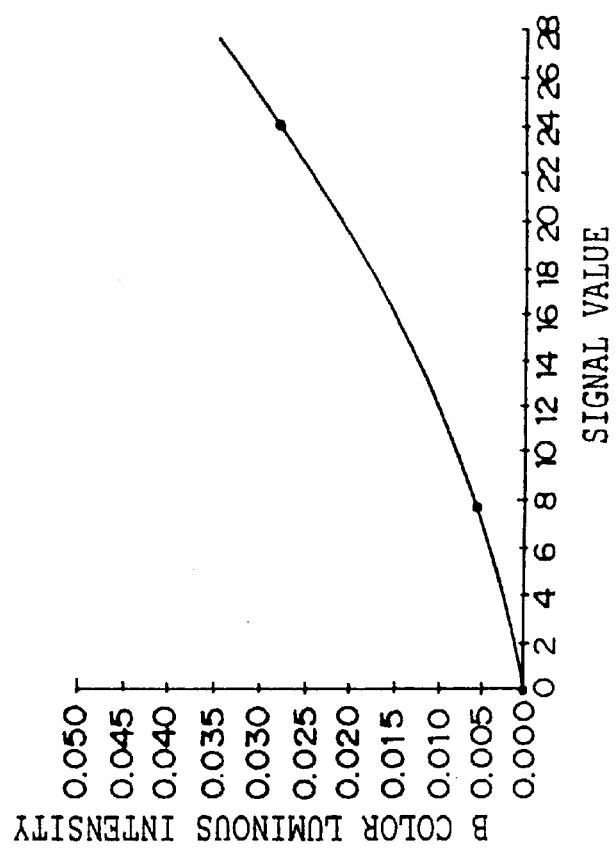
FIG. 44A and FIG. 44B are diagrams showing a result of experiment for obtaining a relation between the signal value and the luminous intensity, which provides brightnesses having substantially the same interval for B color.
Figure 44A:
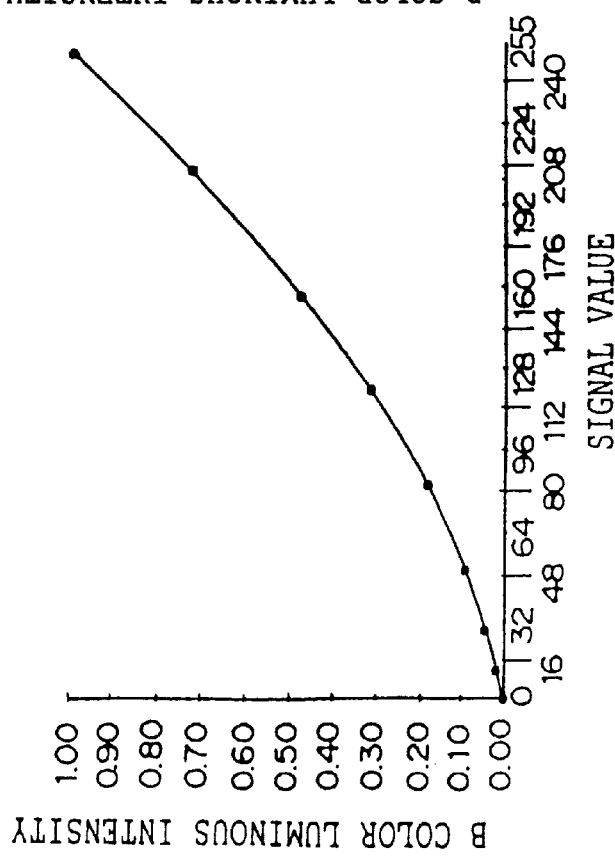

Likewise, FIG. 40A shows a relation between the digital signal value and luminous intensity of G color and FIG. 40B shows an enlarged diagram from 0 to 28 in terms of digital signal value. FIG. 41A shows a relation between the digital signal value and luminous intensity of B color and FIG. 41B shows an enlarged diagram from 0 to 28 in terms of digital signal value.

[Experiment by Brightness Having the Same Interval]

FIGS. 42A, 42B, 43A, 43B, 44A, 44B show results of experiment in which digital signal values at nine points indicating brightness of respective colors of RGB at substantially the same interval are measured to obtain the luminous intensities and a relation between the digital signal value and the luminous intensity is obtained from that data.

The measured digital signal values are nine points, 0, 8, 24, 48, 80, 116, 156, 204, 255. The luminous intensities are obtained from these nine points. Table 12 below describes the luminous intensities obtained by calculation and the luminous intensities obtained by actual measurement. As understood from Table 4, the luminous intensity obtained according to the present embodiment substantially coincides with the luminous intensity obtained by actual measurement. According to the present embodiment, it is possible to obtain a relation between the digital signal value and the luminous intensity at high precision by even nine points.

TABLE 12

| | luminous intensity | | | | | |
|---|---|---|---|---|---|---|
| | Red | | Green | | Blue | |
| Signal value | Calculation | Actual measurement | Calculation | Actual measurement | Calculation | Actual measurement |
| 0 | 0.0000 | 0.0000 | 0.0000 | 0.0000 | 0.0000 | 0.0000 |
| 8 | 0.0046 | 0.0047 | 0.0053 | 0.0053 | 0.0052 | 0.0052 |
| 24 | 0.0251 | 0.0251 | 0.0269 | 0.0269 | 0.0262 | 0.0262 |
| 48 | 0.0724 | 0.0727 | 0.0780 | 0.0780 | 0.0750 | 0.0751 |
| 80 | 0.1602 | 0.1606 | 0.1703 | 0.1705 | 0.1658 | 0.1659 |
| 116 | 0.2855 | 0.2861 | 0.2985 | 0.2980 | 0.2914 | 0.2919 |
| 156 | 0.4564 | 0.4570 | 0.4739 | 0.4739 | 0.4660 | 0.4668 |
| 204 | 0.7029 | 0.7042 | 0.7150 | 0.7152 | 0.7086 | 0.7088 |
| 255 | 1.0000 | 1.0000 | 1.0000 | 1.0000 | 1.0000 | 1.0000 |

Third Embodiment]

Next, the third embodiment will be described. This embodiment is an example of a case in which by using measuring data obtained when a plurality of colors are displayed on CRT at the same time (displayed by mixing colors), color reproduction is made. Because this embodiment has the same construction as the embodiment already described above, the same reference numerals are attached to the same parts and a detailed description thereof is omitted.

Figure 45A:
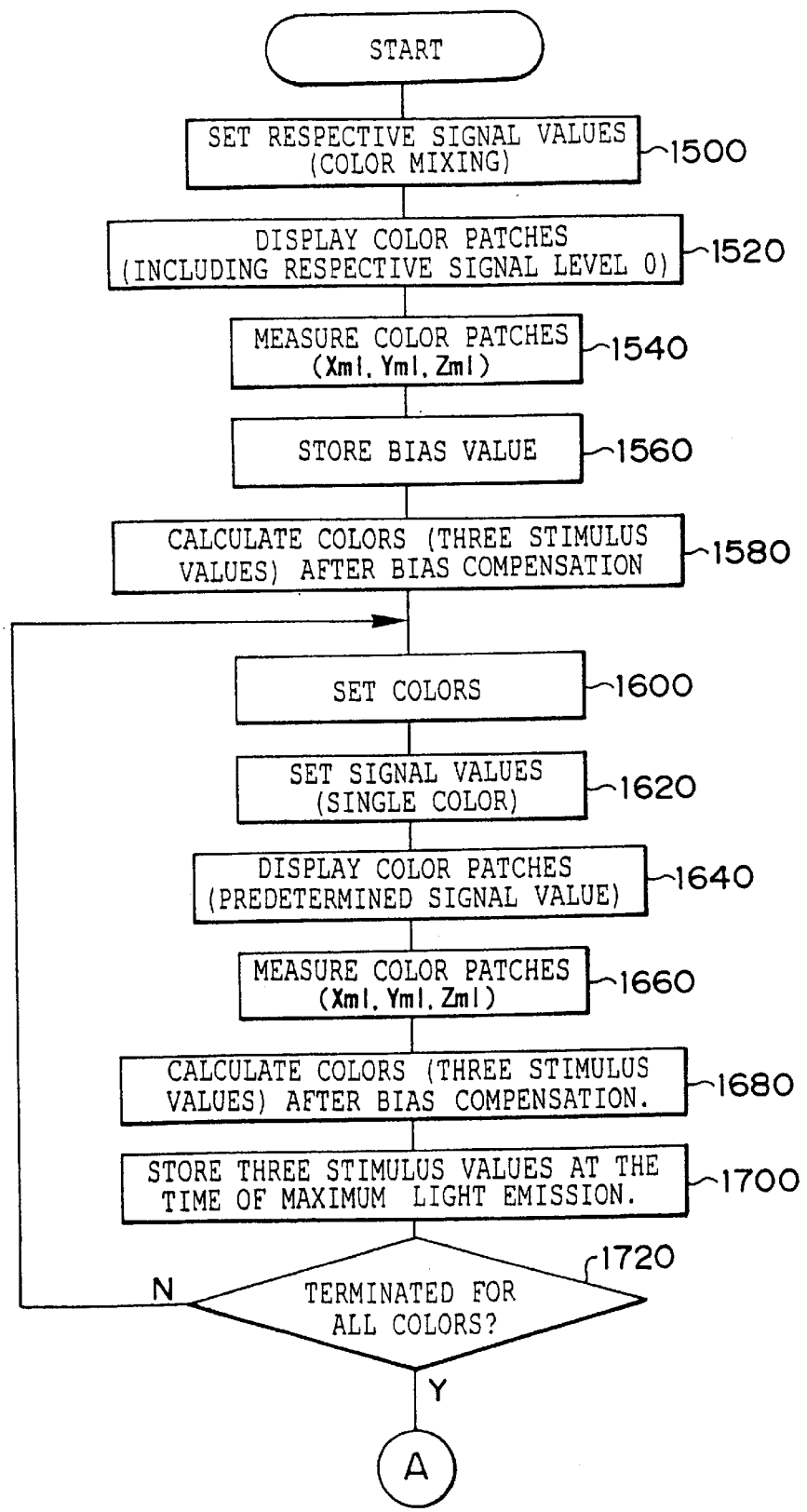
FIG. 45A and FIG. 45B are flow chart of table generation/storage processing according to a third embodiment.
Figure 45B:
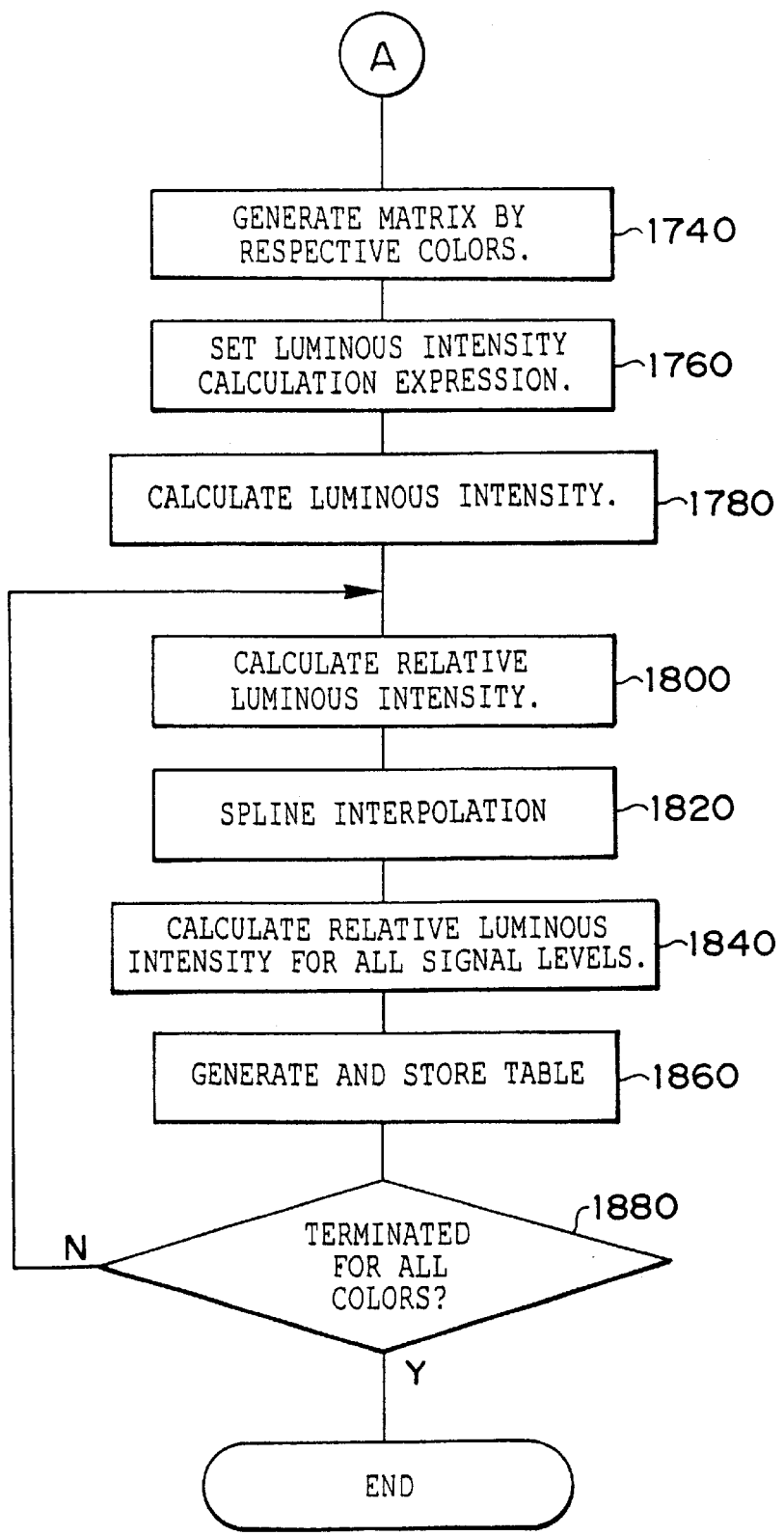

At step 1500 of FIG. 45A and 45B, respective signal values 1 are set. According to the present embodiment, the respective signal values 1 are set to such a value in which the brightness of a displayed color patch is arranged at substantially the same intervals. That is, in 8-bit CRT system in which gamma is set to 1.8 as in the above embodiment, nine levels, 0, 8, 24, 48, 80, 116, 156, 204, 255 are set. The signal values of R, G and B colors are the same manner.

At step 1520, color patches by the same signal values in three colors are displayed. That is, color patches of substantially black, gray having a plurality of different brightnesses, and white in which the signal values 1 of R, G and B colors are the same are displayed. At step 1540, the displayed color patches are measured to obtain tristimulus values ($X_{wL}$, $Y_{wL}$, $Z_{wL}$).

At step 1560, the tristimulus values ($X_{w0}$, $Y_{w0}$, $Z_{w0}$) which are measuring values when the signal value is 0 are stored as bias value. At step 1580, as shown in an expression (26), tristimulus values ($X'_{wL}$, $Y'_{wL}$, $Z'_{wL}$) which are colors subjected to bias compensation are obtained by subtracting the bias values from the respective color patches.

$$X'_{wL} = X_{wL} - X_{w0} \qquad (26)$$
$$Y'_{wL} = Y_{wL} - Y_{w0}$$
$$Z'_{wL} = Z_{wL} - Z_{w0}$$

Next, at step 1600, colors to be used in the following single color processing are set and at step 1620, a predetermined signal value 1 (1=255 in this embodiment) is set for each single color. Although it is desirable that this predetermined signal value provides a maximum brightness of each single color, this is not limited.

At step 1640, the color patch of a set color (any one of red, green, and blue) is displayed (lit by a single color) and at step 1660, the displayed color patch is measured to obtain the tristimulus values ($X_{m255}$, $Y_{m255}$, $Z_{m255}$) (m: any set color of RGB). At step 1680 like at the above step 1580 (see the expression (26)), tristimulus values ($X'_{m255}$, $Y'_{m255}$, $Z'_{m255}$) of bias-compensated color are calculated and at step 1700, stored as tristimulus values at the time of maximum light emission after bias compensation.

If all the processings above are terminated (step 1720), the processing proceeds to step 1740 so that matrixes of respective colors shown below are generated. That is, both data obtained with respect to single color emission and data obtained with respect to mixed color emission are converted to tristimulus values. By subtracting tristimulus values provided when the signal value is 0, the tristimulus values obtained for each single color emission can be expressed in the following matrix. This matrix corresponds to the color conversion matrix of the above expression (26).

$$\begin{bmatrix} X'r & X'g & X'b \\ Y'r & Y'g & Y'b \\ Z'r & Z'g & Z'b \end{bmatrix}$$

At step 1760, a luminous intensity calculation expression is set. That is, by multiplying the tristimulus values obtained with respect to a color displayed by color mixing by an inverse matrix of the above matrix, luminous intensities $E_{rL}$, $E_{gL}$, $E_{bL}$ of respective primary colors in the color displayed by color mixing can be obtained. That is, like the expression (25), the following expression (27) is set as a luminous intensity calculation expression.

$$\begin{bmatrix} E_{rL} \\ E_{gL} \\ E_{bL} \end{bmatrix} = \begin{bmatrix} X'r & X'g & X'b \\ Y'r & Y'g & Y'b \\ Z'r & Z'g & Z'b \end{bmatrix}^{-1} \begin{bmatrix} X'wl \\ Y'wl \\ Z'wl \end{bmatrix} \qquad (27)$$

At step 1780, luminous intensities $E_{rL}$, $E_{gL}$, $E_{bL}$ at respective color mixing are calculated using the tristimulus values after bias compensation obtained at step 1580, according to the luminous intensity calculation expression of the expression (27). By performing the same processing for respective displayed colors by color mixing, it is possible to obtain the luminous intensities of respective primary colors of a signal value which displayed mixed color. For example, if the measuring data for single color display is used, a number of measurements 8×3+1=25 (measurement of respective single colors except signal value of 0 and measurement at signal value 0) is necessary. According to this embodiment, the processing can be performed by a number of measurements 9+3=12.

At step 1800, a relative luminous intensity is calculated. That is, by dividing the obtained luminous intensity by a luminous intensity of the signal value 255 (value producing the maximum luminous intensity) as shown in an expression (28), it is converted to a relative luminous intensity.

$$yil = Eil/Ei255 \qquad (28)$$

At step 1820, parameters for spline interpolation are calculated. That is, with a relative luminous intensity obtained at step 1800 and its signal value as a pair, the values x[j], y[j] are set and like the above embodiment, parameters N[i,4,x], p[i] of the spline function are obtained.

In this case, the end condition may be such a condition which coincides with a gradient determined by relative brightnesses of 0.0001 at the left end and 204, 255 at the right end or may be any value obtained from other measuring values.

At step 1840, relative luminous intensities of all the signal values are calculated and at step 1860, tables are generated and stored. That is, relative luminous intensities (relative brightness) are obtained for all signal values from 0 to 255 by spline function using the parameters N[i,4,x], p[i] and then a table in which each signal value pairs with its relative brightness is generated and stored.

Above processing is performed for all colors (step 1880) and tables for respective colors of red, green and blue are generated and stored.

This inventor conducted various experiments below about color reproduction accuracy on CRT.

[Color Reproduction Accuracy on CRT(Consideration on a Number of Measurements)]

By using 100 colors generated by random numbers and repeating 12 colors specified by such signal values of respective colors of RGB as (R, G, B)=(255, 255, 255), (127, 127, 127), (15, 15, 15), (255, 0, 0), (0, 255, 0), (0, 0, 255), (127, 0, 0), (0, 127, 0), (0, 0, 127), (15, 0, 0), (0, 15, 0), (0, 0, 15) five times, color reproduction accuracy about totally 160 colors according to this embodiment were testified.

Digital signal values (0, 4, 8, 12, . . . , 252, 255) at 65 points having the same interval in signal values of respective single colors of RGB were measured to obtain their luminous intensities, a relation between the digital signal value and the luminous intensity was obtained from that data in the same manner as the above embodiment, and a value estimating the color (chromaticity) from the digital signal value a-and a measured chromaticity were compared with each other in terms of the color difference therebetween. A result obtained consequently was that an average value of the color differences (CIE $\Delta E^*ab$) was 0.4103, the standard deviation was 0.2347 and the maximum value was 1.2738. As understood from this result, an excellent accuracy could be obtained.

Further, digital signal values (0, 32, 64, 96, 128, . . . , 224, 255) at nine points having the same interval in signal value of respective single colors of RGB were measured and a result obtained consequently was that an average value of the color differences (CIE, $\Delta E^*ab$) is 0.6228, the standard deviation was 0.4940 and the maximum value was 2.5479.

Further, digital signal values (0, 8, 24, 48, 80, 116, 156, 204, 255) of nine points having the same interval in brightness of respective single colors of RBG were measured and a result obtained consequently was that an average value of the color differences (CIE $\Delta E^*ab$) was 0.4587, the standard deviation was 0.2315 and the maximum value was 1.1933.

As evident from above, a relatively excellent result was obtained. By providing the measuring points at the same interval with respect to brightness, even if only nine measuring points are provided, it is possible to obtain the same result as when 65 measuring points are provided for measurement.

[Consideration on Accuracy]

With respect to digital signal values 15, 127, 255, a color difference between colors obtained by emitting lights of RGB at the same time (e.g. signal value [255, 255, 255]) and color obtained by synthesizing tristimulus values of respective colors produced by emitting a single color of RGB each (e.g. signal values [255, 0, 0], [0, 255, 0], [0, 0, 255]) was obtained and then color reproduction accuracy was testified with measured value by mixing colors. When A's CRT was used, the color difference was 0.6714 at signal value of 255, 0.2572 at signal value of 127 and 0.8090 at signal value of 15. When B'CRT was used, the color difference was 0.9625 at signal value of 255, 1.3355 at signal value of 127 and 2.3200 at signal value of 15. Consequently, although the A'CRT provides a relatively excellent result with a small color difference, the B'CRT provides a relatively large color difference.

With respect to the A'CRT, based on measuring values of digital signal values (interval in terms of brightness, etc. measurements of 8*3+1=25 points) at nine points about respective single colors, a relation between the digital signal value and the luminous intensity was obtained and colors were reproduced. By measuring the colors, this inventor obtained such a result that an average value of the color differences (CIE ΔE*ab) was 0.4587, the standard deviation was 0.2315 and the maximum value was 1.1933. Further, based on measuring values of digital signal values (9*1+3 (respective single color)=12) at nine points for color mixing, a relation between the digital signal value and the luminous intensity was obtained and the colors were reproduced. By measuring the reproduced colors, the inventor obtained such a result that an average value of the color differences (CIE ΔE*ab) was 0.4452, the standard deviation was 0.2065 and the maximum value was 1.1432. From this comparison, an excellent accuracy could be obtained even when mixed colors were measured.

Further, the same procedure was applied to the B's CRT also. Digital signal values at nine points of respective single colors were measured and according to the measured values, a relation between the digital signal value and the luminous intensity was obtained and the colors were reproduced. By measuring the reproduced colors, this inventor obtained such a result that an average value of the color difference was 1.0326, the standard deviation was 0.6979 and the maximum value was 3.5935. Further, based on measuring values of digital signal values at nine points of a mixed color, a relation between the digital signal value and the luminous intensity was obtained and the colors were reproduced. By measuring the reproduced colors, this inventor obtained such a result that an average value of the color differences was 1.0772, the standard deviation was 0.6397 and the maximum value was 2.4389. Particularly about the maximum color difference, measurement of mixed colors provides less color difference, providing an excellent result. The reason is considered to be that the B'CRT has such a feature that colors are different between mixed color and single color and using data of mixed colors provides more excellent color reproduction accuracy.

As described above, according to this embodiment, by obtaining the luminous intensities of respective primary colors from measuring data of color expressed by color mixing and then obtaining a relation between the signal value and the luminous intensity of the fluorescent substance from that luminous intensities, the luminous intensity data of respective primary colors can be obtained. Thus, the number of measuring points can be decreased. Further, if measuring values in the vicinity of achromatic color are used, excellent color reproduction can be achieved on such a display system in which the luminous intensity to the same signal value differs between when a single color is emitted and when mixed color is emitted. That is, in the color reproduction apparatus according to this embodiment, the signal value-luminous intensity characteristic of respective primary colors is expressed by the spline function which passes through data point obtained by measurement and in which differential values at measuring points are either all positive or 0 or all negative or 0. Thus, because this is not a method using a model expression, deterioration of accuracy due to separation between the model expression and actual characteristic does not exist. Further, because this method is not linear interpolation, it is possible to obtain a high accuracy from a small number of data. Still further, because the data points obtained by measurement are always passed through, management of accuracy is easy. Still further, because differential values at all data points are either positive or negative, there occurs no vibration phenomenon which is a problem in ordinary spline interpolation, thereby obtaining a stable result.

The digital signal value-luminous intensity characteristic of respective primary colors in the color reproduction apparatus can be stored in the memory for each digital signal value as a look-up table storing its luminous intensity. Because the digital signal value-luminous intensity characteristic is memorized as a look-up table, conversion (conversion from the signal value to the luminous intensity) from the luminous intensity to the signal value can be achieved quickly. Although all picture elements must be converted from the luminous intensity to the signal value to achieve accurate color reproduction of pictures, an effect of quick treatment using the look-up table is great in conversion of such a large amount of data.

Further, it is possible to use a plurality of measuring points so that the color difference of colors displayed (printed) by two digital signal values nearby is substantially the same. By obtaining the signal value-luminous intensity characteristic from measuring values having substantially the same interval to color sensing, it is possible to avoid redundancy and prevent deterioration of accuracy due to sparse measuring points.

Further, from a measuring value of single color of respective primary colors corresponding to a digital signal value, and measuring values provided when a plurality of digital signal values of respective primary colors are combined and displayed at the same time (display by color mixing), luminous intensities corresponding to digital signal values of respective primary colors displayed by color mixing are obtained and the digital signal value-luminous intensity characteristic of respective primary colors can be obtained from that luminous intensity data. By obtaining the signal value-luminous intensity characteristic from measuring values at the time of display by color mixing, the number of necessary measuring points is decreased. If measuring values in the vicinity of achromatic color are used, excellent color reproduction can be achieved even in display system in which the luminous intensity changes due to color mixing.

What is claimed is:

1. A color reproduction method using a color reproduction apparatus which has a plurality of primary colors, converts color information values expressed by a first color space as predetermined colors to device values expressed by a second color space different from said first color space in order to determine formation amounts of respective primary colors for reproducing said color information values by colors by mixing the primary colors on a medium in which the colors are to be reproduced and outputs colors corresponding to said device values to reproduce said predetermined colors on said medium in which the colors are to be reproduced, the formation amounts of respective primary colors being amounts of color materials or light emission amounts which are expressed by the second color space, said method comprising: obtaining single color characteristic of each of said primary colors which expresses a relation between the formation amount of each primary color for color reproduction by mixing said plurality of the primary colors and the device value for determining said formation amount; obtaining color mixing characteristic which expresses a relation between a predetermined formation amount of each of said plurality of the primary colors and chromaticity of colors reproduced by formation of the colors depending on said each predetermined formation amount, according to said obtained single color characteristic, said color mixing characteristic being obtained separately from said single color characteristic; and converting the color information value of each arbitrary color of said first color space to said device value according to the obtained single color characteristic and color mixing characteristic.

2. A color reproduction method according to claim 1 wherein said single color characteristic and said color mixing characteristic are obtained by using a color reproduction apparatus based on subtractive mixture capable of forming arbitrary colors by synthesizing a plurality of primary colors in which subtractive mixture is established.

3. A color reproduction method according to claim 1 wherein said color mixing characteristic estimates the formation amount of each primary color corresponding to arbitrary chromaticity by conducting spline interpolation based on a plurality of relations between the predetermined formation amount of each of said plurality of the primary colors and chromaticity of color reproduced by formation of the color depending on said formation amount.

4. A color reproduction method according to claim 1 wherein when another color material different from a color material for forming said primary colors used for obtaining said single color characteristic and said color mixing characteristic is used, if the another color material is a color material having substantially same color, only said single color characteristic is obtained.

5. A color reproduction method according to claim 4 wherein when the single color characteristic is obtained by using said another color material, the single color characteristic of said another color material is obtained from a relation between the formation amount of said another color material and the device value for determining said formation amount, and when a maximum formation amount in the obtained single color characteristic of the another color material is less than a maximum formation amount in the single color characteristic of other substantially same color material other than said another color material, as a maximum formation amount in the single color characteristic of said other color material, a maximum formation amount of said another color material is set and the maximum formation amount in the single color characteristic of said another color material is made to correspond to a device value corresponding to a formation amount exceeding the maximum formation amount of the another color material to obtain the single color characteristic of each of said primary colors.

6. A color reproduction method according to claim 1 wherein when hue of said predetermined color to be reproduced is adjusted, a single color characteristic corresponding to a hue to be adjusted of said plurality of the single color characteristics is adjusted.

7. A color reproduction method according to claim 1 wherein said formation amount is a variable depending on a color difference between a color formed by the device value for determining a color formed depending on the formation amount or said formation amount and color of said medium in which the colors are to be reproduced.

8. A color reproduction method according to claim 7 wherein said single color characteristic is obtained by using charts, said charts being produced for a plurality of colors having substantially same color difference between the color of said medium and the color produced by the maximum formation amount.

9. A color reproduction method using a color reproduction apparatus based on additive mixture, in which color information values expressed by a first color space as predetermined colors are converted to device values expressed by a second color space different from the first color space and colors corresponding to the device values are output to reproduce the predetermined colors, the color reproduction method comprising: inputting a device value of single color of a predetermined value for each color of the second color space, measuring respective output colors to obtain measuring values, inputting a plurality of the device values for mixed color in which respective colors of the second color space are preliminarily determined, and measuring respective colors of a plurality of output colors to obtain measuring values, the measuring values obtained by the device value of single color for each color of the second color space and the measuring values obtained by the device values for mixed color are obtained separately; obtaining a characteristic of conversion between the device value and the intensity information value for each color of the second color space based on a plurality of correspondences between the device value and the intensity information value, such that the plurality of correspondences are included and correspondences between the device value and the intensity information value except said plurality of correspondences are such that, of neighboring correspondences caused when the device values or the intensity information values are arranged from larger to smaller, any device value located between a device value of correspondence on one side, which value is small and a device value of correspondence on the other side, which value is large corresponds to any intensity information value located between an intensity information value of correspondence on one side, which value is small and an intensity information value of correspondence on the other side which value is large; and converting arbitrary color information value of respective colors of the determined color space to the device value by utilizing the obtained conversion characteristic.

10. A color reproduction method according to claim 9, wherein spline function is determined by a correspondence between the device value and the intensity information value and the conversion characteristic is obtained by using the spline function.

11. A color reproduction method according to claim 9, wherein a plurality of correspondences between the device value and the intensity information value, the plurality of correspondences being preliminarily obtained, utilize correspondences in which intervals between obtained intensity information values are of substantially the same.

12. A color reproduction method using a color reproduction apparatus in which color information values expressed by a first color space as predetermined colors are converted to device values expressed by a second color space different from the first color space and colors corresponding to the device values are output to reproduce the predetermined colors, the color reproduction method comprising: inputting a plurality of predetermined device values for each color of said second color space, measuring each of a plurality of output colors and obtaining intensity information values of colors to be output from the color reproduction apparatus based on color measuring values; determining a spline function based on a correspondence between the device value and the intensity information value, with a spline interpolation being carried out so that a slope of a line passing through an interpolated point is the same as a slope of a line connecting measured points before and after the interpolated point; using the spline function to obtain a conversion characteristic of conversion between the device value and the intensity information value for each color of the second color space based on a plurality of correspondences between the device value and the intensity information value, such that the plurality of correspondences are included and correspondences between the device value and the intensity information value except said plurality of correspondences are such that, of neighboring correspondences caused when the device values or the intensity information values are arranged from larger to smaller, any device value located between a device value of correspondence on one side, which value is small and a device value of correspondence on the other side, which value is large corresponds to any intensity information value located between an intensity information value of correspondence on one side, which value is small and an intensity information value of correspondence on the other side which value is large; and converting arbitrary color information value of respective colors of the determined color space to the device value by utilizing the obtained conversion characteristic.

13. A color reproduction method according to claim 12, wherein a plurality of correspondences between the device value and the intensity information value, the plurality of correspondences being preliminarily obtained, utilize correspondences in which intervals between obtained intensity information values are of substantially the same.

* * * * *